United States Patent
Tesse

(10) Patent No.: US 11,829,353 B2
(45) Date of Patent: Nov. 28, 2023

(54) MESSAGE OBJECT TRAVERSAL IN HIGH-PERFORMANCE NETWORK MESSAGING ARCHITECTURE

(71) Applicant: TD Ameritrade IP Company, Inc., Omaha, NE (US)

(72) Inventor: Eric Tesse, New York, NY (US)

(73) Assignee: Charles Schwab & Co., Inc., San Francisco, CA (US)

( * ) Notice: Subject to any disclaimer, the term of this patent is extended or adjusted under 35 U.S.C. 154(b) by 275 days.

(21) Appl. No.: 17/443,027

(22) Filed: Jul. 20, 2021

(65) Prior Publication Data

US 2023/0027817 A1 Jan. 26, 2023

Related U.S. Application Data

(63) Continuation of application No. 17/379,269, filed on Jul. 19, 2021.

(51) Int. Cl.
*G06F 16/23* (2019.01)
*G06F 12/02* (2006.01)
(Continued)

(52) U.S. Cl.
CPC ...... *G06F 16/2379* (2019.01); *G06F 12/0223* (2013.01); *G06F 16/2255* (2019.01);
(Continued)

(58) Field of Classification Search
CPC ............. G06F 16/2379; G06F 12/0223; G06F 16/2255; G06F 16/2264; G06F 16/2358;
(Continued)

(56) References Cited

U.S. PATENT DOCUMENTS 4,989,132 A   1/1991   Mellender et al.
5,261,098 A   11/1993  Katin et al.
(Continued)

FOREIGN PATENT DOCUMENTS

WO   WO-2014/033606 A2   3/2014

OTHER PUBLICATIONS

International Search Report and Written Opinion for Corresponding Application No. PCT/US2022/037561, dated Oct. 27, 2022.
(Continued)

*Primary Examiner* — Mark D Featherstone
*Assistant Examiner* — Kweku William Halm
(74) *Attorney, Agent, or Firm* — Harness, Dickey & Pierce, P.L.C.

(57) ABSTRACT

A communications system implements instructions including maintaining a message object that includes an array of entries. Each entry of the array includes a field identifier, a data type, and a next entry pointer. The next entry pointers and a head pointer establish a linked list of entries. The instructions include, in response to a request to add a new entry to the message object, calculating an index based on a field identifier of the new entry and determining whether the entry at the calculated index within the array of entries is active. The instructions include, if the entry is inactive, writing a data type, field identifier, and data value of the new entry to the calculated index, and inserting the new entry into the linked list. The instructions include, if the entry is already active, selectively expanding the size of the array and repeating the calculating and determining.

22 Claims, 24 Drawing Sheets

(51) Int. Cl.
  *H04L 69/324* (2022.01)
  *G06F 16/2455* (2019.01)
  *G06F 16/22* (2019.01)
  *G06F 16/903* (2019.01)

(52) U.S. Cl.
  CPC ...... *G06F 16/2264* (2019.01); *G06F 16/2358* (2019.01); *G06F 16/24562* (2019.01); *G06F 16/90344* (2019.01); *H04L 69/324* (2013.01); *G06F 2212/1041* (2013.01)

(58) Field of Classification Search
  CPC ......... G06F 16/24562; G06F 16/90344; G06F 2212/1041; G06F 12/0253; G06F 16/2237; G06F 16/24552; G06F 12/023; H04L 69/324
  See application file for complete search history.

(56) References Cited

U.S. PATENT DOCUMENTS

| | | | |
|---|---|---|---|
| 6,081,665 | A | 6/2000 | Nilsen et al. |
| 6,209,003 | B1 | 3/2001 | Mattis et al. |
| 6,240,498 | B1 | 5/2001 | Dickes et al. |
| 6,615,280 | B1 | 9/2003 | Such |
| 10,691,728 | B1 | 6/2020 | Masson et al. |
| 2004/0139284 | A1 | 7/2004 | Clayton et al. |
| 2006/0136390 | A1 | 6/2006 | Zhao et al. |
| 2006/0179058 | A1 | 8/2006 | Bram et al. |
| 2007/0282881 | A1 | 12/2007 | Relyea |
| 2007/0283356 | A1 | 12/2007 | Du et al. |
| 2008/0222602 | A1 | 9/2008 | Vaziri-Farahani et al. |
| 2010/0076980 | A1 | 3/2010 | Dumitrean |
| 2010/0299438 | A1 | 11/2010 | Zimmerman et al. |
| 2014/0283040 | A1 | 9/2014 | Wilkerson et al. |
| 2014/0348101 | A1 | 11/2014 | Wang |
| 2015/0227414 | A1* | 8/2015 | Varma ................. G06F 11/0793 714/47.1 |
| 2015/0269180 | A1 | 9/2015 | Chen et al. |
| 2017/0142069 | A1 | 5/2017 | Keini et al. |
| 2017/0255548 | A1 | 9/2017 | Horman et al. |
| 2019/0243582 | A1 | 8/2019 | Satoyama et al. |
| 2020/0097392 | A1 | 3/2020 | Pizlo |
| 2020/0133842 | A1 | 4/2020 | Deguillard et al. |
| 2021/0306143 | A1 | 9/2021 | Wu et al. |
| 2021/0406215 | A1 | 12/2021 | Hughes et al. |
| 2022/0060438 | A1 | 2/2022 | Prasad et al. |

OTHER PUBLICATIONS

Notice of Allowance Corresponding to U.S. Appl. No. 17/443,051, dated Mar. 31, 2023.
Non-Final Office Action Corresponding to U.S. Appl. No. 17/379,269, dated Jul. 10, 2023.
Non-Final Office Action Corresponding to U.S. Appl. No. 17/443,049, dated Aug. 2, 2023.

* cited by examiner

MESSAGE OBJECT TRAVERSAL IN HIGH-PERFORMANCE NETWORK MESSAGING ARCHITECTURE

CROSS-REFERENCE TO RELATED APPLICATIONS

This application is a continuation of U.S. patent application Ser. No. 17/379,269 filed Jul. 19, 2021, the entire disclosure of which is incorporated by reference.

FIELD

The present disclosure relates to high-performance messaging and more particularly to encoding, decoding, and distribution of messages across communications network.

BACKGROUND

Many environments require the exchange of information among different participants. These participants may be clients, servers, applications, end-user devices, actuators, sensors, etc. When a high volume of information needs to be transferred, performance issues such as bandwidth efficiency and processor overhead become more important. Generally, lower-level languages, such as C or even assembly, allow for very efficient processing with low computational overhead. However, these low-level languages may require unique skill sets and be less forgiving of any mistakes.

High-level languages may offer tremendous advantages in terms of deployability, portability, maintainability, and security. However, the additional overhead imposed by high-level languages may result in slower communication with a given set of processing and network resources. Especially in situations where real-time or near-real-time performance is needed, the trade-offs made by high-level languages may be unacceptable. Even when processing and network resources are increased, the overall communications throughput with a high-level language may be sufficient, but the latency or jitter may be problematic.

Part of the deployability advantages of a high-level language is that the developers of business applications may be more comfortable and proficient interfacing with a communications platform using a language similar to that of their business applications. For example, a business developer skilled in the Java programming language may be more comfortable importing a Java communications library than attempting to interface with a lower-level language.

While various approaches exist to translate or embed lower-level languages for use with high-level languages, these generally impose performance penalties over code natively running in the lower-level language. Further, the boundary between the lower-level and high-level languages is often quite fragile.

SUMMARY

The summary is loosely divided into sections simply for organizational purposes. The concepts of each section can be combined with the concepts of one or more other sections according to the principles of the present disclosure.

Memory Pooling

A memory management system includes memory hardware configured to store instructions and processing hardware configured to execute the instructions stored by the memory hardware. The instructions include maintaining a plurality of pool data structures. Each pool data structure of the plurality of pool data structures is associated with a respective linked list of objects and includes a head pointer configured to point to a first element in the linked list of objects. The instructions include, in response to a first object no longer being needed, recycling the first object by identifying a first pool data structure, from the plurality of pool data structures, that corresponds to the first object and inserting the first object into a beginning position of the linked list associated with the first pool data structure without deallocating the memory for the first object. The instructions include, in response to a request for a new object from a requestor: identifying a second pool data structure from the plurality of pool data structures according to a feature of the new object and determining whether the linked list associated with the second pool data structure is empty. The instructions include, in response to the linked list not being empty: allocating memory for the new object, assigning the new object to the second pool data structure, and returning the new object to the requestor. The instructions include, in response to the linked list not being empty: selecting a head object from the linked list, removing the head object from the linked list, and returning the head object to the requestor as the new object. A state of the head object is cleared prior to the head object being returned.

In other features, the first pool data structure is identified based on a data field of the first object. In other features, the data field is an object reference to the first pool data structure. In other features, each pool data structure of the plurality of pool data structures is associated with a unique identifier. The data field stores the unique identifier associated with the first pool data structure. In other features, inserting the first object into a beginning position of the linked list includes: reading the head pointer of the first pool data structure, configuring a pointer of the first element to be equal to the head pointer of the first pool data structure, and selectively updating the head pointer of the first pool data structure to point to the first object.

In other features, selectively updating the head pointer is an atomic operation performed only in response to the head pointer still being equal to the pointer of the first object. In other features, selecting the head object includes reading the head pointer of the second pool data structure and identifying a target of the head pointer as the head object. Removing the head object from the linked list includes reading a pointer value of the head object and selectively updating the head pointer of the first pool data structure to be equal to the pointer value. In other features, selectively updating the head pointer is an atomic operation performed only in response to the head pointer still pointing to the head object.

In other features, the determining whether the linked list associated with the second pool data structure is empty is based on the head pointer of the second pool data structure such that the head pointer being null indicates the linked list is empty. In other features, the plurality of pool data structures includes a plurality of sets of pool data structures. Each of the plurality of sets of pool data structures corresponds to a respective object type. In other features, the object is an instantiation of a first class of a plurality of classes. The plurality of pool data structures includes a plurality of sets of pool data structures. Each of the plurality of sets of pool data structures corresponds to a respective one of the plurality of classes.

In other features, a first set of pool data structures corresponds to a message object type. A second set of pool data structures corresponds to an array object type. In other features, a set of pool data structures of the plurality of pool data structures corresponds one-to-one to array sizes. The second pool data structure is further identified according to a requested size of the new object. In other features, the second pool structure is identified by searching through a subset of the set of pool data structures that correspond to array sizes greater than or equal to the requested size.

In other features, the second pool structure is identified such that no other pool data structures of the set of pool data structures meet all three of the following criteria: the corresponding array size of the other pool data structure is smaller than the corresponding array size of the second pool structure, the corresponding array size of the other pool data structure is greater than or equal to the requested size, and the linked list associated with the other pool data structure is non-empty. In other features, a set of pool data structures of the plurality of pool data structures corresponds one-to-one to processing threads. The second pool data structure is further identified according to an identity of a presently executing processing thread.

In other features, clearing the head object comprises iterating through top-level entries of the head object and setting a flag for each of the entries to indicate that valid data is absent. In other features, the top-level entries of the head object are stored in an array. Iterating through top-level entries of the head object includes iterating through an array of the top-level entries of the head object. In other features, setting the flag for each entry of the entries includes setting a Boolean value of the entry to false. In other features, clearing the head object is performed as the head object is recycled.

A non-transitory computer-readable medium stores instructions including maintaining a plurality of pool data structures. Each pool data structure of the plurality of pool data structures is associated with a respective linked list of objects and includes a head pointer configured to point to a first element in the linked list of objects. The instructions include, in response to a first object no longer being needed, recycling the first object by identifying a first pool data structure, from the plurality of pool data structures, that corresponds to the first object and inserting the first object into a beginning position of the linked list associated with the first pool data structure without deallocating the memory for the first object. The instructions include, in response to a request for a new object from a requestor: identifying a second pool data structure from the plurality of pool data structures according to a feature of the new object and determining whether the linked list associated with the second pool data structure is empty. The instructions include, in response to the linked list not being empty: allocating memory for the new object, assigning the new object to the second pool data structure, and returning the new object to the requestor. The instructions include, in response to the linked list not being empty: selecting a head object from the linked list, removing the head object from the linked list, and returning the head object to the requestor as the new object. A state of the head object is cleared prior to the head object being returned.

In other features, the first pool data structure is identified based on a data field of the first object. In other features, the data field is an object reference to the first pool data structure. In other features, each pool data structure of the plurality of pool data structures is associated with a unique identifier. The data field stores the unique identifier associated with the first pool data structure. In other features, inserting the first object into a beginning position of the linked list includes: reading the head pointer of the first pool data structure, configuring a pointer of the first element to be equal to the head pointer of the first pool data structure, and selectively updating the head pointer of the first pool data structure to point to the first object.

In other features, selectively updating the head pointer is an atomic operation performed only in response to the head pointer still being equal to the pointer of the first object. In other features, selecting the head object includes reading the head pointer of the second pool data structure and identifying a target of the head pointer as the head object. Removing the head object from the linked list includes reading a pointer value of the head object and selectively updating the head pointer of the first pool data structure to be equal to the pointer value. In other features, selectively updating the head pointer is an atomic operation performed only in response to the head pointer still pointing to the head object.

In other features, the determining whether the linked list associated with the second pool data structure is empty is based on the head pointer of the second pool data structure such that the head pointer being null indicates the linked list is empty. In other features, the plurality of pool data structures includes a plurality of sets of pool data structures. Each of the plurality of sets of pool data structures corresponds to a respective object type. In other features, the object is an instantiation of a first class of a plurality of classes. The plurality of pool data structures includes a plurality of sets of pool data structures. Each of the plurality of sets of pool data structures corresponds to a respective one of the plurality of classes.

In other features, a first set of pool data structures corresponds to a message object type. A second set of pool data structures corresponds to an array object type. In other features, a set of pool data structures of the plurality of pool data structures corresponds one-to-one to array sizes. The second pool data structure is further identified according to a requested size of the new object. In other features, the second pool structure is identified by searching through a subset of the set of pool data structures that correspond to array sizes greater than or equal to the requested size.

In other features, the second pool structure is identified such that no other pool data structures of the set of pool data structures meet all three of the following criteria: the corresponding array size of the other pool data structure is smaller than the corresponding array size of the second pool structure, the corresponding array size of the other pool data structure is greater than or equal to the requested size, and the linked list associated with the other pool data structure is non-empty. In other features, a set of pool data structures of the plurality of pool data structures corresponds one-to-one to processing threads. The second pool data structure is further identified according to an identity of a presently executing processing thread.

In other features, clearing the head object comprises iterating through top-level entries of the head object and setting a flag for each of the entries to indicate that valid data is absent. In other features, the top-level entries of the head object are stored in an array. Iterating through top-level entries of the head object includes iterating through an array of the top-level entries of the head object. In other features, setting the flag for each entry of the entries includes setting a Boolean value of the entry to false. In other features, clearing the head object is performed as the head object is recycled.

A method includes maintaining a plurality of pool data structures. Each pool data structure of the plurality of pool data structures is associated with a respective linked list of objects and includes a head pointer configured to point to a first element in the linked list of objects. The method includes, in response to a first object no longer being needed, recycling the first object by identifying a first pool data structure, from the plurality of pool data structures, that corresponds to the first object and inserting the first object into a beginning position of the linked list associated with the first pool data structure without deallocating the memory for the first object. The method includes, in response to a request for a new object from a requestor: identifying a second pool data structure from the plurality of pool data structures according to a feature of the new object and determining whether the linked list associated with the second pool data structure is empty. The method includes, in response to the linked list not being empty: allocating memory for the new object, assigning the new object to the second pool data structure, and returning the new object to the requestor. The method includes, in response to the linked list not being empty: selecting a head object from the linked list, removing the head object from the linked list, and returning the head object to the requestor as the new object. A state of the head object is cleared prior to the head object being returned.

In other features, the first pool data structure is identified based on a data field of the first object. In other features, the data field is an object reference to the first pool data structure. In other features, each pool data structure of the plurality of pool data structures is associated with a unique identifier. The data field stores the unique identifier associated with the first pool data structure. In other features, inserting the first object into a beginning position of the linked list includes: reading the head pointer of the first pool data structure, configuring a pointer of the first element to be equal to the head pointer of the first pool data structure, and selectively updating the head pointer of the first pool data structure to point to the first object.

In other features, selectively updating the head pointer is an atomic operation performed only in response to the head pointer still being equal to the pointer of the first object. In other features, selecting the head object includes reading the head pointer of the second pool data structure and identifying a target of the head pointer as the head object. Removing the head object from the linked list includes reading a pointer value of the head object and selectively updating the head pointer of the first pool data structure to be equal to the pointer value. In other features, selectively updating the head pointer is an atomic operation performed only in response to the head pointer still pointing to the head object.

In other features, the determining whether the linked list associated with the second pool data structure is empty is based on the head pointer of the second pool data structure such that the head pointer being null indicates the linked list is empty. In other features, the plurality of pool data structures includes a plurality of sets of pool data structures. Each of the plurality of sets of pool data structures corresponds to a respective object type. In other features, the object is an instantiation of a first class of a plurality of classes. The plurality of pool data structures includes a plurality of sets of pool data structures. Each of the plurality of sets of pool data structures corresponds to a respective one of the plurality of classes.

In other features, a first set of pool data structures corresponds to a message object type. A second set of pool data structures corresponds to an array object type. In other features, a set of pool data structures of the plurality of pool data structures corresponds one-to-one to array sizes. The second pool data structure is further identified according to a requested size of the new object. In other features, the second pool structure is identified by searching through a subset of the set of pool data structures that correspond to array sizes greater than or equal to the requested size.

In other features, the second pool structure is identified such that no other pool data structures of the set of pool data structures meet all three of the following criteria: the corresponding array size of the other pool data structure is smaller than the corresponding array size of the second pool structure, the corresponding array size of the other pool data structure is greater than or equal to the requested size, and the linked list associated with the other pool data structure is non-empty. In other features, a set of pool data structures of the plurality of pool data structures corresponds one-to-one to processing threads. The second pool data structure is further identified according to an identity of a presently executing processing thread.

In other features, clearing the head object comprises iterating through top-level entries of the head object and setting a flag for each of the entries to indicate that valid data is absent. In other features, the top-level entries of the head object are stored in an array. Iterating through top-level entries of the head object includes iterating through an array of the top-level entries of the head object. In other features, setting the flag for each entry of the entries includes setting a Boolean value of the entry to false. In other features, clearing the head object is performed as the head object is recycled.

Message Object Traversal

A communications system includes memory hardware configured to store instructions and processing hardware configured to execute the instructions stored by the memory hardware. The instructions include maintaining a message object that includes an array of entries and a head pointer to a first active entry of the array of entries. Each entry of the array of entries includes a field identifier, a data type, and a next entry pointer. The head pointer and the series of next entry pointers establish a linked list of entries. The instructions include, in response to a request to add a new entry to the message object, calculating an index of the array of entries based on a field identifier of the new entry and determining whether an active entry is present at the calculated index in the array of entries. The instructions include, in response to the entry at the calculated index in the array of entries being inactive: writing a data type of the new entry, the field identifier of the new entry, and a data value of the new entry to the entry at the calculated index in the array of entries, and inserting the new entry into the linked list of entries. The instructions include, in response to the entry at the calculated index in the array of entries being active, selectively expanding the size of the array of entries and repeating the calculating and determining.

In other features, the selectively expanding and repeating is only performed when the field identifier of the new entry diverges from a field identifier of the entry at the calculated index in the array of entries. In other features, the instructions include, in response to the entry at the calculated index in the array of entries being active and the field identifier of the new entry equaling a field identifier of the entry at the calculated index in the array of entries, replacing a data value of the entry at the calculated index in the array of entries with the data value of the new entry. In other features, the instructions include, after expanding the size of the array of entries and repeating the calculating and determining, in response to the entry at the calculated index in the array of entries still being active, selectively repeating the expanding the size of the array of entries.

In other features, expanding the size of the array of entries includes allocating a new array and copying active entries from the array of entries into the new array. In other features, for each active entry copied over, an index into the new array is recalculated based on the field identifier of the entry. In other features, the index of the array of entries is calculated based on a hash of the field identifier of the new entry. In other features, N is the size of the array of entries. The hash is a modulo N operation.

In other features, expanding the size of the array of entries comprises doubling the size of the array of entries. In other features, each entry of the array of entries includes a data value. In other features, for each entry of the array of entries, a size of the data value is based on the data type of the entry. In other features, each entry of the array of entries includes a Boolean flag indicating whether the entry is active or not. In other features, the message object comprises a token. The token signifies a set of field identifiers present in the message object.

In other features, the communications system includes parsing the message object according to the token by determining the set of fields according to the token and, for each field identifier of the set of field identifiers, calculating an index into the array of entries based on the field identifier and accessing a data value of the entry located at the index in the array of entries. In other features, the communications system includes parsing the message object by traversing the head pointer to select a first active entry in the array of entries, accessing a data value of the selected entry, and repeatedly following a next entry pointer of the selected entry to select another entry and accessing a data value of the selected entry until the selected entry is a final entry in the linked list.

In other features, the selected entry is determined to be the final entry in the linked list in response to the next active pointer of the selected entry. In other features, the selected entry is determined to be the final entry in the linked list in response to the next active pointer of the selected entry being null. In other features, the instructions include, in response to the data type of the new entry being an array, obtaining an array object. The array object comprises a length value and a backing array. The instructions include, in response to a count of elements of the new entry exceeding a size of the backing array, releasing the backing array, allocating a new backing array that is larger than the backing array, setting the length value to the count of elements of the new entry, and storing the elements of the new entry into the new backing array. The instructions include, in response to the count of elements of the new entry being less than or equal to the size of the backing array, setting the length value to the count of elements of the new entry, and storing the elements of the new entry into the backing array.

In other features, the new backing array is twice as long as the backing array. In other features, the instructions include, in response to a request to add elements to the array, in response to a total count of elements, including the added elements, exceeding the size of the backing array: allocating a new backing array that is larger than the backing array, copying elements, up to the length value, of the backing array into the new backing array, setting the length value to the total count of elements, storing the added elements into the new backing array, and releasing the backing array. The instructions include, in response to the count of elements of the new entry being less than or equal to the size of the backing array, setting the length value to the count of elements of the new entry and storing the elements of the new entry into the backing array.

A non-transitory computer-readable medium stores instructions including maintaining a message object that includes an array of entries and a head pointer to a first active entry of the array of entries. Each entry of the array of entries includes a field identifier, a data type, and a next entry pointer. The head pointer and the series of next entry pointers establish a linked list of entries. The instructions include, in response to a request to add a new entry to the message object, calculating an index of the array of entries based on a field identifier of the new entry and determining whether an active entry is present at the calculated index in the array of entries. The instructions include, in response to the entry at the calculated index in the array of entries being inactive: writing a data type of the new entry, the field identifier of the new entry, and a data value of the new entry to the entry at the calculated index in the array of entries, and inserting the new entry into the linked list of entries. The instructions include, in response to the entry at the calculated index in the array of entries being active, selectively expanding the size of the array of entries and repeating the calculating and determining.

In other features, the selectively expanding and repeating is only performed when the field identifier of the new entry diverges from a field identifier of the entry at the calculated index in the array of entries. In other features, the instructions include, in response to the entry at the calculated index in the array of entries being active and the field identifier of the new entry equaling a field identifier of the entry at the calculated index in the array of entries, replacing a data value of the entry at the calculated index in the array of entries with the data value of the new entry. In other features, the instructions include, after expanding the size of the array of entries and repeating the calculating and determining, in response to the entry at the calculated index in the array of entries still being active, selectively repeating the expanding the size of the array of entries.

In other features, expanding the size of the array of entries includes allocating a new array and copying active entries from the array of entries into the new array. In other features, for each active entry copied over, an index into the new array is recalculated based on the field identifier of the entry. In other features, the index of the array of entries is calculated based on a hash of the field identifier of the new entry. In other features, N is the size of the array of entries. The hash is a modulo N operation.

In other features, expanding the size of the array of entries comprises doubling the size of the array of entries. In other features, each entry of the array of entries includes a data value. In other features, for each entry of the array of entries, a size of the data value is based on the data type of the entry. In other features, each entry of the array of entries includes a Boolean flag indicating whether the entry is active or not. In other features, the message object comprises a token. The token signifies a set of field identifiers present in the message object.

In other features, the instructions include parsing the message object according to the token by determining the set of fields according to the token and, for each field identifier of the set of field identifiers, calculating an index into the array of entries based on the field identifier and accessing a data value of the entry located at the index in the array of entries. In other features, the instructions include parsing the message object by traversing the head pointer to select a first active entry in the array of entries, accessing a data value of the selected entry, and repeatedly following a next entry pointer of the selected entry to select another entry and accessing a data value of the selected entry until the selected entry is a final entry in the linked list.

In other features, the selected entry is determined to be the final entry in the linked list in response to the next active pointer of the selected entry. In other features, the selected entry is determined to be the final entry in the linked list in response to the next active pointer of the selected entry being null. In other features, the instructions include, in response to the data type of the new entry being an array, obtaining an array object. The array object comprises a length value and a backing array. The instructions include, in response to a count of elements of the new entry exceeding a size of the backing array, releasing the backing array, allocating a new backing array that is larger than the backing array, setting the length value to the count of elements of the new entry, and storing the elements of the new entry into the new backing array. The instructions include, in response to the count of elements of the new entry being less than or equal to the size of the backing array, setting the length value to the count of elements of the new entry, and storing the elements of the new entry into the backing array.

In other features, the new backing array is twice as long as the backing array. In other features, the instructions include, in response to a request to add elements to the array, in response to a total count of elements, including the added elements, exceeding the size of the backing array: allocating a new backing array that is larger than the backing array, copying elements, up to the length value, of the backing array into the new backing array, setting the length value to the total count of elements, storing the added elements into the new backing array, and releasing the backing array. The instructions include, in response to the count of elements of the new entry being less than or equal to the size of the backing array, setting the length value to the count of elements of the new entry and storing the elements of the new entry into the backing array.

A method includes maintaining a message object that includes an array of entries and a head pointer to a first active entry of the array of entries. Each entry of the array of entries includes a field identifier, a data type, and a next entry pointer. The head pointer and the series of next entry pointers establish a linked list of entries. The method includes, in response to a request to add a new entry to the message object, calculating an index of the array of entries based on a field identifier of the new entry and determining whether an active entry is present at the calculated index in the array of entries. The method includes, in response to the entry at the calculated index in the array of entries being inactive: writing a data type of the new entry, the field identifier of the new entry, and a data value of the new entry to the entry at the calculated index in the array of entries, and inserting the new entry into the linked list of entries. The method includes, in response to the entry at the calculated index in the array of entries being active, selectively expanding the size of the array of entries and repeating the calculating and determining.

In other features, the selectively expanding and repeating is only performed when the field identifier of the new entry diverges from a field identifier of the entry at the calculated index in the array of entries. In other features, the method includes, in response to the entry at the calculated index in the array of entries being active and the field identifier of the new entry equaling a field identifier of the entry at the calculated index in the array of entries, replacing a data value of the entry at the calculated index in the array of entries with the data value of the new entry. In other features, the method includes, after expanding the size of the array of entries and repeating the calculating and determining, in response to the entry at the calculated index in the array of entries still being active, selectively repeating the expanding the size of the array of entries.

In other features, expanding the size of the array of entries includes allocating a new array and copying active entries from the array of entries into the new array. In other features, for each active entry copied over, an index into the new array is recalculated based on the field identifier of the entry. In other features, the index of the array of entries is calculated based on a hash of the field identifier of the new entry. In other features, N is the size of the array of entries. The hash is a modulo N operation.

In other features, expanding the size of the array of entries comprises doubling the size of the array of entries. In other features, each entry of the array of entries includes a data value. In other features, for each entry of the array of entries, a size of the data value is based on the data type of the entry. In other features, each entry of the array of entries includes a Boolean flag indicating whether the entry is active or not. In other features, the message object comprises a token. The token signifies a set of field identifiers present in the message object.

In other features, the method includes parsing the message object according to the token by determining the set of fields according to the token and, for each field identifier of the set of field identifiers, calculating an index into the array of entries based on the field identifier and accessing a data value of the entry located at the index in the array of entries. In other features, the method includes parsing the message object by traversing the head pointer to select a first active entry in the array of entries, accessing a data value of the selected entry, and repeatedly following a next entry pointer of the selected entry to select another entry and accessing a data value of the selected entry until the selected entry is a final entry in the linked list.

In other features, the selected entry is determined to be the final entry in the linked list in response to the next active pointer of the selected entry. In other features, the selected entry is determined to be the final entry in the linked list in response to the next active pointer of the selected entry being null. In other features, the method includes, in response to the data type of the new entry being an array, obtaining an array object. The array object comprises a length value and a backing array. The method includes, in response to a count of elements of the new entry exceeding a size of the backing array, releasing the backing array, allocating a new backing array that is larger than the backing array, setting the length value to the count of elements of the new entry, and storing the elements of the new entry into the new backing array. The method includes, in response to the count of elements of the new entry being less than or equal to the size of the backing array, setting the length value to the count of elements of the new entry, and storing the elements of the new entry into the backing array.

In other features, the new backing array is twice as long as the backing array. In other features, the method includes, in response to a request to add elements to the array, in response to a total count of elements, including the added elements, exceeding the size of the backing array: allocating a new backing array that is larger than the backing array, copying elements, up to the length value, of the backing array into the new backing array, setting the length value to the total count of elements, storing the added elements into the new backing array, and releasing the backing array. The method includes, in response to the count of elements of the new entry being less than or equal to the size of the backing array, setting the length value to the count of elements of the new entry and storing the elements of the new entry into the backing array.

Immutable Object Handling

A computationally-efficient object conversion system includes memory hardware configured to store instructions and processing hardware configured to execute the instructions stored by the memory hardware. The instructions include maintaining a plurality of objects. Each object of the plurality of objects includes an array of characters and a hash value. The instructions include maintaining a plurality of strings in a one-to-one relationship with the plurality of objects. The instructions include, for each object of the plurality of objects, calculating the hash value in response to values being written to the array of characters of the object. The instructions include defining an equals method that, for first and second objects of the plurality of objects, returns a true value in response to values of the array of characters of the first object matching values of the array of characters of the second object. The instructions include defining a hash method that, for a selected object of the plurality of objects, returns the hash value of the selected object. The instructions include, in response to a request including a request string, determining whether one of the plurality of strings is equal to the request string and, in response to determining that one of the plurality of strings is equal to the request string, returning the object of the plurality of objects related to the one of the plurality of strings.

In other features, the system includes, in response to the request and further in response to determining that none of the plurality of objects corresponds to the request string: adding a new object to the plurality of objects, writing values to the array of characters of the new object based on the string, adding the request string to the plurality of strings, relating the request string in the plurality of strings to the new object in the plurality of objects, and returning the new object. In other features, the system includes maintaining a data store of key-value pairs including the plurality of objects as the values and the plurality of strings as the keys. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16. In other features, returning the one of the plurality of objects includes returning a reference to the one of the plurality of objects.

A computationally-efficient object conversion system includes memory hardware configured to store instructions and processing hardware configured to execute the instructions stored by the memory hardware. The instructions include maintaining a plurality of objects. Each object of the plurality of objects includes an array of characters and a hash value. The instructions include maintaining a plurality of strings in a one-to-one relationship with the plurality of objects. The instructions include, for each object of the plurality of objects, calculating the hash value in response to values being written to the array of characters of the object. The instructions include defining an equals method that, for first and second objects of the plurality of objects, returns a true value in response to values of the array of characters of the first object matching values of the array of characters of the second object. The instructions include defining a hash method that, for a selected object of the plurality of objects, returns the hash value of the selected object. The instructions include, in response to a request including a request object: using the equals method, determining whether one of the plurality of objects is equal to the request object and, in response to determining that one of the plurality of objects equals the request object, returning the string from the plurality of strings that is related to the one of the plurality of objects.

In other features, the system includes, in response to the request and further in response to determining that none of the plurality of objects equals the request object: adding a new object to the plurality of objects, writing values to the array of characters of the new object based on the request object, converting the request object into a new string, adding the new string to the plurality of strings, and returning the new string. In other features, the system includes maintaining a data store of key-value pairs including the plurality of objects as the keys and the plurality of strings as the values. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16.

A non-transitory computer-readable medium stores instructions including maintaining a plurality of objects. Each object of the plurality of objects includes an array of characters and a hash value. The instructions include maintaining a plurality of strings in a one-to-one relationship with the plurality of objects. The instructions include, for each object of the plurality of objects, calculating the hash value in response to values being written to the array of characters of the object. The instructions include defining an equals method that, for first and second objects of the plurality of objects, returns a true value in response to values of the array of characters of the first object matching values of the array of characters of the second object. The instructions include defining a hash method that, for a selected object of the plurality of objects, returns the hash value of the selected object. The instructions include, in response to a request including a request string, determining whether one of the plurality of strings is equal to the request string and, in response to determining that one of the plurality of strings is equal to the request string, returning the object of the plurality of objects related to the one of the plurality of strings.

In other features, the instructions include, in response to the request and further in response to determining that none of the plurality of objects corresponds to the request string: adding a new object to the plurality of objects, writing values to the array of characters of the new object based on the string, adding the request string to the plurality of strings, relating the request string in the plurality of strings to the new object in the plurality of objects, and returning the new object. In other features, the instructions include maintaining a data store of key-value pairs including the plurality of objects as the values and the plurality of strings as the keys. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16. In other features, returning the one of the plurality of objects includes returning a reference to the one of the plurality of objects.

A non-transitory computer-readable medium stores instructions including maintaining a plurality of objects. Each object of the plurality of objects includes an array of characters and a hash value. The instructions include maintaining a plurality of strings in a one-to-one relationship with the plurality of objects. The instructions include, for each object of the plurality of objects, calculating the hash value in response to values being written to the array of characters of the object. The instructions include defining an equals method that, for first and second objects of the plurality of objects, returns a true value in response to values of the array of characters of the first object matching values of the array of characters of the second object. The instructions include defining a hash method that, for a selected object of the plurality of objects, returns the hash value of the selected object. The instructions include, in response to a request including a request object: using the equals method, determining whether one of the plurality of objects is equal to the request object and, in response to determining that one of the plurality of objects equals the request object, returning the string from the plurality of strings that is related to the one of the plurality of objects.

In other features, the instructions include, in response to the request and further in response to determining that none of the plurality of objects equals the request object: adding a new object to the plurality of objects, writing values to the array of characters of the new object based on the request object, converting the request object into a new string, adding the new string to the plurality of strings, and returning the new string. In other features, the instructions include maintaining a data store of key-value pairs including the plurality of objects as the keys and the plurality of strings as the values. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16.

A method includes maintaining a plurality of objects. Each object of the plurality of objects includes an array of characters and a hash value. The method includes maintaining a plurality of strings in a one-to-one relationship with the plurality of objects. The method includes, for each object of the plurality of objects, calculating the hash value in response to values being written to the array of characters of the object. The method includes defining an equals method that, for first and second objects of the plurality of objects, returns a true value in response to values of the array of characters of the first object matching values of the array of characters of the second object. The method includes defining a hash method that, for a selected object of the plurality of objects, returns the hash value of the selected object. The method includes, in response to a request including a request string, determining whether one of the plurality of strings is equal to the request string and, in response to determining that one of the plurality of strings is equal to the request string, returning the object of the plurality of objects related to the one of the plurality of strings.

In other features, the system includes, in response to the request and further in response to determining that none of the plurality of objects corresponds to the request string: adding a new object to the plurality of objects, writing values to the array of characters of the new object based on the string, adding the request string to the plurality of strings, relating the request string in the plurality of strings to the new object in the plurality of objects, and returning the new object. In other features, the system includes maintaining a data store of key-value pairs including the plurality of objects as the values and the plurality of strings as the keys. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16. In other features, returning the one of the plurality of objects includes returning a reference to the one of the plurality of objects.

A method includes maintaining a plurality of objects. Each object of the plurality of objects includes an array of characters and a hash value. The method includes maintaining a plurality of strings in a one-to-one relationship with the plurality of objects. The method includes, for each object of the plurality of objects, calculating the hash value in response to values being written to the array of characters of the object. The method includes defining an equals method that, for first and second objects of the plurality of objects, returns a true value in response to values of the array of characters of the first object matching values of the array of characters of the second object. The method includes defining a hash method that, for a selected object of the plurality of objects, returns the hash value of the selected object. The method includes, in response to a request including a request object: using the equals method, determining whether one of the plurality of objects is equal to the request object and, in response to determining that one of the plurality of objects equals the request object, returning the string from the plurality of strings that is related to the one of the plurality of objects.

In other features, the system includes, in response to the request and further in response to determining that none of the plurality of objects equals the request object: adding a new object to the plurality of objects, writing values to the array of characters of the new object based on the request object, converting the request object into a new string, adding the new string to the plurality of strings, and returning the new string. In other features, the system includes maintaining a data store of key-value pairs including the plurality of objects as the keys and the plurality of strings as the values. In other features, the data store is implemented as a hashmap.

In other features, each object of the plurality of objects includes a length value. The equals method, for the first and second objects, returns a false value in response to the length value of the first object not matching the length value of the second object. In other features, the equals method, for the first and second objects, ignores values of the array of characters of the first object having indices greater than the length value of the first object and ignores values of the array of characters of the second object having indices greater than the length value of the second object. In other features, each of the characters is encoded as a signed byte or according to one of UTF-8 and UTF-16.

Encoder Parsing

A computationally-efficient encoding system for encoding a message object includes memory hardware configured to store instructions and processing hardware configured to execute the instructions stored by the memory hardware. The instructions include determining a token of the message object. The token uniquely identifies a structure of the message object. The instructions include obtaining a dictionary definition based on the token. The dictionary definition describes the structure of the message. The message includes a plurality of entries. Each of the plurality of entries is characterized by a data type and a field identifier. The dictionary definition defines an order of the plurality of entries. The instructions include, according to an order specified by the dictionary definition, selecting each entry of a plurality of entries in the message in sequence and writing the entry to a byte queue exclusive of the data type and the field identifier. The instructions include initiating transmission of the byte queue over a communications network.

In other features, the writing the entry to the byte queue includes, in response to the entry being one of a set of primitive data types, writing a value of the entry to the byte queue. In other features, the set of primitive data types includes Boolean, byte, char, short, int, long, float, and double. In other features, the writing the entry to the byte queue includes, in response to the entry being an array, writing a length of the array to the byte queue exclusive of a data type of the array and writing each element of the array to the byte queue.

In other features, the writing the entry to the byte queue includes, in response to the entry being a nested message, recursively performing the selecting and writing for entries in the nested message. In other features, the dictionary definition defines, for each of the plurality of entries, a data type. The dictionary definition defines, for each of the plurality of entries, a field identifier. In other features, the system includes storing a plurality of dictionary entries having a one-to-one relationship with a plurality of tokens. In other features, the system includes synchronizing the plurality of dictionary entries with a dictionary server over the communications network.

In other features, initiating transmission of the byte queue includes, in response to the byte queue having a length less than or equal to a threshold, sending the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending the obtained bytes to the networking stack for transmission as a packet. In other features, the sending the obtained bytes to the networking stack includes sending a total packet count as well as a current packet number to the networking stack. In other features, the packet is one of a user datagram protocol (UDP) datagram and a transmission control protocol (TCP) segment.

In other features, in response to a transmission mode being user datagram protocol (UDP), initiating transmission of the byte queue includes, in response to the byte queue having a length less than or equal to a threshold, sending first header data and the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending second header data and the obtained bytes to the networking stack for transmission as a packet. The first header data has a different length than the second header data. The first header data includes a fixed value indicating that an entirety of the message is contained in the packet.

In other features, the first header data is a single byte. The first header data consists of the fixed value. In other features, the second header data includes an identifier of the message, a total number of packets, and a serial number of the packet with respect to the total number of packets. In other features, the threshold is based on a difference between (i) a largest UDP data payload available throughout the communications network and (ii) the length of the first header data. In other features, in response to the transmission mode being user datagram protocol (UDP), initiating transmission of the byte queue includes: in response to the length of the byte queue being less than or equal to the threshold, freeing the byte queue for reuse immediately upon sending the byte queue to the networking stack; and in response to the length of the byte queue exceeding the threshold, retaining the byte queue for a defined re-request time before freeing the byte queue for reuse.

In other features, the system is configured to operate in two selectable modes. The two selectable modes include a dictionary mode and a plenary mode. The instructions include, in the plenary mode, according to an order established by the structure of the message object, selecting each entry of the plurality of entries in the message in sequence and, for that entry, writing the data type of the entry to the byte queue, writing the field identifier of the entry to the byte queue, and writing the entry to the byte queue. In other features, the order in the plenary mode is established by a linked list of the plurality of entries. In other features, the message object includes a head pointer pointing to a first one of the plurality of entries. Each of the plurality of entries has a next pointer to indicate a next entry in the linked list.

A computationally-efficient encoding method for encoding a message object includes determining a token of the message object. The token uniquely identifies a structure of the message object. The method includes obtaining a dictionary definition based on the token. The dictionary definition describes the structure of the message. The message includes a plurality of entries. Each of the plurality of entries is characterized by a data type and a field identifier. The dictionary definition defines an order of the plurality of entries. The method includes, according to an order specified by the dictionary definition, selecting each entry of a plurality of entries in the message in sequence and writing the entry to a byte queue exclusive of the data type and the field identifier. The method includes initiating transmission of the byte queue over a communications network.

In other features, the writing the entry to the byte queue includes, in response to the entry being one of a set of primitive data types, writing a value of the entry to the byte queue. In other features, the set of primitive data types includes Boolean, byte, char, short, int, long, float, and double. In other features, the writing the entry to the byte queue includes, in response to the entry being an array, writing a length of the array to the byte queue exclusive of a data type of the array and writing each element of the array to the byte queue.

In other features, the writing the entry to the byte queue includes, in response to the entry being a nested message, recursively performing the selecting and writing for entries in the nested message. In other features, the dictionary definition defines, for each of the plurality of entries, a data type. The dictionary definition defines, for each of the plurality of entries, a field identifier. In other features, the method includes storing a plurality of dictionary entries having a one-to-one relationship with a plurality of tokens. In other features, the method includes synchronizing the plurality of dictionary entries with a dictionary server over the communications network.

In other features, initiating transmission of the byte queue includes, in response to the byte queue having a length less than or equal to a threshold, sending the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending the obtained bytes to the networking stack for transmission as a packet. In other features, the sending the obtained bytes to the networking stack includes sending a total packet count as well as a current packet number to the networking stack. In other features, the packet is one of a user datagram protocol (UDP) datagram and a transmission control protocol (TCP) segment.

In other features, in response to a transmission mode being user datagram protocol (UDP), initiating transmission of the byte queue includes, in response to the byte queue having a length less than or equal to a threshold, sending first header data and the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending second header data and the obtained bytes to the networking stack for transmission as a packet. The first header data has a different length than the second header data. The first header data includes a fixed value indicating that an entirety of the message is contained in the packet.

In other features, the first header data is a single byte. The first header data consists of the fixed value. In other features, the second header data includes an identifier of the message, a total number of packets, and a serial number of the packet with respect to the total number of packets. In other features, the threshold is based on a difference between (i) a largest UDP data payload available throughout the communications network and (ii) the length of the first header data. In other features, in response to the transmission mode being user datagram protocol (UDP), initiating transmission of the byte queue includes: in response to the length of the byte queue being less than or equal to the threshold, freeing the byte queue for reuse immediately upon sending the byte queue to the networking stack; and in response to the length of the byte queue exceeding the threshold, retaining the byte queue for a defined re-request time before freeing the byte queue for reuse.

In other features, the method is configured to operate in two selectable modes. The two selectable modes include a dictionary mode and a plenary mode. The method includes, in the plenary mode, according to an order established by the structure of the message object, selecting each entry of the plurality of entries in the message in sequence and, for that entry, writing the data type of the entry to the byte queue, writing the field identifier of the entry to the byte queue, and writing the entry to the byte queue. In other features, the order in the plenary mode is established by a linked list of the plurality of entries. In other features, the message object includes a head pointer pointing to a first one of the plurality of entries. Each of the plurality of entries has a next pointer to indicate a next entry in the linked list.

A non-transitory computer-readable medium stores instructions including determining a token of the message object. The token uniquely identifies a structure of the message object. The instructions include obtaining a dictionary definition based on the token. The dictionary definition describes the structure of the message. The message includes a plurality of entries. Each of the plurality of entries is characterized by a data type and a field identifier. The dictionary definition defines an order of the plurality of entries. The instructions include, according to an order specified by the dictionary definition, selecting each entry of a plurality of entries in the message in sequence and writing the entry to a byte queue exclusive of the data type and the field identifier. The instructions include initiating transmission of the byte queue over a communications network.

In other features, the writing the entry to the byte queue includes, in response to the entry being one of a set of primitive data types, writing a value of the entry to the byte queue. In other features, the set of primitive data types includes Boolean, byte, char, short, int, long, float, and double. In other features, the writing the entry to the byte queue includes, in response to the entry being an array, writing a length of the array to the byte queue exclusive of a data type of the array and writing each element of the array to the byte queue.

In other features, the writing the entry to the byte queue includes, in response to the entry being a nested message, recursively performing the selecting and writing for entries in the nested message. In other features, the dictionary definition defines, for each of the plurality of entries, a data type. The dictionary definition defines, for each of the plurality of entries, a field identifier. In other features, the instructions includes storing a plurality of dictionary entries having a one-to-one relationship with a plurality of tokens. In other features, the instructions include synchronizing the plurality of dictionary entries with a dictionary server over the communications network.

In other features, initiating transmission of the byte queue includes, in response to the byte queue having a length less than or equal to a threshold, sending the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending the obtained bytes to the networking stack for transmission as a packet. In other features, the sending the obtained bytes to the networking stack includes sending a total packet count as well as a current packet number to the networking stack. In other features, the packet is one of a user datagram protocol (UDP) datagram and a transmission control protocol (TCP) segment.

In other features, in response to a transmission mode being user datagram protocol (UDP), initiating transmission of the byte queue includes, in response to the byte queue having a length less than or equal to a threshold, sending first header data and the byte queue to a networking stack for transmission as a packet. Initiating transmission includes, in response to the length of the byte queue exceeding the threshold, iteratively obtaining, without replacement, a number of bytes less than or equal to the threshold from the byte queue, and sending second header data and the obtained bytes to the networking stack for transmission as a packet. The first header data has a different length than the second header data. The first header data includes a fixed value indicating that an entirety of the message is contained in the packet.

In other features, the first header data is a single byte. The first header data consists of the fixed value. In other features, the second header data includes an identifier of the message, a total number of packets, and a serial number of the packet with respect to the total number of packets. In other features, the threshold is based on a difference between (i) a largest UDP data payload available throughout the communications network and (ii) the length of the first header data. In other features, in response to the transmission mode being user datagram protocol (UDP), initiating transmission of the byte queue includes: in response to the length of the byte queue being less than or equal to the threshold, freeing the byte queue for reuse immediately upon sending the byte queue to the networking stack; and in response to the length of the byte queue exceeding the threshold, retaining the byte queue for a defined re-request time before freeing the byte queue for reuse.

In other features, the instructions include providing two selectable modes. The two selectable modes include a dictionary mode and a plenary mode. The instructions include, in the plenary mode, according to an order established by the structure of the message object, selecting each entry of the plurality of entries in the message in sequence and, for that entry, writing the data type of the entry to the byte queue, writing the field identifier of the entry to the byte queue, and writing the entry to the byte queue. In other features, the order in the plenary mode is established by a linked list of the plurality of entries. In other features, the message object includes a head pointer pointing to a first one of the plurality of entries. Each of the plurality of entries has a next pointer to indicate a next entry in the linked list.

Decoder Parsing

A decoding system for recovering a message object from a byte queue received over a communications network includes memory hardware configured to store instructions and processing hardware configured to execute the instructions stored by the memory hardware. The instructions include reading a token of the message object from the byte queue. The token uniquely identifies a structure of the message object. The instructions include obtaining a dictionary definition based on the token. The dictionary definition defines a plurality of entries in a defined order including, for each entry of the plurality of entries, a data type and a field identifier. The instructions include iterating over the dictionary definition in the defined order and, for each entry of the plurality of entries, reading a number of bytes from the byte queue, selecting an entry of the message object according to the field identifier of the entry, and writing the number of bytes to the selected entry of the message object. The number is defined by the data type of the entry.

In other features, the iterating includes, for each entry of the plurality of entries, writing the data type of the entry to the selected entry. In other features, the iterating includes, for each entry of the plurality of entries, writing the field identifier of the entry to the selected entry. In other features, the iterating includes, for each entry of the plurality of entries, setting a flag for the selected entry to indicate valid data is present. In other features, the writing the number of bytes to the selected entry of the message object includes, in response to the selected entry being a nested message, recursively performing the iterating for entries in the nested message. In other features, the system includes storing a plurality of dictionary entries having a one-to-one relationship with a plurality of tokens.

In other features, the system includes synchronizing the plurality of dictionary entries with a dictionary server over the communications network. In other features, the instructions include, for user datagram protocol (UDP) communication, determining whether a received packet is only part of the message object. The instructions include, in response to determining that the received packet is only part of the message object, copying the received packet to a multi-packet data structure. The instructions include encoding a total number of packets in the multi-packet data structure. The instructions include, in response to the total number of packets being copied to the multi-packet data structure, copying each portion of the multi-packet data structure, in packet order, into the byte queue returning the multi-packet data structure to an inactive status, and initiating the reading, the obtaining, and the iterating on the byte queue.

In other features, the instructions include, for user datagram protocol (UDP) communication, selectively identifying a moribund multi-packet data structure that has received no additional packets for a first threshold period of time; and, in response to identifying the moribund multi-packet data structure, sending a retransmit request to a transmission source of the packets in the moribund multi-packet data structure. In other features, the retransmit request identifies specific packet numbers missing from the moribund multi-packet data structure. The instructions include, for user datagram protocol (UDP) communication, selectively identifying an expired multi-packet data structure that has received no additional packets for a second threshold period of time. The second threshold period of time is longer than the first threshold period of time. The instructions include, in response to identifying the expired multi-packet data structure, returning the expired multi-packet data structure to an inactive status.

In other features, the system is configured to operate in two selectable modes. The two selectable modes include a dictionary mode and a plenary mode. The instructions include, in the plenary mode, reading a field identifier and a data type from the byte queue, selecting an entry of the message object according to the field identifier, copying a number of bytes from the byte queue to the selected entry of the message object, and repeating the reading, selecting, and copying until the byte queue is exhausted. The number is defined by the data type. In other features, the instructions include, in the plenary mode, for each selected entry of the message object, setting a next pointer for the previously selected entry to point to the selected entry. In other features, in the plenary mode, the copying the number of bytes from the byte queue to the selected entry includes, in response to the data type being a nested message, recursively invoking the reading, the selecting, and the copying on the nested message.

A method for recovering a message object from a byte queue received over a communications network includes reading a token of the message object from the byte queue. The token uniquely identifies a structure of the message object. The method includes obtaining a dictionary definition based on the token. The dictionary definition defines a plurality of entries in a defined order including, for each entry of the plurality of entries, a data type and a field identifier. The method includes iterating over the dictionary definition in the defined order and, for each entry of the plurality of entries, reading a number of bytes from the byte queue, selecting an entry of the message object according to the field identifier of the entry, and writing the number of bytes to the selected entry of the message object. The number is defined by the data type of the entry.

In other features, the iterating includes, for each entry of the plurality of entries, writing the data type of the entry to the selected entry. In other features, the iterating includes, for each entry of the plurality of entries, writing the field identifier of the entry to the selected entry. In other features, the iterating includes, for each entry of the plurality of entries, setting a flag for the selected entry to indicate valid data is present. In other features, the writing the number of bytes to the selected entry of the message object includes, in response to the selected entry being a nested message, recursively performing the iterating for entries in the nested message. In other features, the method includes storing a plurality of dictionary entries having a one-to-one relationship with a plurality of tokens.

In other features, the method includes synchronizing the plurality of dictionary entries with a dictionary server over the communications network. In other features, the method includes, for user datagram protocol (UDP) communication, determining whether a received packet is only part of the message object. The method includes, in response to determining that the received packet is only part of the message object, copying the received packet to a multi-packet data structure. The method includes encoding a total number of packets in the multi-packet data structure. The method includes, in response to the total number of packets being copied to the multi-packet data structure, copying each portion of the multi-packet data structure, in packet order, into the byte queue returning the multi-packet data structure to an inactive status, and initiating the reading, the obtaining, and the iterating on the byte queue.

In other features, the method includes, for user datagram protocol (UDP) communication, selectively identifying a moribund multi-packet data structure that has received no additional packets for a first threshold period of time; and, in response to identifying the moribund multi-packet data structure, sending a retransmit request to a transmission source of the packets in the moribund multi-packet data structure. In other features, the retransmit request identifies specific packet numbers missing from the moribund multi-packet data structure. The method includes, for user datagram protocol (UDP) communication, selectively identifying an expired multi-packet data structure that has received no additional packets for a second threshold period of time. The second threshold period of time is longer than the first threshold period of time. The method includes, in response to identifying the expired multi-packet data structure, returning the expired multi-packet data structure to an inactive status.

In other features, the method includes offering two selectable modes. The two selectable modes include a dictionary mode and a plenary mode. The method includes, in the plenary mode, reading a field identifier and a data type from the byte queue, selecting an entry of the message object according to the field identifier, copying a number of bytes from the byte queue to the selected entry of the message object, and repeating the reading, selecting, and copying until the byte queue is exhausted. The number is defined by the data type. In other features, the method includes, in the plenary mode, for each selected entry of the message object, setting a next pointer for the previously selected entry to point to the selected entry. In other features, in the plenary mode, the copying the number of bytes from the byte queue to the selected entry includes, in response to the data type being a nested message, recursively invoking the reading, the selecting, and the copying on the nested message.

A non-transitory computer-readable medium stores instructions including include reading a token of the message object from the byte queue. The token uniquely identifies a structure of the message object. The instructions include obtaining a dictionary definition based on the token. The dictionary definition defines a plurality of entries in a defined order including, for each entry of the plurality of entries, a data type and a field identifier. The instructions include iterating over the dictionary definition in the defined order and, for each entry of the plurality of entries, reading a number of bytes from the byte queue, selecting an entry of the message object according to the field identifier of the entry, and writing the number of bytes to the selected entry of the message object. The number is defined by the data type of the entry.

In other features, the iterating includes, for each entry of the plurality of entries, writing the data type of the entry to the selected entry. In other features, the iterating includes, for each entry of the plurality of entries, writing the field identifier of the entry to the selected entry. In other features, the iterating includes, for each entry of the plurality of entries, setting a flag for the selected entry to indicate valid data is present. In other features, the writing the number of bytes to the selected entry of the message object includes, in response to the selected entry being a nested message, recursively performing the iterating for entries in the nested message. In other features, the instructions include storing a plurality of dictionary entries having a one-to-one relationship with a plurality of tokens.

In other features, the instructions include synchronizing the plurality of dictionary entries with a dictionary server over the communications network. In other features, the instructions include, for user datagram protocol (UDP) communication, determining whether a received packet is only part of the message object. The instructions include, in response to determining that the received packet is only part of the message object, copying the received packet to a multi-packet data structure. The instructions include encoding a total number of packets in the multi-packet data structure. The instructions include, in response to the total number of packets being copied to the multi-packet data structure, copying each portion of the multi-packet data structure, in packet order, into the byte queue returning the multi-packet data structure to an inactive status, and initiating the reading, the obtaining, and the iterating on the byte queue.

In other features, the instructions include, for user datagram protocol (UDP) communication, selectively identifying a moribund multi-packet data structure that has received no additional packets for a first threshold period of time; and, in response to identifying the moribund multi-packet data structure, sending a retransmit request to a transmission source of the packets in the moribund multi-packet data structure. In other features, the retransmit request identifies specific packet numbers missing from the moribund multi-packet data structure. The instructions include, for user datagram protocol (UDP) communication, selectively identifying an expired multi-packet data structure that has received no additional packets for a second threshold period of time. The second threshold period of time is longer than the first threshold period of time. The instructions include, in response to identifying the expired multi-packet data structure, returning the expired multi-packet data structure to an inactive status.

In other features, the instructions include offering two selectable modes. The two selectable modes include a dictionary mode and a plenary mode. The instructions include, in the plenary mode, reading a field identifier and a data type from the byte queue, selecting an entry of the message object according to the field identifier, copying a number of bytes from the byte queue to the selected entry of the message object, and repeating the reading, selecting, and copying until the byte queue is exhausted. The number is defined by the data type. In other features, the instructions include, in the plenary mode, for each selected entry of the message object, setting a next pointer for the previously selected entry to point to the selected entry. In other features, in the plenary mode, the copying the number of bytes from the byte queue to the selected entry includes, in response to the data type being a nested message, recursively invoking the reading, the selecting, and the copying on the nested message.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
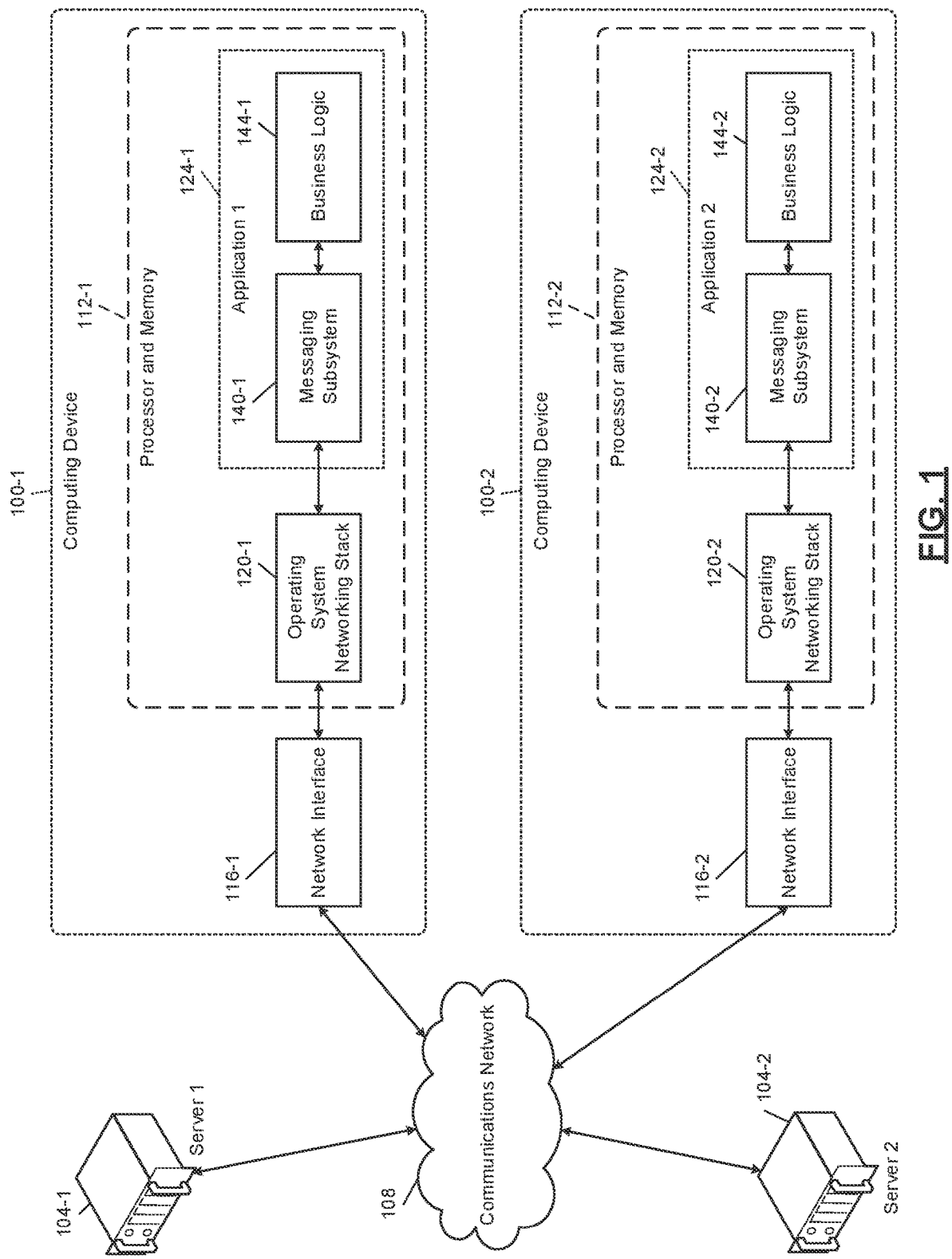
FIG. 1 is a functional block diagram of an example environment for a messaging system according to the principles of the present disclosure.

The present disclosure describes a messaging system that can be implemented with a high-level language and yet achieves performance at the level of messaging coded with a low-level language. This performance may be especially important when exchanging time-sensitive data. The present disclosure describes a variety of implementations that allow for messages to be broadcast to multiple receivers with very little overhead beyond what would be required to transmit a message to a single receiver. In this way, time-sensitive data can be distributed to many users quickly and reliably.

The structure of the message itself is designed to improve speed as well as to allow for bifurcation between the messaging infrastructure and business applications. The structure of the message may allow for messaging logic to be tuned for message performance and for business logic to be tuned to business demands.

One of the greatest impacts to performance in a high-level language is garbage collection—that is, returning unneeded memory to the operating system. Without garbage collection, the application would eventually use up all of the available memory and may, depending on factors including the design of the operating system, either cause instability of the operating system, exhaust resources to reducing system performance, or be terminated by the operating system. In low-level languages, the memory management may be done manually. While this may have better performance, it frequently leads to memory leaks, where unneeded memory is not consistently released, leading to a gradual filling of the memory by the application.

In order to take advantage of a high-level language but not suffer the performance penalties of frequent garbage collection, the present disclosure describes a new memory management system that allows for objects and memory to be recycled and reused, thereby avoiding them being subject to garbage collection. The memory management system is described below as pooling, where objects having the same or similar structures are recycled to and retrieved from a pool. To allow for multi-threaded performance, the memory management system can be implemented as thread-safe so that different threads can recycle objects.

Specific data structures are defined to overcome the limitations of various built-in data structures of high-level languages. For example, in some languages, the size of an array is fixed. To allow for dynamically sized arrays, the present disclosure describes a data structure with a dynamic size. The data structure may rely on the underlying array offered by the high-level language. With dynamically sized arrays, garbage collection operations are reduced. Similarly, in various high-level languages, strings are immutable. The present disclosure describes a mechanism for employing reusable character or byte arrays that are mapped to and from strings.

A publish/subscribe architecture that works with both transmission control protocol (TCP) and user datagram protocol (UDP) is defined for flexibility across network architectures and for different application needs. UDP may be faster for sending each message. UDP handles fan out with much less processor overhead by using multicast addresses—the network routers then handle fan out, rather than the applications. UDP does not have safety guarantees, meaning that lost messages are not re-sent, and messages do not necessarily arrive in order. The present disclosure describes various implementations that avoid the risk of non-acknowledgment storms, where a vicious circle of packets getting dropped leads to network congestion from recipients requesting re-sending, thereby increasing the likelihood that additional packets get dropped. In contrast, various implementations of the present disclosure describe specific re-request mechanisms that are triggered only when one or more packets of a multi-packet message are missing after a defined period of time.

The parameters of specific systems may mean that an optimized system will use both UDP and TCP. For example, frequently updated data being distributed with high throughput and large fan-out may use UDP. Meanwhile, the edges of the system may use TCP. So, as an example, core data may be distributed to hundreds of streaming servers via UDP. Then, the streaming servers may transmit data to hundreds of thousands of streaming clients via TCP.

Messages have to be mapped to byte arrays to be sent over the network (referred to as "externalizing" the message) and, when the byte array is received, it needs to be mapped back to a message object. This is a very processor intensive process, and is often the most significant bottleneck in messaging. Externalization of data is usually slower in the JAVA programming language than in the C programming language, because mathematical operations are extremely fast in the C programming language.

The speed of message externalization may be improved by the structure of the message object used by the high performance messaging framework according to at least some implementations. The structure of the message object may reduce or even eliminate the need to perform introspection in order to determine a state of the message object, and thus, the state of the message object may be determined relatively quickly.

The structure of the message object used by the high performance messaging framework according to at least some implementations may facilitate the use of relatively fast, lower-level bitwise operations of the high-level language to map fields of the message object onto byte arrays for externalization.

The high performance messaging framework according to at least some implementations may support "dictionary directed" externalization, which uses a dictionary shared between a sending device and a receiving device to allow some bytes of the message object to be omitted from the data that is sent from the sender device to the receiver device. This reduces the amount of system and network resources consumed to transmit the data while still allowing the receiver device to correctly parse the received data in order to reconstruct the message object.

Using some or all of the above techniques, the present disclosure allows for high-performance message exchange with the deployability, portability, maintainability, and security of a high-level language. As an example only, the performance offered by an implementation of the present disclosure may be able to send 1 million messages per second using a single thread. This performance can be sustained, unlike prior solutions that may only allow for fast bursts of transmission followed by quiescent periods to allow garbage collection to occur.

The high performance messaging framework may achieve one or more of the following goals:

1. Increasing or, alternatively, maximizing middleware efficiency so as to increase the amount of system resources available for other resource consumers such as business applications.
2. Decoupling message classes from business objects such that the business objects can be designed to be straightforward representations of application information without regard to a particular manner in which the high performance messaging framework transmits messages encapsulating the business objects.
3. Making the message classes independent from a particular transport mechanism being used such that different transport mechanisms may be swapped out with minimal disruption to the operation of the application that is using the high performance messaging framework. For example, a TCP socket implementation may be exchanged for a vendor's JAVA message system (JMS) solution orthogonally to the rest of the code.

The C programming language allows for explicit allocation and deallocation of memory from the memory heap with respect to data objects. In the JAVA programming language, allocation of memory from the memory heap is handled automatically and deallocation is handled automatically through the use of system-resource-heavy garbage collection operations. In contrast, the high performance messaging framework in various implementations may use a plurality of object pools corresponding, respectively, to a plurality of different object types in order to implement a recycling operation that explicitly places a poolable object, which is no longer in use by an application, into an object pool corresponding to the object type of the poolable object.

The poolable therefore object does not trigger a resource-heavy garbage collection operation. The poolable object, for which data has already been allocated from the memory heap, is available to be retrieved from the object pool in lieu of allocating more memory from the memory heap for a new object when the application needs a new object having a same object type as the poolable object. Further, the poolable object may already have a complicated (and sometimes nested one or more layers deep) structure that does not have to be constructed from scratch.

Illustrations

FIG. 1 shows computing devices 100-1 and 100-2 communicating with each other and/or with servers 104-1 and 104-2 via a communications network 108. The computing devices 100-1 and 100-2 may be user devices and/or servers themselves. The computing device 100-1 includes a functional block of processor and memory 112-1, which communicates with the communications network 108 via a network interface 116-1. In various implementations, functionality of the network interface 116-1 may be integrated into the processor and memory 112-1.

The processor and memory 112-1 implements an operating system networking stack 120-1 and a first application 124-1. The first application 124-1 is integrated with or invokes a messaging subsystem 140-1 according to the principles of the present disclosure. The first application 124-1 includes business logic 144-1, which generally represents the functionality of the first application 124-1 other than messaging.

The computing device 100-2 also includes a network interface 116-2 and a functional block of processor and memory 112-2, which implements an operating system networking stack 120-2 and a second application 124-2. The second application 124-2 includes business logic 144-2, which may be the same as or different than the business logic 144-1. In various implementations, the second application 124-2 may be a second instantiation of the first application 124-1, while in other implementations the second application 124-2 has a different purpose and implements different business logic. The second application 124-2 also includes a messaging subsystem 140-2, which may be a copy of the messaging subsystem 140-1. While shown within the first application 124-1, the messaging subsystem 140-1 may be external to the first application 24-1: for example, implemented as a shared library or operating system service.

The communications network 108 includes a distributed communications system such as the Internet. The computing device 100-1 may be a personal computer running an operating system such as the Linux operating system from Linus Torvalds, the MacOS operating system from Apple Inc., or the Windows operating system from Microsoft Corp. The computing device 100-1 may be a portable device, such as a laptop, mobile phone, etc. The computing device 100-1 may be a wearable device such as a smartwatch. The computing device 100-1 may be a smart television, a set-top box, or a streaming device with video being output to a separate display. The computing device 100-1 may be a device that has no visual display, such as a smart speaker or other virtual assistant device.

Although the simplified block diagram of FIG. 1 shows all devices connected directly to the communications network 108, one or more network devices may facilitate communication between the displayed devices, some of or all of which communication may bypass the communications network 108 entirely. For example, the servers 104-1 and 104-2 may sit behind a common web firewall architecture. As another example, the computing device 100-1 may connect through a home router before connecting to infrastructure of the communications network 108.

Figure 2:
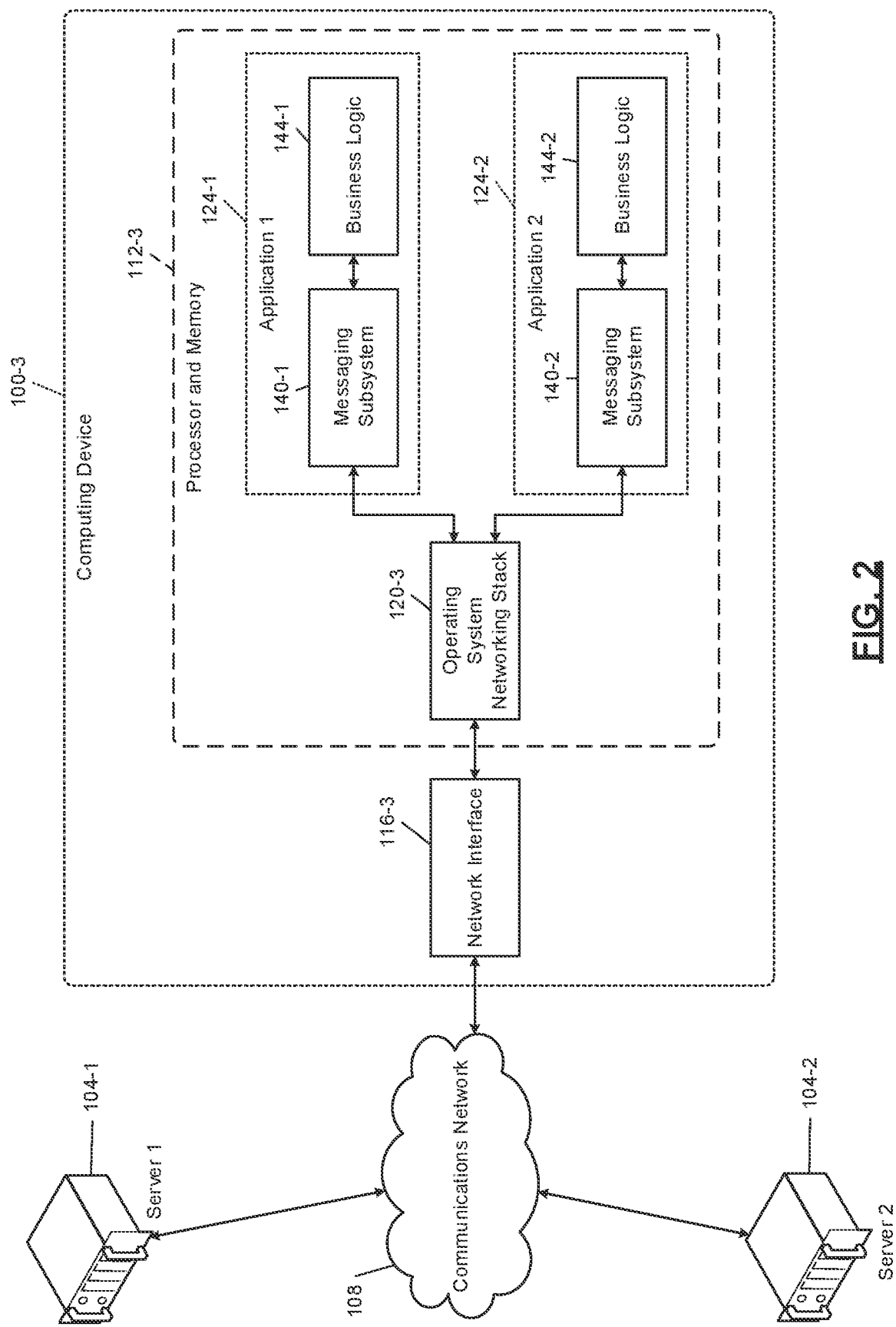
FIG. 2 is a functional block diagram of an example system in which multiple communicating applications are located in a single computing device.

In FIG. 2, another configuration is shown where a computing device 100-3 includes multiple applications. The computing device 100-3 includes a network interface 116-3 and a functional block of processor and memory 112-3. The processor and memory 112-3 implement an operating system networking stack 120-3, the first application 124-1, and the second application 124-2. In various implementations, the configuration is left to deployment engineers, such that some computing devices may have a single application while others will have multiple applications, each using a messaging subsystem. In various implementations, the first application 124-1 and the second application 124-2 may share a common copy of a messaging subsystem, implemented as a shared library, operating system service, etc.

Figure 3:
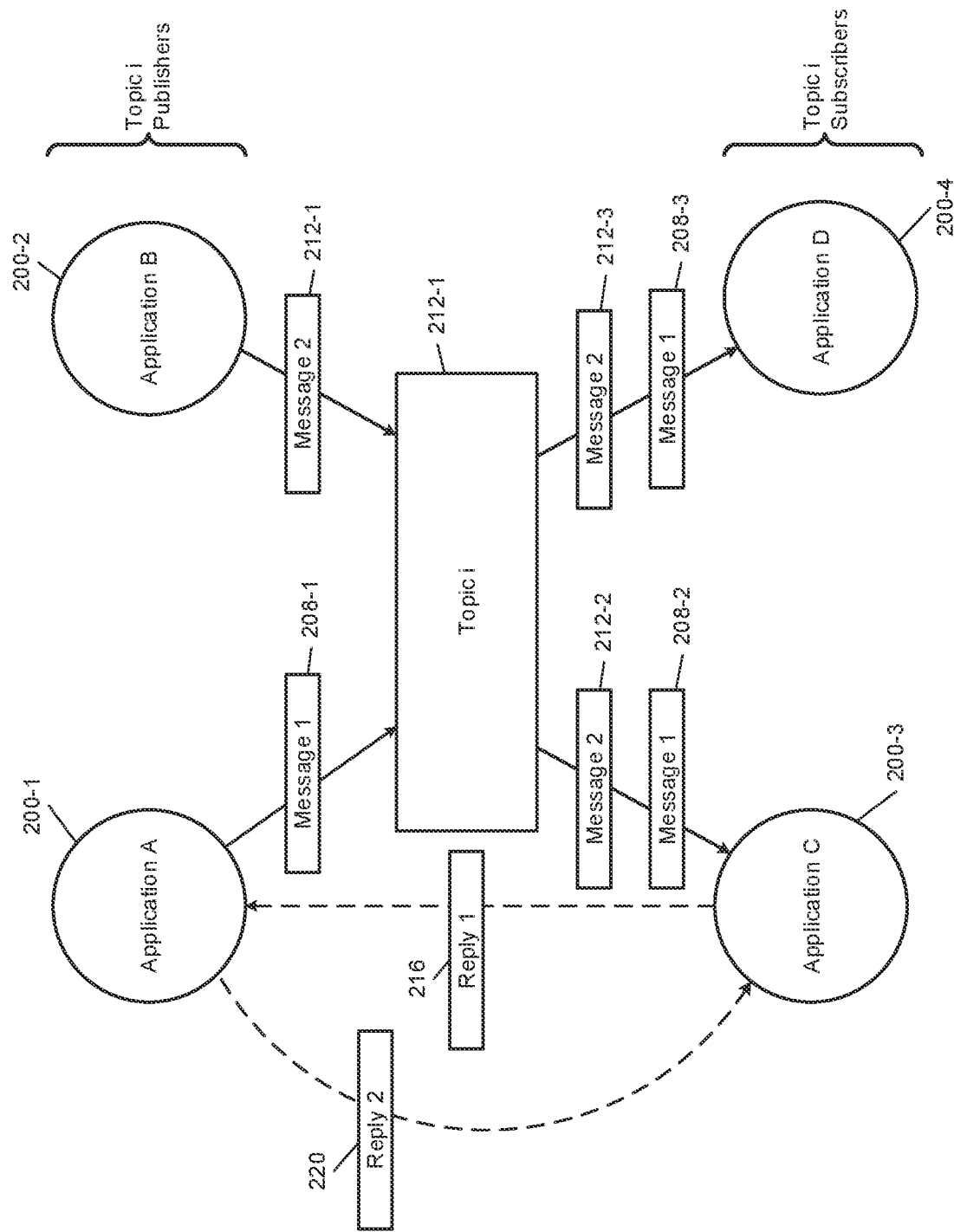
FIG. 3 is a functional illustration of message exchange in a publish/subscribe system.

In FIG. 3, four circles graphically represent application A 200-1, application B 200-2, application C 200-3, and application D 200-4. A large rectangle represents topic i 204, where the letter i refers to a topic identifier in a publish/subscribe (pub/sub) system. For example, the topic identifier may be an integer, such as a 32-bit unsigned integer. In the particular example shown, applications A and B 200-1 and 200-2 have been configured to publish to topic i 204. Similarly, applications C and D 200-3 and 200-4 have registered as subscribers to topic i 204.

The roles of the applications 200 may be different depending on the topic. For example, one of the applications 200 may be a publisher to one topic but a subscriber to another topic. In many situations, an application will subscribe only to some topics; similarly, an application will generally only publish to a subset of the available topics.

When application A 200-1 publishes a first message 208-1, the first message 208-1 is sent to the entities that have subscribed to topic i 204—in this example, application C 200-3 and application D 200-4. Application C 200-3 and application D 200-4 are shown receiving the first messages 208-2 and 208-3. In various implementations, the first messages 208-2 and 208-3 may not be additional copies of the first message 208-1 but instead a single message sent to a multicast address specific to topic i 204. The multicast address may be specific to topic i 212-1. However, there may be more topics than multicast addresses—in situations where that is true or possible, a combination of multicast address and port number may be used to uniquely correspond to a topic. In other implementations, a relay may receive the first message 208-1 and transmit the first message 208-2 and the first message 208-3 to the subscribers.

Subsequently, application B 200-2 is depicted publishing a second message 212-1 to topic i 204, which is distributed to the corresponding subscribers. This distribution is graphically represented as second messages 212-2 and 212-3.

Once application C 200-3 has received the first message 208-2, application C 200-3 may be able to send a first reply 216 to application A 200-1. In various implementations, the ability to send a reply is contingent on the publication of the first message 208-1 including reply details. For example, when application A 200-1 publishes the first message 208-1, the publication may include callback information to contact application A 200-1. The callback information may include a request ID to be used in any replies. Once application A 200-1 receives the first reply 216, application A 200-1 may be able to respond with yet another reply, second reply 220. In various implementations, the ability to transmit the second reply 220 may be contingent on the first reply 216 including callback information for contacting application C 200-3. In other implementations, transmission of the first reply 216 may inherently include (such as in the packet header) the information needed to contact application C 200-3.

Figure 4:
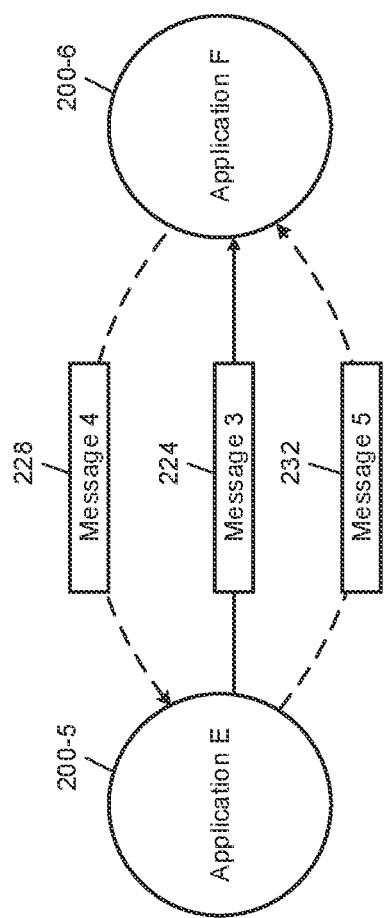
FIG. 4 is a functional illustration of point-to-point messaging according to the principles of the present disclosure.

In FIG. 4, a graphical illustration of point-to-point (PTP) messaging is shown. In this particular example, application E 200-5 sends a third message 224 to application F 200-6. Application E 200-5 may have discovered the contact mechanism for application F 200-6 as a result of a subscription message being received or by consulting a directory. For example, the directory may identify contact information for applications corresponding to various services. As one example, application F 200-6 may be present in a directory as offering a real-time stock quotation service.

In response to the third message 224, application F 200-6 may transmit a fourth message 228 back to application E 200-5. Application E 200-5 may then transmit a fifth message 232 to application F 200-6. There may be no limit to the number of messages that can be exchanged and, in various implementations, there is no restriction specifying that messages exchanged between two applications have to alternate direction from message to message. In other words, application F 200-6 could transmit multiple messages to application E 200-5 without application E 205 having responded with a message. A messaging system according to the principles of the present disclosure may implement one or both of pub/sub and PTP architectures.

Interfaces

An example publisher interface may be defined as follows:

```
start( )
publish(String topic, Message msg)
publish(String topic, Message msg, int reqID, RequestCallback callback)
send(EndPointRoute to, Message msg)
send(EndPointRoute to, Message msg, int reqID, RequestCallback callback)
closeRequest(int reqID)
stop( )
```

Because the publisher interface is an interface, the methods of the publisher interface are abstract methods. Any class used in an application can include the variables and methods of the publisher interface by implementing the publisher interface. The publisher interface may include a start method, which may be invoked to create resources involved in performing a publishing operation, and a stop method, which may be invoked to clean up the created resources. The publisher interface may also include first and second publishing methods and first and second PTP methods.

Each of the first and second publishing methods and may be used to publish a message (msg) to a topic (topic), which maps to information for how to route the message (msg) to subscribers. For example, the topic may be an integer or a string. In various implementations, the second publishing method differs from the first publishing method in that the second publishing method includes two additional arguments—request ID (reqID) and request callback (callback) which can be used by a publisher to request a response to the message (msg) from a recipient of the message (msg), such as a subscriber to the topic (topic). In various implementations, the request ID (reqID) of the second publishing method may be used to identify an individual request for a reply made by the publisher and the request callback (callback) may be any object that implements the RequestCallback interface.

Each of the first and second PTP methods may be used to send a message (msg) to a recipient. In various implementations, the EndPointRoute (to) is included as an argument in the first and second PTP methods and may be an object that identifies an object or address that can be used to route the message (msg) to the recipient.

The second PTP method differs from the first PTP method in that the second PTP method includes the same two additional arguments that were discussed above with respect to the second publishing method: request ID (reqID) and request callback (callback). Similar to the request ID (reqID) and request callback (callback) of the second publishing method, the request ID (reqID) and request callback (callback) of the second PTP method can be used by a sender of the message (msg) to request a reply to the message (msg) from a recipient of the message (msg). The request ID (reqID) of the second PTP method may be used to identify an individual request for a reply made by the publisher, and the request callback (callback) of the second PTP method may be any object that implements the RequestCallback interface.

In various implementations, the publisher interface may also include a close request method for closing a reply request that corresponds to the request ID (reqID) so as to stop receiving replies to the reply request that corresponds to the request ID (reqID).

An example subscriber interface may be defined as follows:

```
start( )
subscribe(String topic, SubscriptionCallback callback)
unsubscribe(String topic, SubscriptionCallback callback)
stop( )
```

Because the subscriber interface is an interface, the methods of the subscriber interface are abstract methods. Further, any class used in an application can include the variables and methods of the subscriber interface by implementing the subscriber interface. The subscriber interface may include a start method, which may be invoked to create resources involved in performing subscribing operations, and a stop method, which may be invoked to clean up the created resources. The subscriber interface may also include subscribe and unsubscribe methods for subscribing to, or unsubscribing from, a topic. The subscribe and unsubscribe methods each have, as arguments, a topic and a callback. The callback may be an object of any class that implements the SubscriptionCallback interface.

A request callback interface may be defined as:
receive(int reqID, Message msg, EndPoint responseRoute)
A subscription callback interface may be defined as:
receive(String topic, Message msg, EndPoint responseRoute)

The RequestCallback interface and the SubscriptionCallback interface each includes a receive method. In various implementations, any time a message is published to a topic using the first publishing method, the receive method of subscribers to the topic is invoked with the message (msg) and topic (topic) of the receive method being the same as the message that was published and the topic to which the message was published, and the endpoint (responseRoute) of the receive method is set to a null value.

In various implementations, any time a message is published to a topic using the second publishing method, the receive method of subscribers to the topic is invoked with the message (msg) and topic (topic) of the receive method being the same as the message that was published and the topic to which the message was published. However, the endpoint (responseRoute) of the receive method is not equal to null. Instead, the endpoint (responseRoute) of the receive method will contain information that will allow subscribers to send replies to the publisher that published the message using the second publishing method.

In various implementations, after a subscriber replies to a publisher that published a message using the second publishing method, the receive method of the RequestCallback interface may be invoked by the publisher with the request ID (reqID) of the receive method equal to the request ID (reqID) included in the second publishing method which was previously used by the publisher, and the message (msg) of the receive method of the RequestCallback interface equal to the reply sent to the publisher by the replying subscriber.

If the replying subscriber used the first PTP method of the publisher interface to send the reply to the publisher, then the endpoint (responseRoute) of the receive method of the RequestCallback interface will be set to null. Alternatively, if the replying subscriber used the second PTP method of the publisher interface to send the reply to the publisher, then the endpoint (responseRoute) of the receive method of the RequestCallback interface will not be null. Instead, the endpoint (responseRoute) of the receive method of the RequestCallback interface will contain information that will allow the publisher to reply to the replying subscriber (e.g., using the first PTP method or the second PTP method of the publisher interface).

Block Diagram

Figure 5:
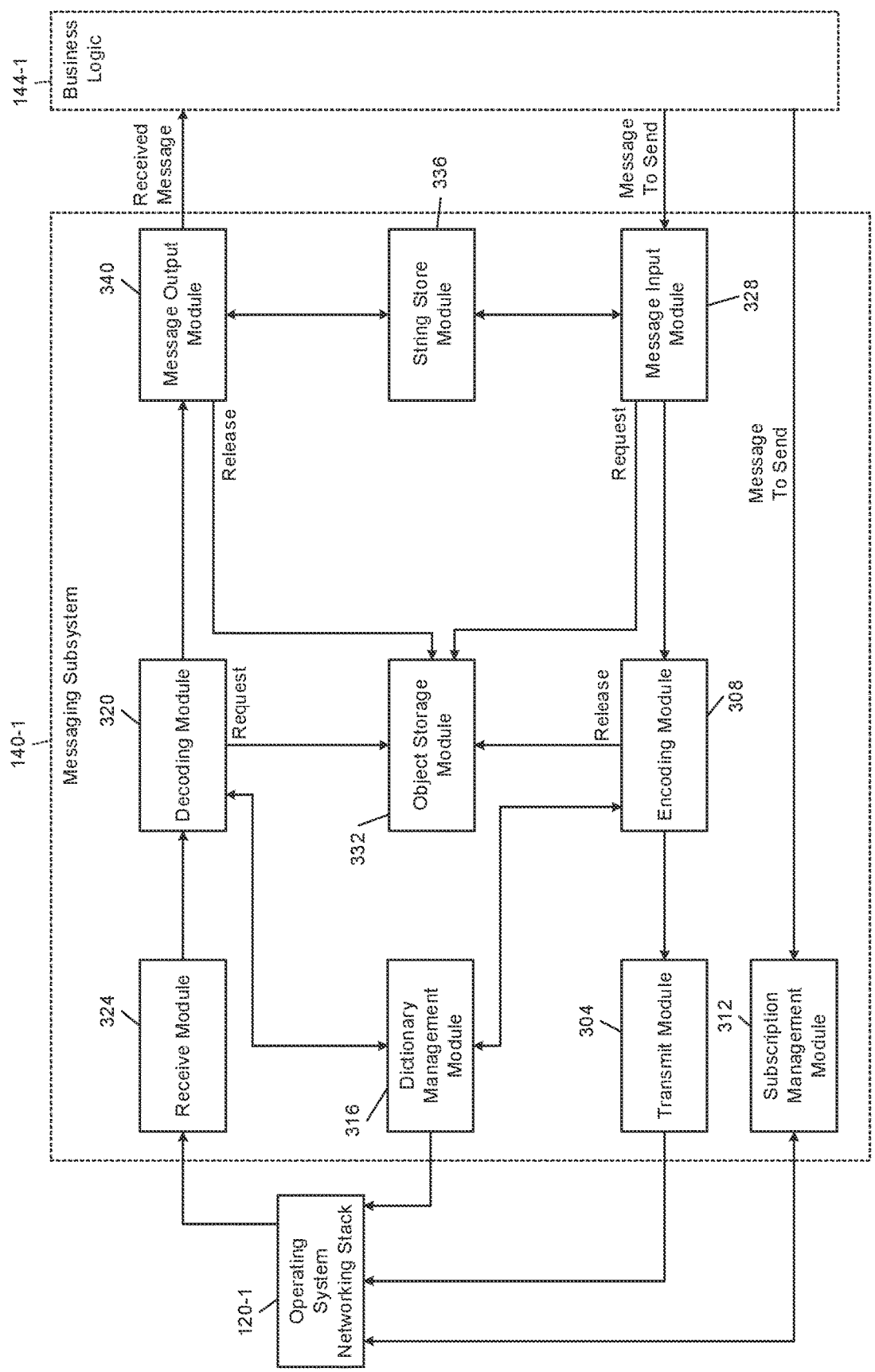
FIG. 5 is a functional block diagram of example components of a messaging subsystem according to the principles of the present disclosure.

In FIG. 5, an example implementation of the messaging subsystem 140-1 is shown to include a transmit module 304 that transmits messages, which may be in packetized form, to the operating system networking stack 120-1. For example, the transmit module 304 may receive an encoded message from an encoding module 308 and output the encoded message as one or more packets, frames, or datagrams. The transmit module 304 may also keep track of identifying information for recipients of messages, such as Internet protocol (IP) address, multicast address, port, request ID, etc.

A subscription management module 312 communicates via the operating system networking stack 120-1 with a topic subscription server and/or a directory server. In various implementations, the functionality of one or more of the servers may be co-located and/or distributed. For example, a peer-to-peer system may allow for replicas of a service directory or subscription list to be replicated across multiple modes. In various implementations, the subscription management module 312 manages a node and stores data locally.

In various implementations, the subscription management module 312 subscribes and/or unsubscribes from specific topics as dictated by the business logic 144-1. The subscription management module 312 may also maintain a service directory to identify a recipient able to service particular requests. For example, one request may be for real-time financial data. In various implementations, multiple servers (or other computing devices) may offer real-time quotations for publicly traded equities. In various implementations, the servers may each be responsible for only a subset of the publicly traded equities. In a simplistic example, one server may be responsible for financial data about equities whose ticker symbol begins with a letter between A and M while a second server is responsible for providing information for equities whose ticker symbol beings with a letter between N and Z.

In various implementations, dictionary synchronization and management may be handled by a dictionary management module 316. The dictionary management module 316 may obtain dictionary definitions of messages having relevance to the business logic 144-1. In various implementations, certain definitions may be relevant to certain topics and therefore those dictionary definitions may be obtained by the subscription management module 312 according to the set of subscribed topics. Dictionary definitions are described in more detail below, but in brief are definitions of the structure of messages, specifying identities and data types of fields in the messages.

The dictionary management module 316 may operate in a client-server relationship and may request dictionary definitions from a dictionary server. In various implementations, the dictionary management module 316 may maintain a complete set of dictionary definitions and may periodically obtain updates from the dictionary server. In various other implementations, the dictionary management module 316 may instead obtain definitions that are needed for either sending or receiving messages by the messaging subsystem 140-1. In this way, storage space for unneeded dictionary definitions can be saved. In various implementations, changes to dictionary definitions may be pushed to the dictionary management module 316 in addition to or alternatively to periodic update pulls by the dictionary management module 316.

As described in more detail below, the encoding module 308 may use a dictionary definition from the dictionary management module 316 to encode a message into a byte stream for transmission. Similarly, a decoding module 320 may use a dictionary definition from the dictionary management module 316 when a receive module 324 provides a stream of bytes that have been encoded using that dictionary definition.

When the business logic 144-1 decides to send a message, the business logic 144-1 provides the message to a message input module 328. Message input module 328 requests a message object from an object storage module 332 and, as described in more detail below, configures the message object appropriately to store the message from the business logic 144-1. Once the message is stored, the encoding module 308 encodes the message and passes the encoded byte stream to the transmit module 304. The encoding module 308 can then release the message object back to the object storage module 332 for reuse.

In various implementations, as part of storing data from the business logic 144-1 into a message object, the message input module 328 may rely on a string store module 336, which maps strings to arrays and vice versa. For example, if the business logic 144-1 provides a string such as "IBM", the string store module 336 may have a byte array or character array with elements representing the letters I, B, and M in that order. A reference to this array can be used every time the string IBM is referenced, rather than creating a new literal IBM string every time a message requires that string.

In the other direction, a message output module 340 provides a received message to the business logic 144-1. The decoding module 320 requests a message object from the object storage module 332 and populates the message object based on the byte stream obtained from the receive module 324. The decoded message object is provided to the message output module 340, which transfers the message object to the business logic 144-1. If any fields of the message are strings, the message output module 340 may use the string store module 336 to map a byte or character array from the decoding module 320 into a string literal for provision to the business logic 144-1.

As described in more detail below, the object storage module 332 may use a pooled approach to memory management where similar objects are pooled together. For example, each type of message may have a unique message token. Message objects having the same message token have the same structure (the set of fields in the message object) and may be pooled for reuse.

Similarly, arrays of a certain type may be pooled by the object storage module 332. In various implementations, multiple pools for each data type may be present. For example, arrays of integers may be pooled separately based on their length. For example, there may be a pool for integer arrays with a backing array of length 16, a pool for integer arrays with a backing array of length 32, etc. When populating a message object with different sizes of array elements, these pooled arrays can be obtained from the object storage module 332. The object storage module 332 therefore operates almost as a memory manager in place of the built-in memory management and garbage collection afforded by the high-level language and its environment, such as a Java virtual machine (JVM).

Figure 6:
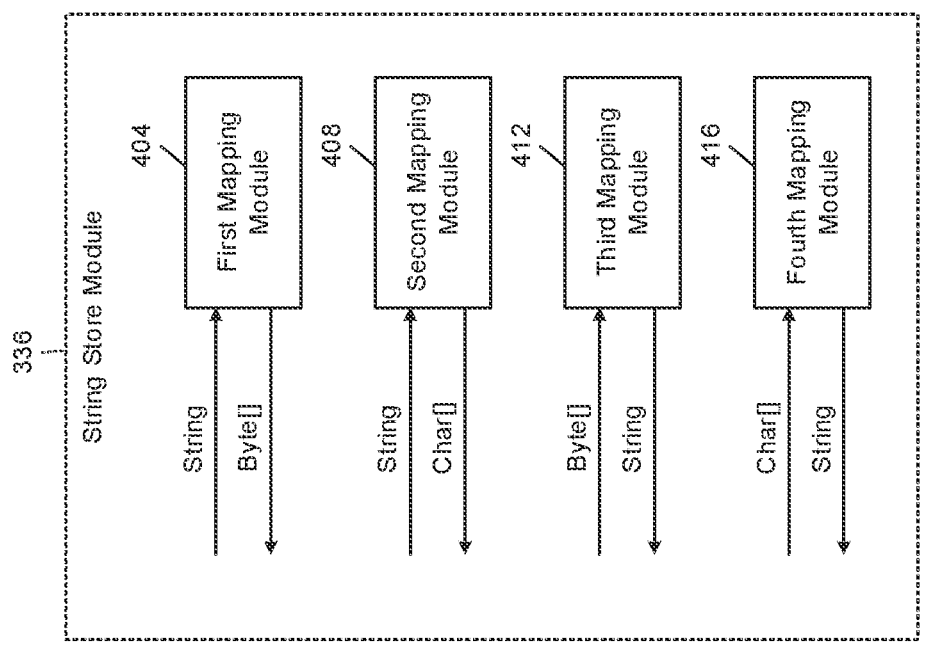
FIG. 6 is a functional block diagram of an example string storage system according to the principles of the present disclosure.

FIG. 6 is an example implementation of the string store module 336. While the present disclosure describes strings (also known as literals or literal arrays) as examples, the following solutions for caching and lookup of immutable objects can be used for other forms of immutable objects. As with strings, other forms of immutable object may require new memory allocation (and eventual garbage collection) every time a new immutable object is used. The following teachings describe how to improve performance—and, in some environments, memory efficiency—for situations where equivalent immutable objects may be repeatedly used.

In the present disclosure, strings may be represented by ByteArrays or CharArrays. Both ByteArray and CharArray may have getString( ) and setString(str) methods for conversion between the array classes and strings. The Message class also exposes the getString(token) and setString(token, str) methods. Instead of, for example, message.getByteArray(fid).getString( ), the caller can more directly invoke message.getString(fid).

Strings—including those implemented in the JAVA programming language—can cause some problems for high-performance applications because strings are immutable. As a result, usage of strings may create garbage and force garbage collection, which decreases performance. For example, every time that the string "IBM" is used, a new string object may have to be allocated from the heap and then, when the message using that string object is sent, scheduled for garbage collection. In brief, the string store module 336 allows every message referencing the string "IBM" to reference a single instance of the object.

For applications that wish to avoid garbage collection, the present disclosure defines a StringStore class, which maps string onto their encodes, and encodes to strings. The ByteArray & CharArray classes have methods that use StringStores: the retrieveString( ) and putString(string) methods. The putString(fid, string) and retrieveString(fid) methods are also exposed directly on the Message class. The retrieveString( ) method is generally more performant that getString( ), and does not create garbage. The setString( ) method, on the other hand, is generally more performant that putString( ); putString( ) is generally only of value for pre-populating the StringStore.

In the example of FIG. 6, the string store module 336 includes a first mapping module 404. The first mapping module 404 stores a set of byte arrays and, when a string is received, determines whether any existing arrays are equivalent to the string. If not, the string indexed by the first mapping module 404 may return an error message and/or may create a new byte array corresponding to the string.

Methods for generating byte arrays from strings may already exist in the high-level language. For example, in the JAVA programming language, a method like getBytes( ) may be used. However, these methods have higher latency and will require the generation of new byte arrays—that is, allocating memory from the heap to generate new byte arrays—which may ultimately result in unwanted garbage collection operations, and thus, reduced speed and/or less efficient use of processing resources. In contrast, the first mapping module 404 allows a byte array corresponding to a particular string to be obtained without the need to create a new byte array.

The first mapping module 404 may record times associated with each byte array indicating when the byte array was last referenced. To reduce memory footprint, the first mapping module 404 may discard byte arrays that have not been used for longer than a predefined time period. In other implementations, the first mapping module 404 may only evict arrays from storage when a total size of the first mapping module 404 reaches a limit. Then, the first mapping module 404 may evict the least recently used arrays first.

In other implementations, the first mapping module 404 may maintain a count of how often an array has been used and evict the least used arrays. To prevent arrays that were previously frequently used and are no longer being used from crowding out new arrays, the accounts may be decremented over time, such as with the next exponential decay applied to accounts at periodic intervals.

A second mapping module 408 is string-indexed and returns character arrays. The second mapping module 408 may operate similarly to the first mapping module 404 except that a set of character arrays corresponding to strings is stored in the second mapping module 408. In various implementations, the first and second mapping modules 404 and 408 may be relied on by the message input module 328 to convert strings from business logic into arrays for use with a message data structure according to the principles of the present disclosure.

In various implementations, the arrays referenced here may be native arrays provided by the high-level language. In other implementations, the arrays may be custom arrays, such as a special array class, that have additional features. For example, as described in more detail below, the custom arrays may be able to be resized, contrary to native arrays in many high-level languages, which are fixed in size.

A third mapping module 412 is indexed by a byte array and returns a string. In various implementations, the third mapping module 412 stores a set of strings and a set of hashes corresponding to the strings. The hash function is applied to the incoming byte array and then that hash is compared to the set of hashes. For example, a hash map, which may be offered by the high-level language, may be used for this purpose. Once a hash is found in the hash map, the byte array is compared—for example, byte by byte—to the string to ensure a match. If a match is found, the string literal is returned. If a match is not found, a new string literal may be created and returned.

A fourth mapping module 416 may be implemented similarly to the third mapping module 412 but, instead of receiving a byte array as an index, the fourth mapping module 416 receives a character array as an index. The fourth mapping module 416 then returns a string literal matching the received character array. In various locations, the message output module 340 of FIG. 5 may use the third and fourth mapping modules 412 and 416 to output strings to business logic.

Figure 7:
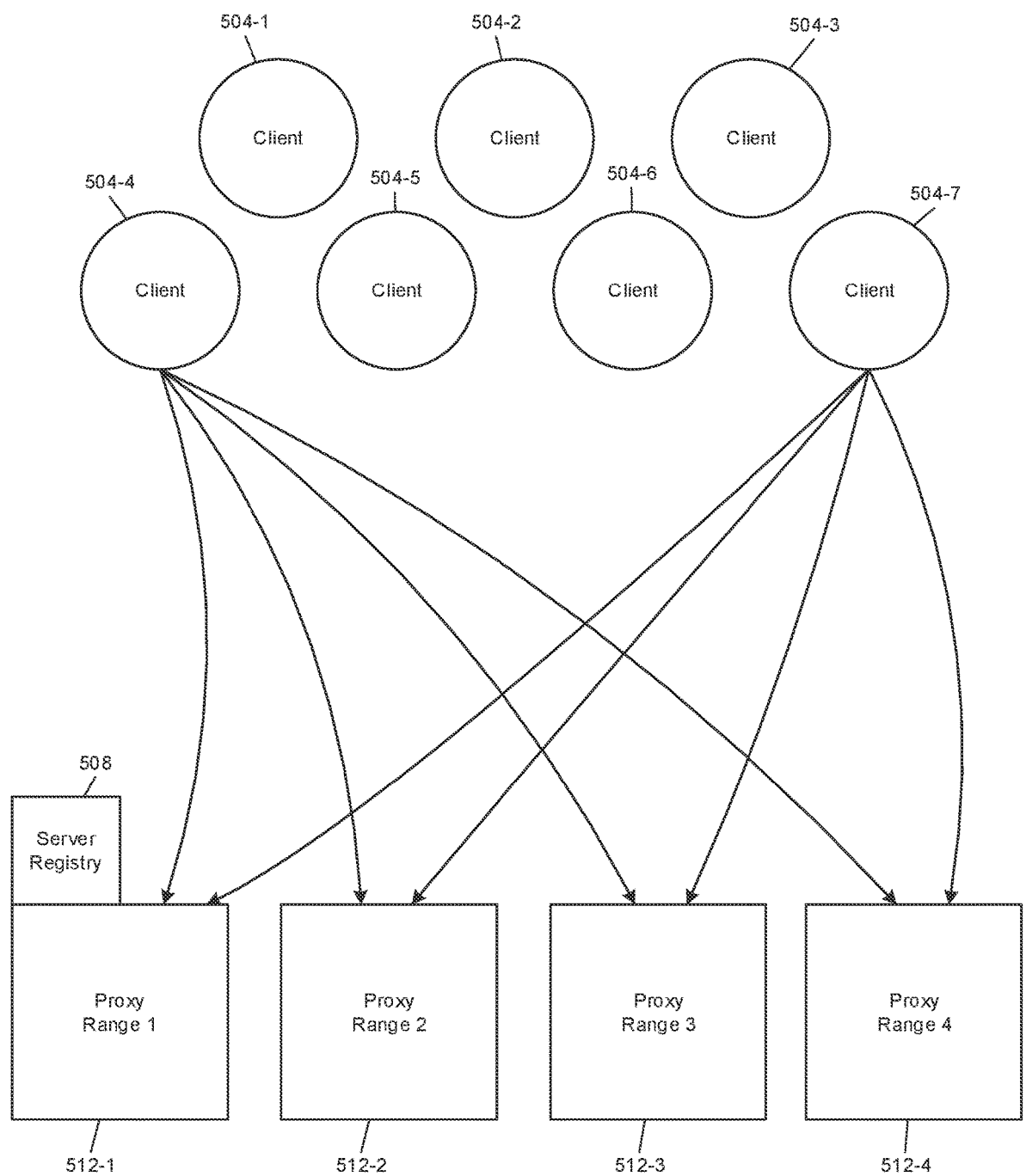
FIG. 7 is a functional block diagram of an example transmission control protocol (TCP) implementation of the present disclosure.

In FIG. 7, a graphical representation of transmission control protocol (TCP) client-server architecture is depicted. A set of clients 504-1, 504-2, 504-3, 504-4, 504-5, 504-6, and 504-7 consult a server registry 508 to determine which servers to communicate with. In FIG. 7, depicted are a first proxy range 512-1, a second proxy range 512-2, a third proxy range 512-3, and a fourth proxy range 512-4.

In various implementations, all of the clients 504 and the servers 512 in the proxy ranges connect to the server registry 508. The servers 512 send information about their transports, and how to connect to them. The clients 504 request information about current servers on a transport. If server information changes, the server registry 508 pushes the change to the clients 504. The clients 504 will connect to one server in every cluster that serves the transport. If servers are unclustered, the clients 504 connect to every server that serves the transport. The servers 512 can be stand-alone servers or hosted by another service. The server registry 508 may have a backup instance running that can be failed over to in the event that the server registry 508 suffers a failure.

For TCP, all nodes in a transport are assigned to be either a client or server. In general, any publisher would be a server, and any subscriber would be a client. However, each node may be a publisher to some topics and a subscriber to other topics. The present disclosure permits servers to subscribe to a topic and clients to publish to the topic.

Therefore, assigning nodes to either a client role or a server role offers a host of advantages in performance and simplicity. This means that client nodes can't talk directly with other clients and server nodes can't talk directly to other servers. However, the impact to the messaging architecture is minimal. In various implementations, clients subscribe to all servers on a transport immediately, rather than doing topic by topic discovery.

In various implementations, when a node subscribes to a topic, that topic is sent on every connection for that transport; and when a node unsubscribes, it sends an unsubscribe alert on every connection. In various implementations, every node maintains the list of topics subscribed on every connection. A transport is configured with its publisher type.

When a node publishes to a topic, it checks every connection in the transport and sends to every remote node for which it has a subscription. To help with handling fan-out and/or slow consumers, three types of publishers may be defined: serial, parallel, and threadPool. The serial type sends to all remote nodes on the current thread. The parallel type assigns each remote node its own thread, which handles the publishing to that node. The threadPool type defines a pool of threads from which messages are published.

For PTP communication, the present disclosure sends to an "endPoint." For TCP, the endPoint contains the SocketChannel of the node the message will be sent to.

When a client loses connection to a server, it will try to reconnect, with a step-back. If the server is down, the server registry 508 will also lose connection. When the server registry 508 loses connection, it will tell clients that the server is no longer available for the transport. At that point, the client will stop trying to reconnect.

When a server is added, or brought back up, it connects to the server registry 508. The server registry 508 tells clients that there is a new server. The clients connect to the server, and send their subscription lists. When a client subscribes to a server, the server will send the client its subscription list Both blocking & non-blocking types of TCP are supported. The transport is configured with the type to use. To improve throughput, ranges may be established—for example, with each server only responsible for a range of requests that is a subset of a total set of requests. As one example, the total set of requests may include data of ticker symbols, and each range may be a subset of ticker symbols, segmented for example by the first letter of the ticker symbols. To improve performance with fan-out, clustering can be used.

Figure 8:
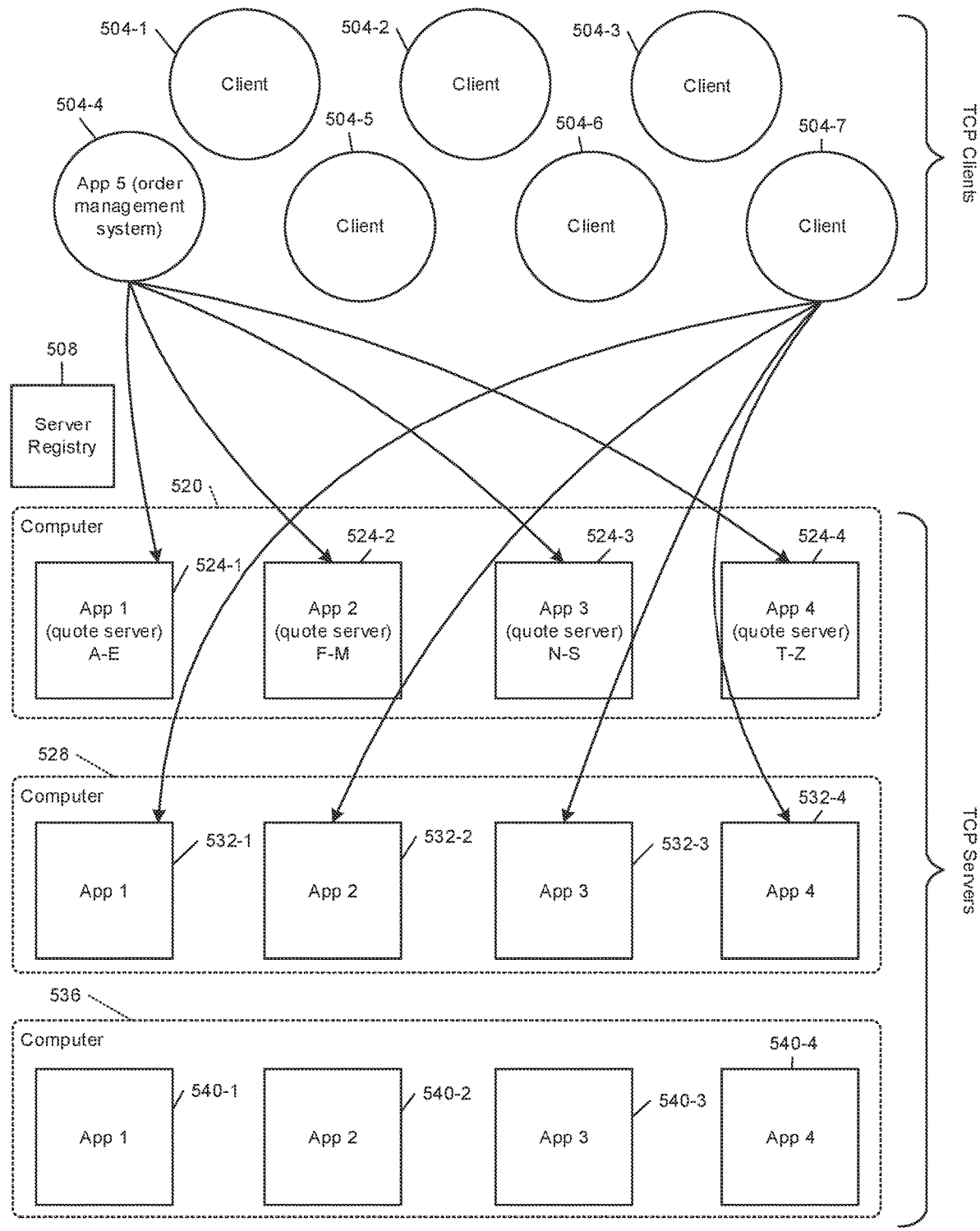
FIG. 8 is a functional block diagram of a TCP implementation with clustering of server applications.

In FIG. 8, a set of TCP servers implementing clustering is depicted. A first computer 520 includes a first application 524-1, a second application 524-2, a third application 524-3, and a fourth application 524-4. Another computer 528 includes copies of the applications running on the computer 520. For clarity, these are labeled as applications 532. Similarly, another computer 536 includes a copy of the applications, this time labeled as applications 540. The multiple copies of the applications spread across the computers 520, 528, and 536 allow for load balancing, which is especially helpful for high-fan-out situations. For example, the client 504-7 may communicate with the applications 532 in the computer 528, while the client 504-4 may communicate with the applications 524 and the computer 520. The load balancing may be controlled by the server registry 508 or by another mechanism.

As one example among many, the messaging architecture of the present disclosure may be used for exchanging financial information at high speed. For example, the client 504-4 may include an application referred to as an order management system, which executes buy and sell orders from customers. The order management system may obtain quotes for tradable equities from the applications 524. Continuing the example, the applications 524 may operate as quote servers, with the first application 524-1 servicing requests for symbols beginning with the letters A-E, the second application 524-2 servicing requests for symbols beginning with the letters F-M, the third application 524-3 servicing requests for symbols beginning with the letters N-S, and the fourth application 524-4 servicing requests for symbols beginning with the letters T-Z.

Unlike UDP, TCP can be clustered on the transport level. When applications serve data over TCP, they will generally be clustered on the transport level not on the application level (that is, all applications in the cluster will be active). Servers may be configured with a cluster name(s) for its transport(s). If a server does not have a cluster name, the cluster name be set equal to the socketAddr (socket address) to ensure it is unclustered.

When the client subscribes to the server registry 508 for its first transport, it receives a clientNum unique to the client. Any time the client subscribes for a transport, it receives back server cluster names for that transport and a list of socket addresses for each cluster. For example, the client connects to: addrList.get(clientNum % addrList.size( )).

If a client loses connection, then as before, it will try to reconnect until it (i) connects, (ii) reaches a maximum number of retries, or (iii) gets a new address list from the server registry 508. If it reaches the maximum number of retries, the client will try the next entry in its addr list.

If the server is down, it will disconnect from the server registry 508. The server registry 508 will remove the server from the cluster list and publish the new addr list. If a client is not connected (due to a lost server), the client will connect using the new list. If a client is connected, it will connect according to the new list if a configurable flag is set (for example, the flag may be named autoRebalance).

When a server comes up, it connects to the server registry 508 and sends its connection info. The server registry 508 updates its cluster list and sends the updated information to clients. A client will reconnect using the new list if the autoRebalance flag is set.

Auto-rebalance is beneficial because keeps the load balanced but has the downside of interrupting otherwise stable connections. As a result, the autoRebalance flag is configurable according to the needs of the deployment. For example, the autoRebalance flag may be cleared (equivalently, set to false) when the cluster is large or clients do not connect for long periods of time.

Conversely, the autoRebalance flag may be set (equivalently, set to true) when the cluster is small and clients remain connected for long periods of time. The autoRebalance flag may be set by default. In various implementations, the autoRebalance flag is cleared and forced rebalances are scheduled periodically. The periodic schedule may be adaptive according to traffic—for example, a scheduled rebalance may be delayed by up to 12 hours if a level of activity is above a threshold. The threshold may be adaptive—for example, the threshold may be set as a percentage (such as 20%) of an average of daily peak activity metrics. Note that a forced rebalance may not result in any disconnections if the current server list is unchanged from the last rebalance.

Message Structure

Figure 9:
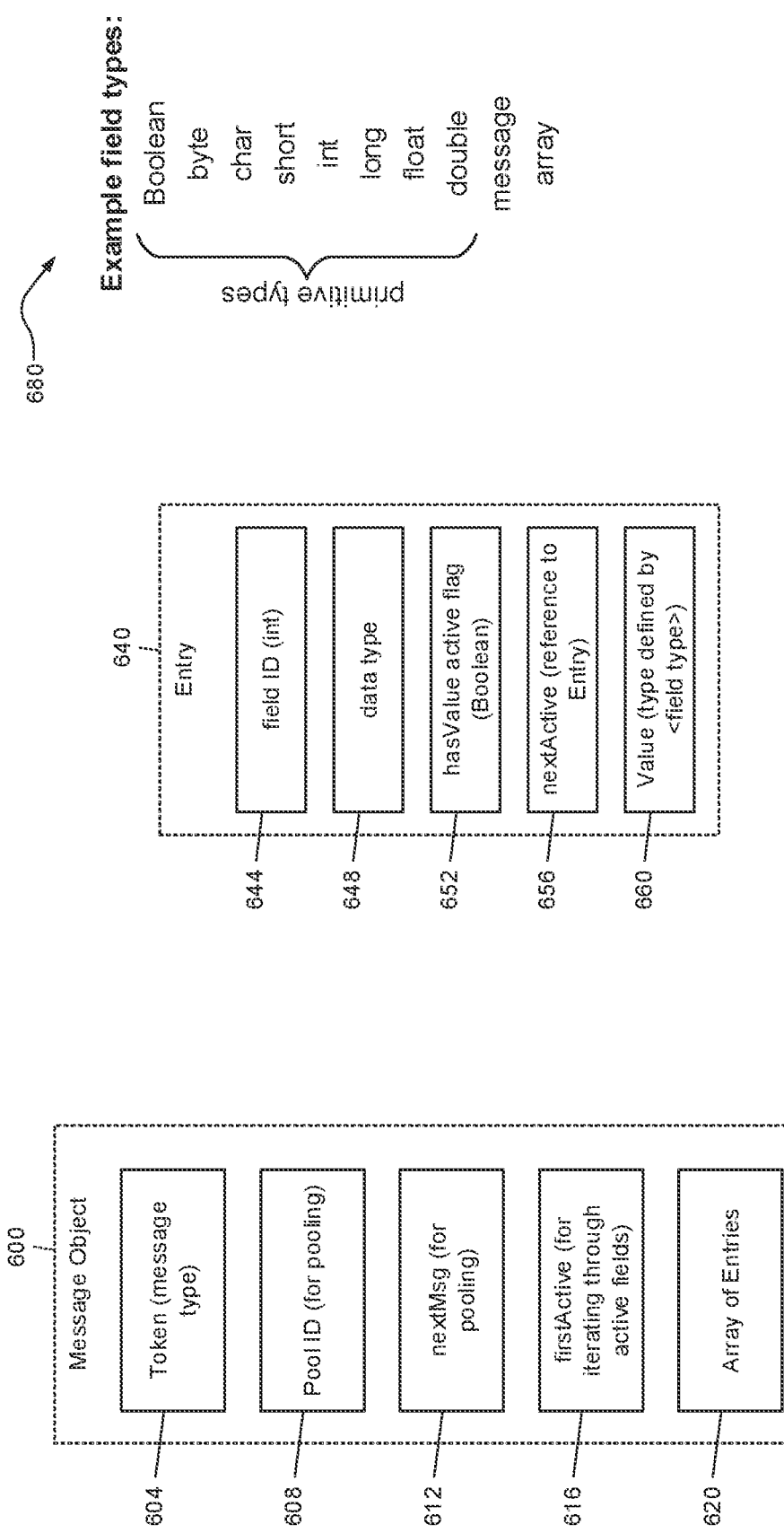
FIG. 9 is a graphical illustration of an example data structure for message objects according to the principles of the present disclosure.

In FIG. 9, a graphical illustration of a message data structure according to the principles of the present disclosure is shown. A message object 600 includes, in this example, a token 604, a pool ID 608, a next message pointer 612, a first active pointer 616, and an array of entries 620. The token indicates the type of message and may be an integer. For example, a specific token may indicate that the message includes a character array, a floating point number, and an integer. As one example, this may be a stock quote message, where the character array indicates the ticker symbol, the floating point number indicates a current price, and the integer indicates number of trades in the last hour. A message having this token will therefore always have these three pieces of data.

The pool ID 608 indicates which pool that the message object 600 belongs to. The pool ID 608 is used to select a pool to return the message object 600 to once the message is not needed—generally, when the message object 600 has been delivered to the business logic or transmitted to the communications network. The pool may be implemented as a linked list and therefore, when the message object 600 is in the pool, the next message pointer 612 points to the next message in the pool. When the message object 600 is in use, the next message pointer 612 may be null or may be undefined.

As described in more detail below, the first active pointer 616 allows for iterating through a linked list of the entries in the message object 600. The array of entries 620 includes an array of entry objects, as explained in more detail below. In various implementations, the array of entries 620 may be a sparse array in that not every element of the array contains a valid field. The reason for this is to allow rapid access to specific entries of the message object 600 without having to index through the entire array. The terms "field" and "entry" may be used interchangeably, though for clarity: every element of the entry array is an "entry," while "field" refers to those entries that are active and have data values.

An example entry 640 includes a field ID 644, a data type 648, a Boolean active flag 652 (also referred to as an active indicator), a next active pointer 656, and a data value 660. Using the above example, the data value 660 of one entry may be a stock ticker symbol, the data value 660 of another entry may be a floating point price, and the data value 660 of another entry may be an integer volume of trading. The field ID 644 may be an integer and indicates the identity of the field. For example, a specific field ID may indicate that the field is a stock ticker symbol as compared to a customer name.

The data type 648 identifies the type of the data in the data value 660. A list of example field types is shown at 680 and includes a set of primitive types, which may be defined by the high-level language, as well as additional types. In this example, the primitive types include Boolean, byte, character, short, int, long, float, and double. The other field types are a message and an array. In various implementations, a message class may define an enumeration (for example, a type corresponding to the keyword enum in the JAVA programming language) called Type for use with the data type 648, which encapsulates the Boolean, byte, char, short, int, long, float, double, message and array data types as fixed constants.

Allowing the entry to be of type message means that the message data structure can be nested. For example, a first message token may correspond to a message that describes a customer—the fields may include first name, last name, and customer ID. A second message token may correspond to a message with a field for an account balance and another field describing the customer corresponding to the account balance. That field may be a message having the same structure as the first message token to specify the customer data.

A field type of array allows for multiple elements. These items may be, in various implementations, of any type, including the field types shown at 680. In other words, an entry may have a type that is an array of messages or an array of Boolean values. An array of characters or bytes may be used to store text data, functionally similar to a string.

The active flag 652 indicates whether the entry 640 includes a value or not. The active flag 652 may be cleared (equivalently, set to false) until the field is populated, such as from data provided by the business logic. Entries in the array of entries 620 that do not contain fields relevant to the current message may have an active flag 652 set to zero. In various implementations, a majority of the entries in the array of entries 620 may have the active flag 652 cleared.

To avoid having to iterate through the array of entries 620 looking for entries with set active flags, a linked list of active entries is formed. The first active pointer 616 of the message object 600 (also referred to as a head pointer since it points to the head of a linked list) points to a first active entry of the array of entries 620. The next active pointer 656 of an active entry points to the next active entry in the array of entries 620. The next active pointer 656 of the final active entry in the array of entries 620 may be set to null.

Figure 10:
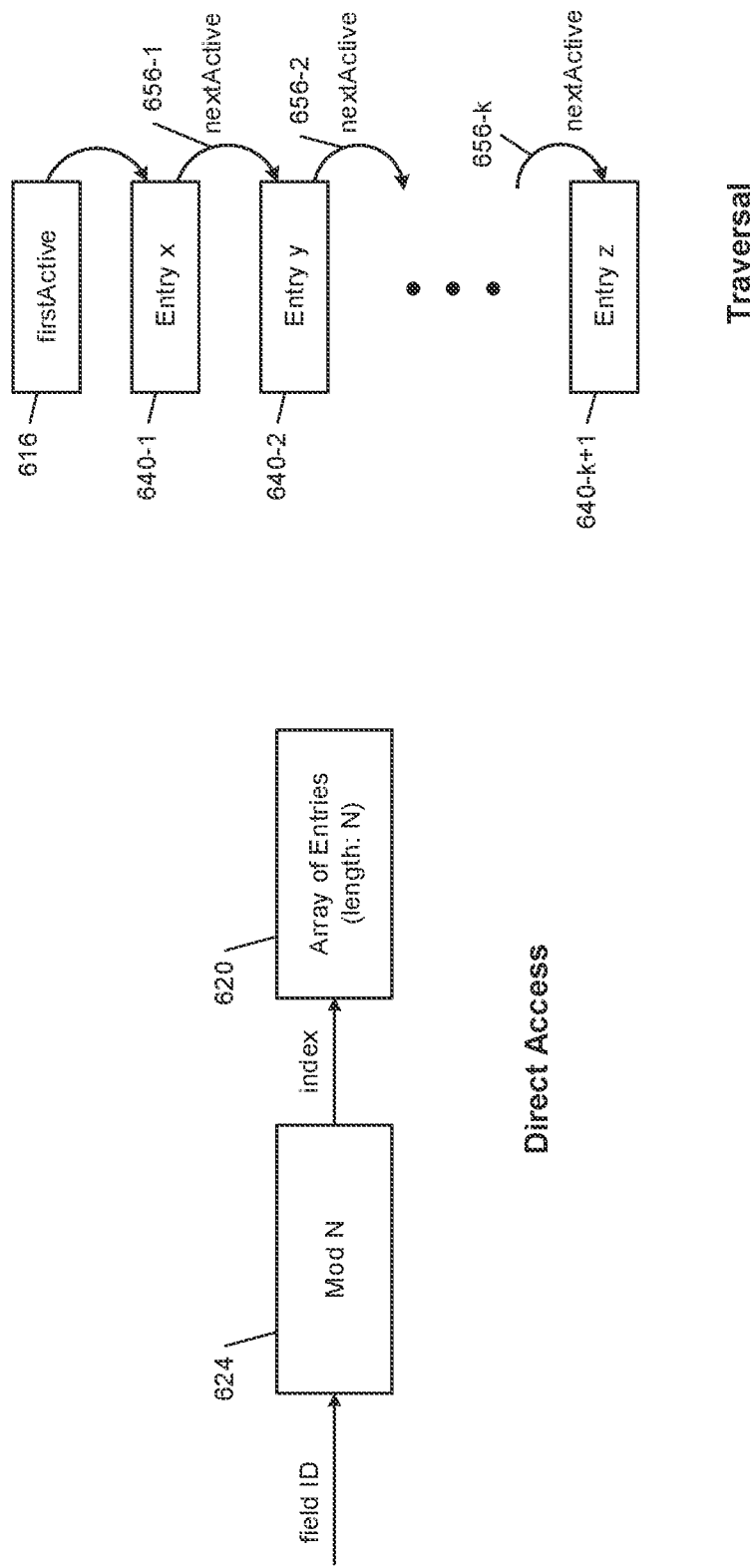
FIG. 10 is a graphical illustration of multiple modes of accessing entries within an example message data structure.

In FIG. 10, example access mechanisms for the message structure shown in FIG. 9 are illustrated graphically. The first active pointer 616 points to a first entry 640-1, which has a next active pointer 656-1 pointing to another entry 640-2. The entry 640-2 has a next active pointer 656-2 that points to the next active entry. Finally, a next active pointer 656-*k* points to a final entry 640-*k*+1. Not shown is the next active pointer 656-*k*+1 of the last entry, which may be set to null.

In order to iterate through all of the entries in the linked list, control begins with the first active pointer 616. This linked list iteration may be useful for reading out all of the active entries, such as when encoding a message into a byte queue. However, if a particular entry needs to be read, the linked list may be inefficient, especially for entries not near the beginning of the list.

Therefore, a direct access mechanism is defined for some implementations of the message structure. The array of entries 620 is defined to have a length of N. Each field is placed in the array of entries 620 according to its field ID. In various implementations, the field ID may be used directly to determine the index into the array for the field.

In various implementations, a hash can be calculated from the field ID to determine an index of the array for the field. In various implementations, a simple modulo N (mod N) operator 624 is used as the hash. The operator 624 is represented as a rectangular block in FIG. 10. In various implementations of the modulo N operator, the field ID may be directly used as the "hash" if the field ID is less than or equal to N; only if the field ID is greater than N must a calculation be performed.

If there are two active fields (which, by definition, have different field IDs) where the hash function results in the same index for the different field IDs, this is a collision. In such a case, the array of entries 620 is expanded by increasing the size of N, such as by doubling. This increasing is performed until there are no collisions—that is, the hash function generates a unique index for each field ID.

Accordingly, this approach may result in many inactive entries in the array of entries 620 while allowing for rapid direct access to each active field. In the implementation shown in FIGS. 9 and 10, very rapid direct access to each individual entry (which may be relevant to plenary parsing) is combined with iterative access to the entire set of entries (which may be relevant to dictionary parsing). This unique combination provides tremendous performance and computational efficiency advantages.

Figure 11:
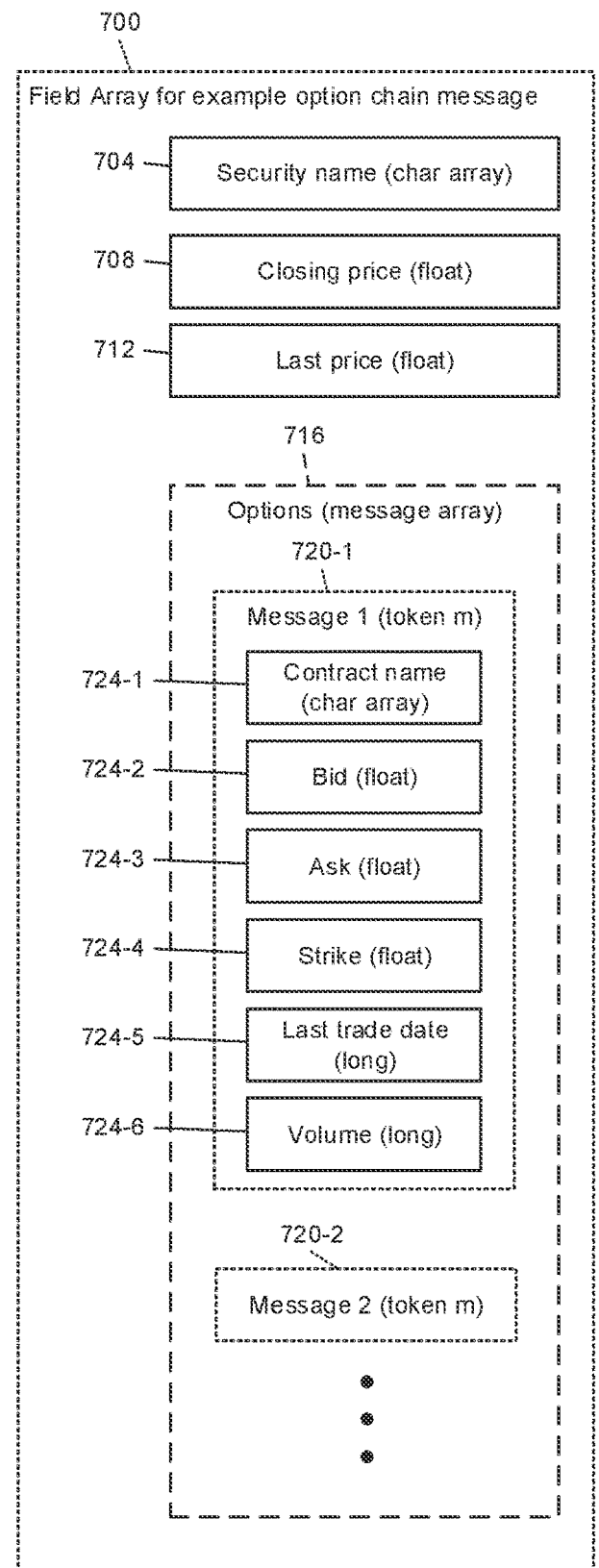
FIG. 11 is a graphical illustration of an example message data structure used for conveying industry-specific data.

In FIG. 11, an example field array 700 is shown for an example message particular to a specific industry. In this example, the field array 700 is used for a message that carries information about an option chain. A first field 704 is a character array containing the name of the security for which the option chain is constructed. The second field 708 is a floating point number indicating a closing price of the security. A third field 712 is a floating point number indicating a last price of the security. A fourth field 716 is an array of messages, one for each option in the option chain.

Note that the fields 704, 708, 712, and 716 may appear in a different order in the array of entries and may be spaced out across the array of entries depending on their field IDs, which are not shown. If the message of FIG. 11 were the only message of interest, the field IDs for these fields could be chosen as 1, 2, 3, and 4, leading to a very compact array of entries. However, because the messaging architecture is relevant to a wide array of messages, field IDs within the message will frequently be nonconsecutive.

The fourth field 716 includes multiple array entries of type message, including a first message 720-1, a second message 720-2, . . . (collectively, message 720). The messages 720 are all the same type of message and therefore have a token value of m. Because they all have the same token, only the first message 720-1 is illustrated. In this example, the first message 720-1 includes a character array field 724-1 that indicates the name of the contract, a floating point entry 724-2 that indicates a bid price, a floating point entry 724-3 that indicates an asking price, a floating point field 724-4 that indicates a strike price, a long (long integer) field 724-5 that indicates a last trade date, and a long field 724-6 that indicates a trading volume.

An example message class may be defined to include the following components and methods:

```
getToken( )
getBoolean (int fieldId);
setBoolean (int fieldId, boolean value);
getByte(int fieldId);
setByte(int fieldId, byte value);
. . .
getArray(int fieldId)
returnArray (int fieldId, Type arrayType)
getMessage(int fieldId)
returnMessage (int fieldId)
Entry[ ] entries = new Entry[32]
Entry firstActive
clear( )
```

The entry objects may be defined by an Entry class included in the message class, such as the following:

```
private class Entry {
    public final int fieldId;
    public final Type type;
    public boolean hasValue;
    public Entry nextActive;
}
```

According to at least some example embodiments, typed subclasses of the Entry class (i.e., classes that extend the Entry class) are used to store data values (i.e., the data value held by the message field corresponding to the entry). The data value held by the message field corresponding to the entry may also be referred to as message data. Examples of two typed Entry subclasses, BooleanEntry and ByteEntry, are shown here:

```
private class BooleanEntry extends Entry {
    public boolean value;
}
private class ByteEntry extends Entry {
    public byte value;
}
```

For the purpose of simplicity, examples of typed Entry subclasses are shown for only two types of data values: boolean and byte. However, according to at least some example embodiments, the message class may include typed Entry subclasses for each of a plurality of types of data values (e.g., JAVA primitives: boolean, byte, char, short, int, long, float, and double, as well as message objects and array objects).

The message class includes a getToken method that returns value (such as in integer) that identifies a message type, from among a plurality of different message types, of a message object. The message class further includes primitive field get and set methods which may include get and set methods for each one of a plurality of primitives (for example, the JAVA programming language primitives: Boolean, byte, char, short, int, long, float, and double). The set methods among the primitive field get and set methods are used to set the value (value) of a field (that is, an active entry) having the field ID (fieldId). The get methods among get and set methods are used to obtain the value of a field (that is, an active entry) having the field ID (fieldId).

The message class further includes object field get and return methods. In contrast with the primitive fields, the object fields have the return method instead of the set method in various implementations. The message class includes return methods for array and message objects, respectively.

In various implementations the return methods for message objects and array objects operate as follows. If the field already exists in the message invoking the return method, the object (that is, the message or array) held by the field is returned. If the field is inactive (that is, the active flag of the entry object corresponding to the field ID is cleared)—for example, due to the parent message having been recycled—the field is activated (that is, the active flag is set) and the message or array is cleared.

For example, a clear( ) method may be defined for the message class, which clears the active flag for each entry of the entry array in the message. In various implementations, the clear method iterates through every entry of the array of entries and clears the active flag of each. In other implementations, the clear method only iterates through the linked list of active entries and clears their active flags. Further, the first active pointer for the message object may be set to null.

Pooling

Figure 12:
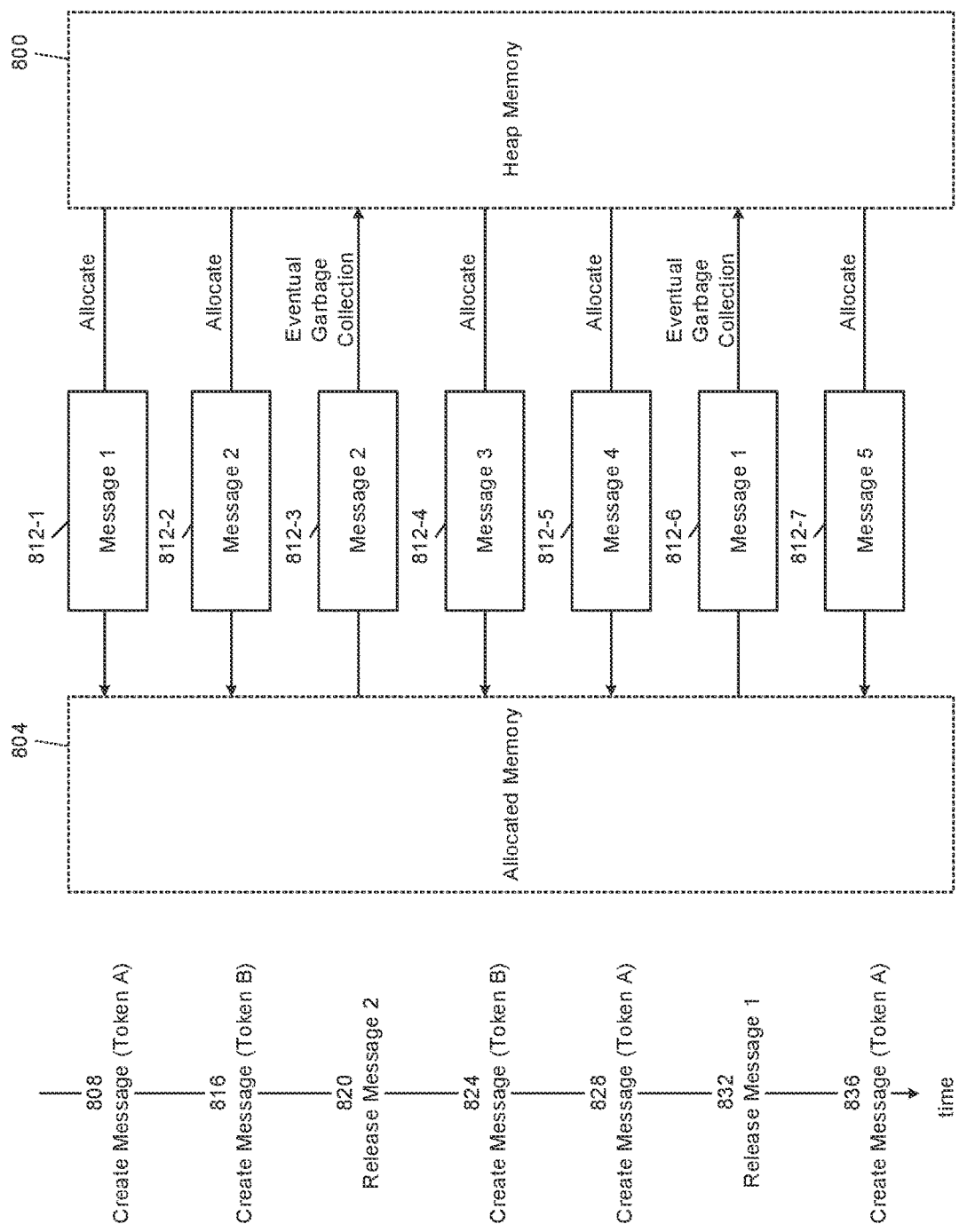
FIG. 12 is a graphical illustration of allocation and eventual garbage collection of objects according to high-level language implementations in the prior art.

FIG. 12 is a graphical illustration of memory management according to the prior art, such as may be implemented in the JAVA programming language. Heap memory is unassigned memory available to the application and is indicated graphically at 800. Meanwhile, allocated memory is indicated graphically at 804.

At 808, a message with token A is created by allocating a first message configured according to token A from the heap memory 800. This first message is graphically indicated, at 812-1, moving from the heap memory 800 to the allocated memory 804. At 816, a message of token B is created. A message 812-2 is shown being allocated from the heap memory 800 to the allocated memory 804. At 820, the second message is no longer needed and is released. Eventually the memory occupied by the second message will be returned to the heap memory 800 by garbage collection. Even though the garbage collection may not occur immediately, the message is shown going back to the heap memory 800 at 812-3.

At 824, another message of token B is created as indicated at 812-4. At 828, another message of token A is created and is illustrated at 812-5. At 832, message 1 is no longer needed and is therefore released. Again, while not necessarily occurring immediately, message 1 is eventually garbage collected into the heap memory 800 as depicted at 812-6. At 836, another message of token A is created as indicated at 812-7. Note that each message object is allocated from the heap memory 800 and then returned to the heap memory 800 via garbage collection.

Figure 13:
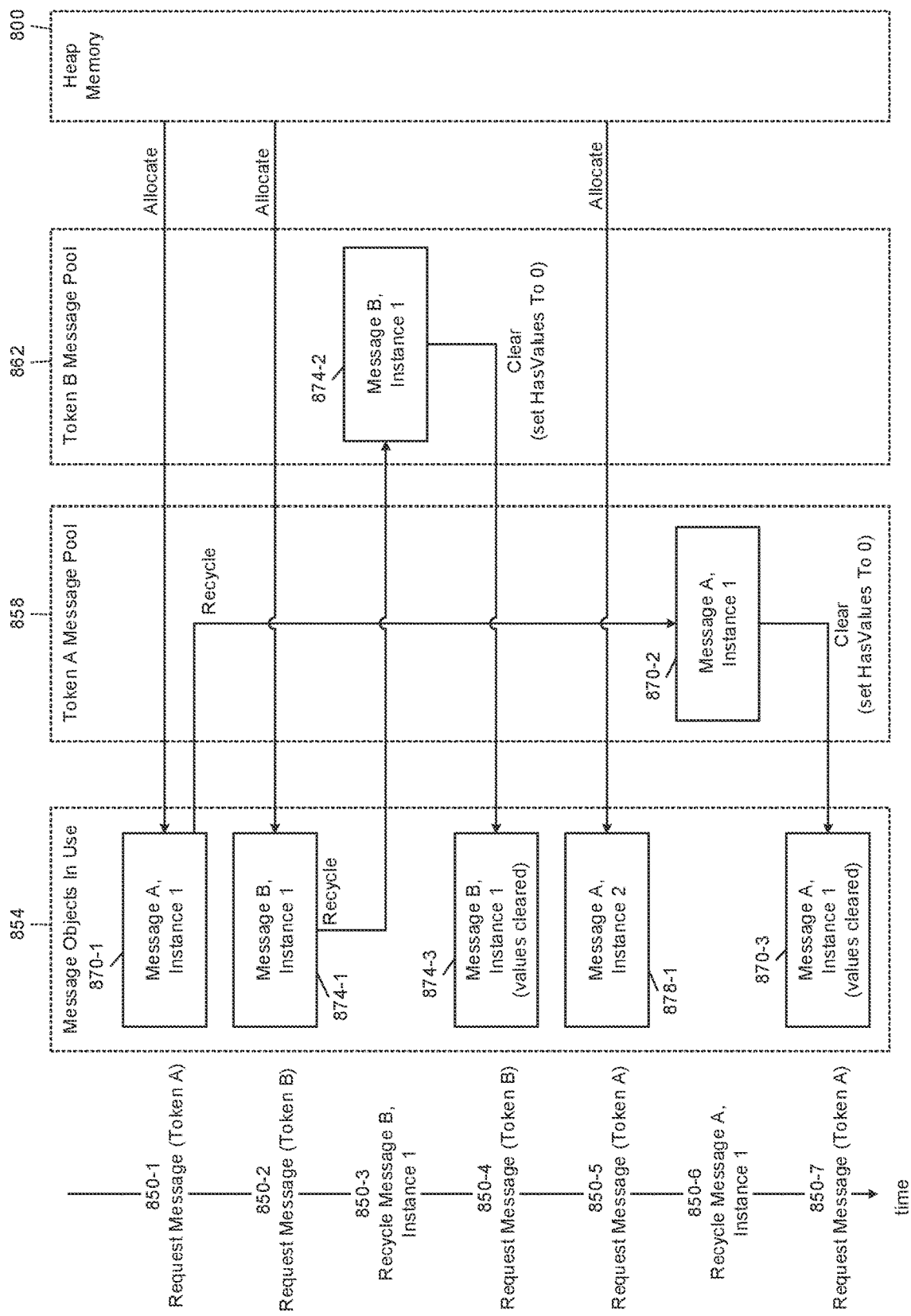
FIG. 13 is a graphical illustration of object recycling according to the principles of the present disclosure.

FIG. 13 is a graphical illustration of an implementation of memory management according to the present disclosure. Note that, while the same sequence of object usage as in FIG. 12 is shown, the high processor overhead (and potential pausing or stalling of the application) of garbage collection is no longer incurred. While pooling in a way that is high performance may not be difficult to someone having the benefit of this disclosure, and pooling in a way that is thread-safe may similarly not be difficult, various implementations of the particular pooling approach disclosed here have the unique property that thread safety is maintained while high performance is achieved.

At 850-1, a message of type A (that is, having token A) is requested. At 850-2, a message of type B is requested. At 850-3, the first type B message instance is no longer needed and is therefore recycled. At 850-4, another type B message is requested. At 850-5, another message of type A is requested. At 850-6, the first type A message instance is no longer needed and is therefore recycled. At 850-7, yet another message of type A is requested.

In FIG. 13, three functional groupings are shown: message objects in use 854, a token A message pool 858, and a token B message pool 862. These three all represent allocated memory and, although messages are shown moving between the three, there is no actual movement in memory. Instead, these are a functional reassignments, not moves within memory.

At 850-1, there are no messages in the token A message pool 858 and therefore a new message of type A is allocated from the heap memory 800. This first instance of message A is indicated at 870-1. At 850-2, a message of type B is needed. Because the token B message pool 862 does not contain a message, a message of type B is allocated from the heap memory 800 and shown at 874-1. At 850-3, the first instance of the type B message is no longer needed and is therefore recycled. Recycling involves assigning the message to the token B message pool 862, and this assignment is graphically shown at 874-2.

At 850-4, a message of type B is needed and can be supplied from the token B message pool 862. At the time of reuse, the message is cleared. As described above, clearing may involve setting the active flag for each of the entries of the message object to false. The resulting cleared message, shown at 874-3 can then be reused. At 850-5, there are no message objects in the token A message pool 858 and therefore a new message of type A is allocated from the heap memory 800 and is depicted at 878-1.

In 850-6, the first instance of the type A message is no longer needed and is therefore recycled. This recycle process is illustrated at 870-2 by placing the first instance of message A into the token A message pool 858. At 850-7, a message of type A is requested and, being present in the token A message pool 858, is supplied. Again, the message is cleared for re-use and the cleared message is now shown at 870-3.

Although clearing the message upon re-use is shown, in various implementations, the message may be cleared at the time of recycling. In various implementations, the message is cleared upon re-use: however, if a quiescent period or period or low activity is experienced, messages in the message pools may be cleared to lower the computational burden for a time when activity increases.

Figure 14:
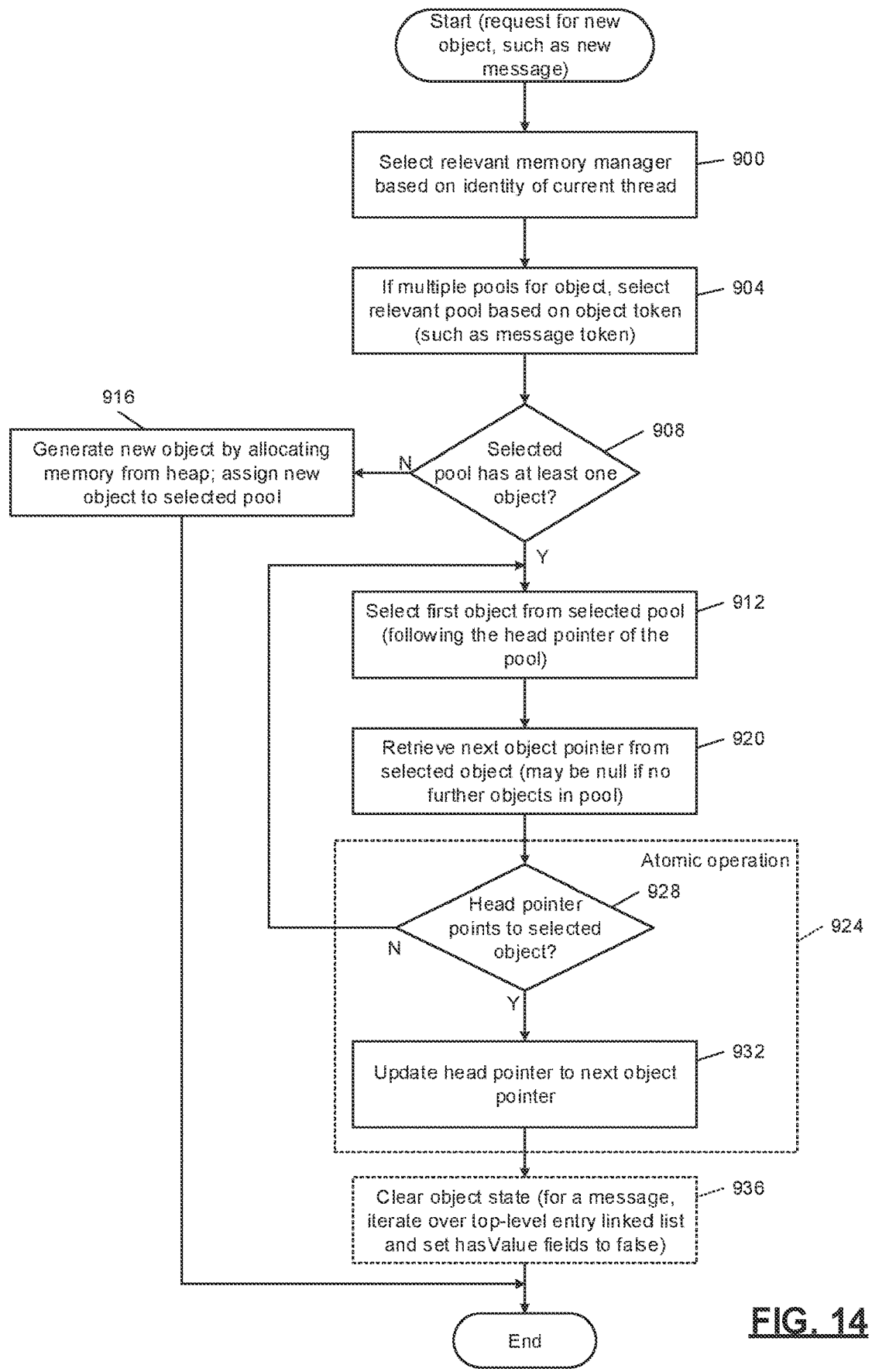
FIG. 14 is a flowchart of example operation of requesting a new object of an object type that is recycled into pools.

FIG. 14, a flowchart illustrates a thread-safe process for requesting a new object from a pooled memory manager architecture. Control begins at 900 in response to a request for a new object (such as a request for a new message object). At 900, control selects the relevant memory manager based on the identity of the current thread. In other words, in various implementations, each thread may have its own set of memory managers—also referred to as pool containers.

At 904, control determines whether there are multiple pools for the object in the memory manager and, if so, selects the applicable pool. For example, the selection of the relevant pool may be based on an object token, such as a message token—in various implementations, there is a pool for each message token in a memory manager for the thread.

In other examples, the relevant pool may be selected based on size, such as is the case when arrays of different sizes are pooled separately.

At 908, control determines whether the selected pool includes at least one object. If so, control transfers to 912; otherwise, control transfers to 916. At 916, there is no available object in the pool and therefore a new object is generated by allocating memory from the heap. The object is assigned to the selected pool, such as by setting an element of the object's data structure to an identifier of the selected pool. The new object is then ready and control ends.

At 912, control selects the first object from the selected pool. In various implementations, the pool is implemented as a linked list and therefore the first object is selected by following the head pointer of the pool. In other words, the pool ask as a LIFO (last in first out) data structure or stack. When the linked list is empty (there are no objects in the linked list), the head pointer may be set to a null value.

At 920, control retrieves the next object pointer from the selected object. This pointer may be null if there is no second object in the pool to form the next link in the linked list. Next, an atomic operation is performed at 924. The atomic operation is necessary to make sure that an object is not being returned to the pool at the same time that an object is being taken from the pool.

The atomic operation 924 includes, in the example of FIG. 14, a test condition and a set operation. The test condition is depicted at 928 and the set operation is depicted at 932. At 928, control compares the head pointer of the pool to the pointer of the selected object. If they still match, indicating that a new object has not been recycled and placed in between the head pointer and the selected object in the linked list, control continues at 932; otherwise control exits the atomic operation 924 without performing the set operation. Upon exit, control returns to 912. At 932, control is assured to be pointing to the first object in the linked list and therefore control updates the head pointer to point to the next object pointer, thereby removing the first object from the link list. As mentioned above, the next object pointer may be null, which results in the linked list having zero entries.

Control then continues at 936, where the object state is cleared. For a message object, clearing its state may include iterating over the link list of top-level entries and clearing the activity flag for each. Control then ends. If the object state does not need to be cleared, such as if clearing state is not relevant for the object or if state was previously cleared (such as at the time of recycle), control may omit 936.

After obtaining a message object, set( ) and return( ) methods may be used to add values to entries of the message object. For example, primitive entries (such as integers, characters, etc.) may be populated using a set( ) method. The set( ) method writes a provided value to the value parameter of the entry and, as necessary, sets the hasValue flag for that entry to true.

Object entries may be populated using a return( ) method rather than a set( ) method. For a message entry, the return( ) method may be defined to work as follows:

If the entry already exists, the message is returned; if the entry is inactive (due to the parent message being recycled) the entry is activated, and the message is cleared.

If the entry does not exist, one is created, and set as entry in the parent message.

After the message is returned, it may be updated with the new state.

Thus, once a message entry is initially created, it can continue to be used, even after the parent message is recycled.

The behavior of the return( )method for an array entry may be equivalent.

At a high level, the present disclosure may implement each message type as a unique data structure. The system creates the data structure the first time the message is used, and then reuses the existing structure after that. That ensures that, after the first use, setting the message state is only a matter of setting primitive values in the existing structure—along with possibly resizing arrays, if the existing array is too small; in time, the arrays should be sufficiently large.

The return methods are employed to enable this behavior—the structure is create on the first use, and reused thereafter. This is the motivation for pooling by message type—it ensures that messages pulled from the pool will already have the required structure.

Figure 15:
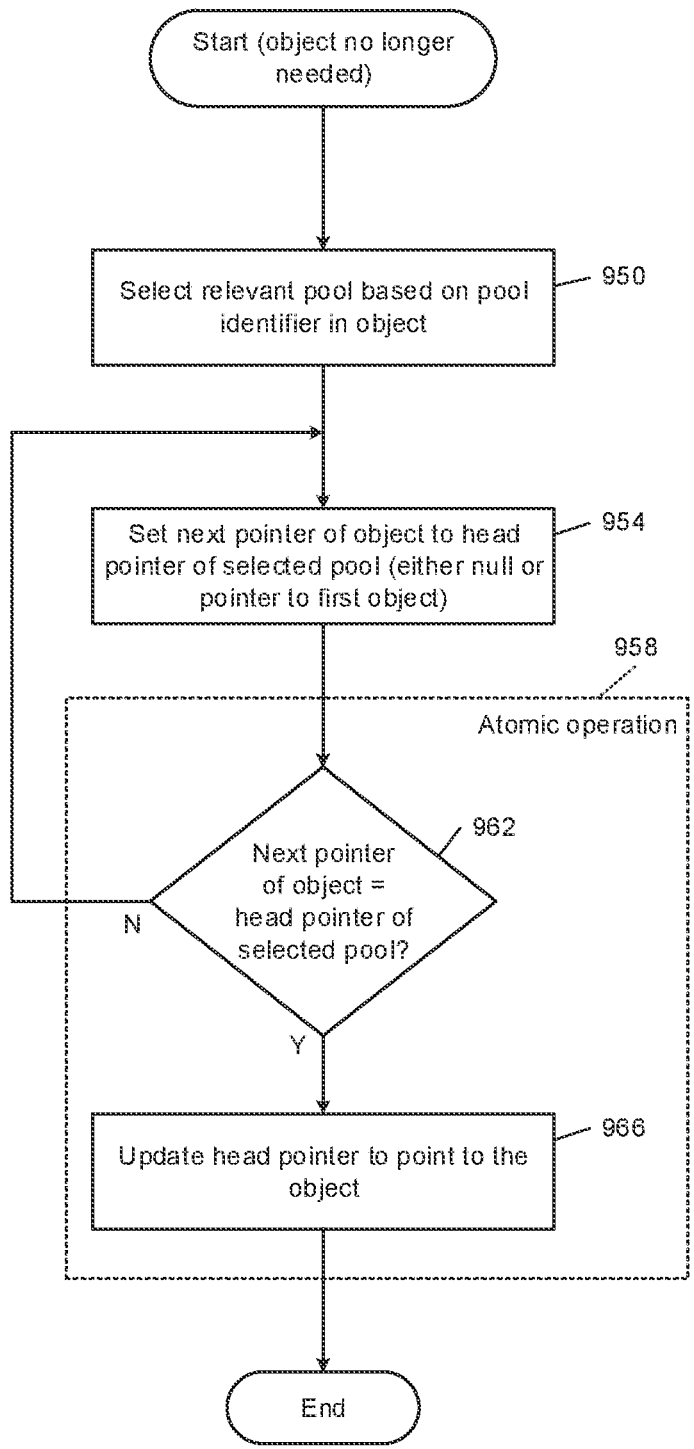
FIG. 15 is a flowchart showing example operation of recycling an object into a pool.

In FIG. 15, example operation of a thread-safe process for recycling an object is shown. Control begins at 950 in response to an object no longer being needed. For example, a message object may have been encoded and sent out over the communications network and the message object is therefore no longer needed. At 950, control selects the relevant pool based on the pool identifier in the object.

At 954, control sets the next pointer of the object to the value of the head pointer of the selected pool. This will insert the recycled object at the beginning of the linked list. However, before updating the head pointer of the pool to point to the recycled object, a thread-safe process performs an atomic operation 958.

Within the atomic operation 958, a condition 962 compares the next pointer of the object to the head pointer of the selected pool. If these values still match, no additional object has been recycled since 954 and therefore control continues to 966 to complete the insertion of the recycled object into the linked list. This is accomplished by updating the head pointer to point to the recycled object. Control then ends. However, if the head pointer of the selected pool no longer points to the next pointer of the object, this means another object has been recycled and therefore control returns to 954 to make sure that the object will be placed at the beginning of the linked list without orphaning the newly recycled object.

Custom Arrays

FIGS. 16A-16D illustrate custom classes for use in the messaging architecture. Specifically, one or more custom sets of array classes may be defined that expand upon the capabilities of built-in arrays available through the high-level language. Each set of custom array classes may be implemented as a set of enclosing classes, one for each data type (for example, the data types shown at 680 in FIG. 9, such as character, integer, float, etc.), based on a nested class (which may further be an inner class).

Figure 16A:
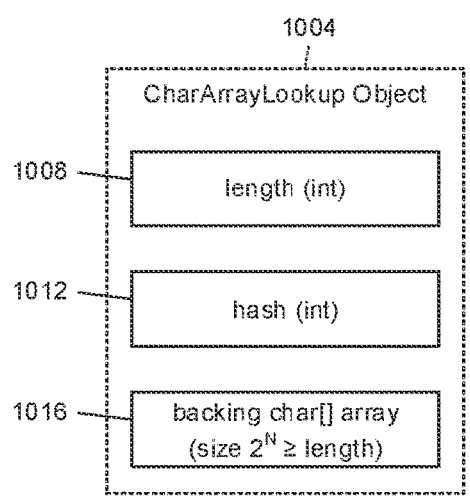
FIG. 16A is a graphical illustration of a data structure for a dynamically expandable character array with rapid lookup functionality.
Figure 16B:
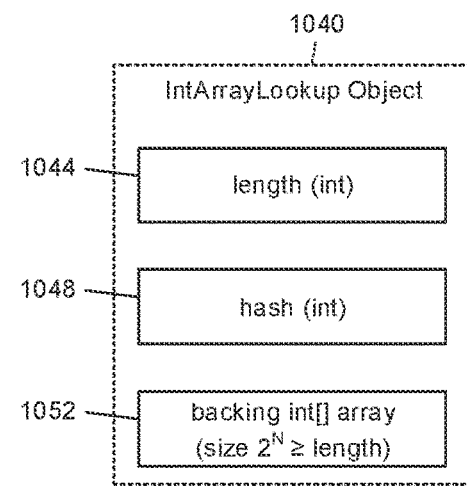
FIG. 16B is a graphical illustration of a data structure for a dynamically expandable integer array with rapid lookup functionality.

FIGS. 16A and 16B demonstrate two objects from a set of classes that offers resizable arrays as well as rapid comparison methods—specifically, example character and integer data types are shown. In addition to providing resizing functionality, these custom array classes may expose convenience methods, such as hashCode( ) and equals( ). They may be used with, for example, the string store module 336. As described below, the hashCode( ) method may allow a rapid comparison—if hashes do not match, the arrays are definitely not equal. If the hashes do match, the arrays may be equal, and their equality can be checked with the equals( ) method.

In FIG. 16A, a character array object 1004 of a custom character array class includes a length variable 1008 (which may be an integer), a hash 1012 (which may also be an integer), and a backing character array 1016. In various implementations, the size of the backing character array 1016 is defined to have a size that is a power of two. Further, the size is greater than or equal to the value stored in the length variable 1008. As a numeric example, the size may be 64 ($2^6$). Meanwhile, the length variable 1008 may be less than 64: in one specific example, the length may be 40. Continuing this example, the length of the character array object 1004 can be increased from 40 up to as high as 64 without any change to the backing character array 1016.

Figure 17:
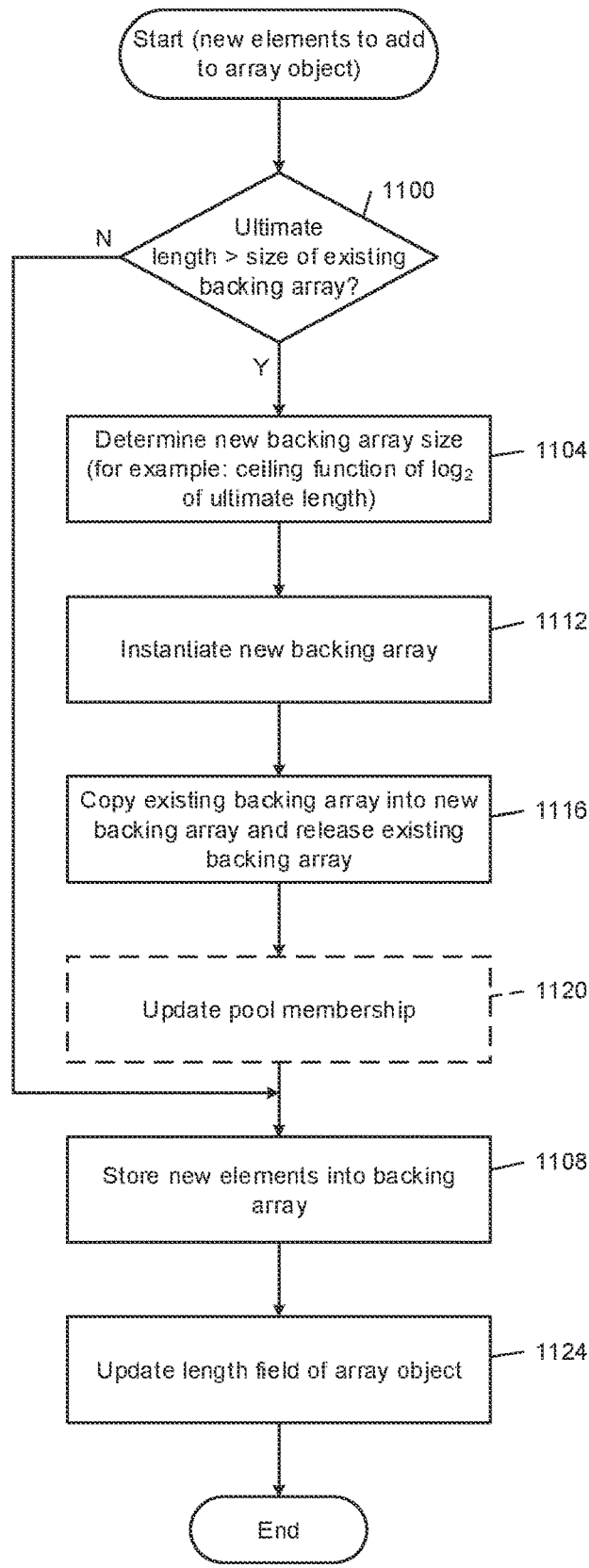
FIG. 17 is a flowchart of example operation for resizing a dynamically expandable array structure.

Once the length exceeds the size, a new backing character array is created, as described in more detail in FIG. 17. In brief, the exponent N is determined (for example, using a base 2 logarithm and ceiling function) such that $2^N$ exceeds the length. A new backing array is then created with size $2^N$. The values in the old backing array are copied over and the old backing array is returned to the heap. In effect, the backing array allows for the longest character array that has been encountered by this object to be stored even if the current character array that is being stored is much shorter.

The custom class may implement hashCode( ) and equals( ) methods relying on the hash 1012, which may override standard hashCode( ) and equals( ) methods. More specifically, the hashCode( ) method and equals( ) method may be implemented in such a manner that:
1. If hashCode( ) is used on the same object multiple times, and the contents of the object have not changed, hashCode( ) returns the same value each time.
2. If the byte array properties of two or more objects have the same contents, then equals( ) will return TRUE for any two of the two or more objects.
3. If two or more objects are equal to each other according to equals( ), then hashCode( ) will return the same value for each of the equal objects.

The hash 1012 may be calculated whenever data is changed in the backing character array 1016. The hashCode ( ) method may simply return the value of the hash 1012. The equals( ) method may first compare hashes of two objects—if the hashes do not match, then the equals( ) method returns a false value. If the hashes match, the equals( ) method may then compare lengths—a difference in lengths indicates that the arrays are not the same. If the hashes and lengths match, the equals( ) method may perform a value-by-value (or byte-by-byte) comparison of array elements to ensure that the matching hashes are not the result of a hash collision and instead are the result of each array element of the two objects matching. This equals( ) method may be more sophisticated than prior art built-in equals( ) methods for array objects, which may identify two objects as being equal only if they are the exact same object (having the same reference).

In FIG. 16B, an example integer array object 1040 of a custom integer array class is shown. Similar to the character array object 1004, the integer array object 1040 includes a length 1044, a hash 1048, and a backing integer array 1052.

Figure 16C:
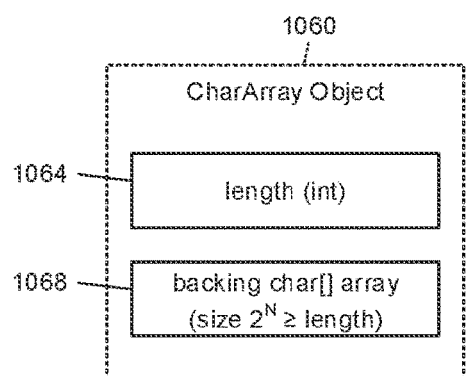
FIG. 16C is a graphical illustration of a data structure for a dynamically expandable character array.
Figure 16D:
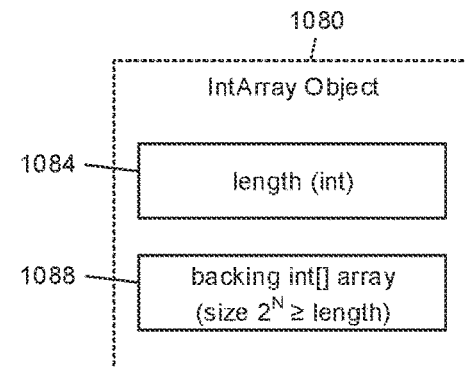
FIG. 16D is a graphical illustration of a data structure for a dynamically expandable integer array.

FIGS. 16C and 16D demonstrate two objects from a set of classes that offers resizable arrays—specifically, example character and integer data types are shown. These resizable arrays may be used for array content in message data structures (the message class) since, in various implementations, the hashCode( ) and equals( ) methods may not be needed or even relevant in that context. In FIG. 16C, an example character array object 1060 of a custom character array class is shown. The character array object 1060 includes a length 1064 (which may be an integer) and a backing character array 1068 having a size that is a power of two and is greater than or equal to the length 1064.

In FIG. 16D, an example integer array object 1080 of a custom integer array class is shown. The integer array object 1080 includes a length 1084 (which may be an integer) and a backing integer array 1088 having a size that is a power of two and is greater than or equal to the length 1084.

In FIG. 17, an example process for adding elements to an array object is shown. In response to new elements being present at the array object, control begins at 1100. Control determines whether the ultimate length (including the new elements) is greater than the size of the existing backing array. If so, control transfers to 1104; otherwise, control transfers to 1108.

At 1104, control determines a new backing array size. For example, control may calculate the base two logarithm of the ultimate length, apply the ceiling function to identify N, and then calculate $2^N$ to obtain the new backing array size. At 1112, control instantiates the new backing array. At 1116, control copies the elements of the existing backing array into the new backing array and releases the existing backing array. Note that only the elements from the beginning of the array up until the index of the array indicated by the length value need to be copied since the remainder of the backing array does not contain valid data.

At 1120, control updates the pool membership of the resized array object in implementations where array objects are pooled based on backing array size. In various implementations, pool membership may be determined at the time the array object is returned to a pool—in those implementations, 1120 may be omitted. Control then continues at 1108.

At 1108, control stores the new elements into the backing array. At 1124, control updates the length field of the array object to reflect the new elements. Control then ends.

Figure 18:
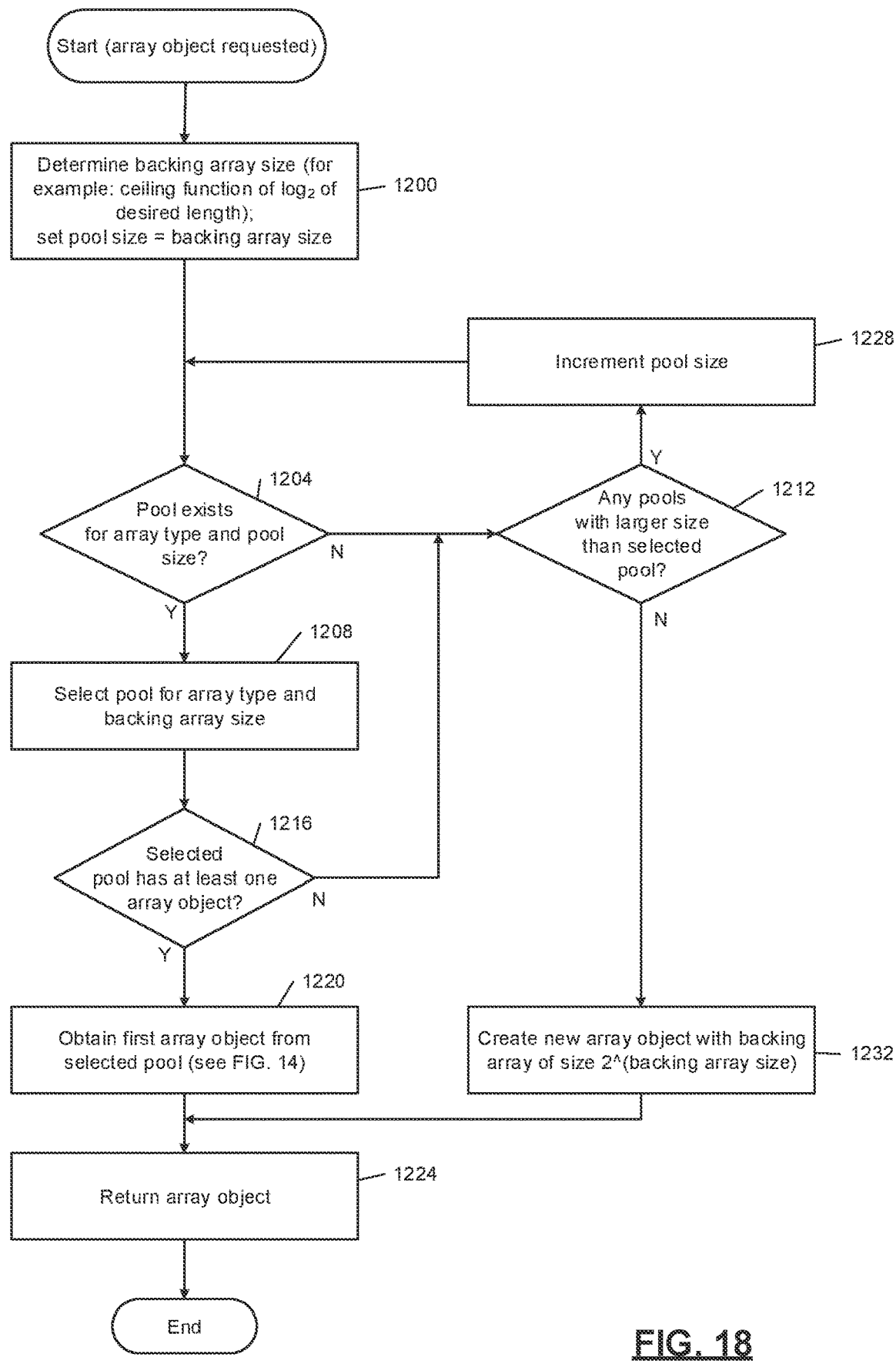
FIG. 18 is a flowchart of example operation of requesting a new array according to a specified size and data type.

In FIG. 18, a flowchart illustrates example operation of servicing a request for an array object. In response to the request, control begins at 1200. At 1200, control determines a backing array exponent for the requested array object. For example, a base two logarithm of the desired length for the array is calculated and a ceiling function is applied. A variable called pool size is set to this calculated backing array exponent.

At 1204, control determines whether a pool exists for (i) the array type specified in the request as well as (ii) the size specified by the pool size variable. If so, control transfers to 1208; otherwise, control transfers to 1212. At 1208, control selects the pool for the array type in the backing array size. Control then continues at 1216, where control determines whether the selected pool has at least one array object. If so, control transfers to 1220; otherwise, control transfers to 1212.

At 1220, control obtains the first array object from the selected pool. In various implementations, this may be performed in a thread-safe manner such as is illustrated in FIG. 14. Control then continues at 1224, where the array object is returned. At 1212, control determines whether there are any pools with a larger size than the selected pool. If so, control transfers to 1228; otherwise, control transfers to 1232.

At 1232, there are no pools that have an array of sufficient size and therefore control creates a new array object with a backing array of size 2 raised to the power of the originally calculated backing array size. Control then continues at 1224. At 1228, a larger pool than is currently selected does exist and therefore the pool size is incremented. Control then continues at 1224.

Parsing

Figure 19:
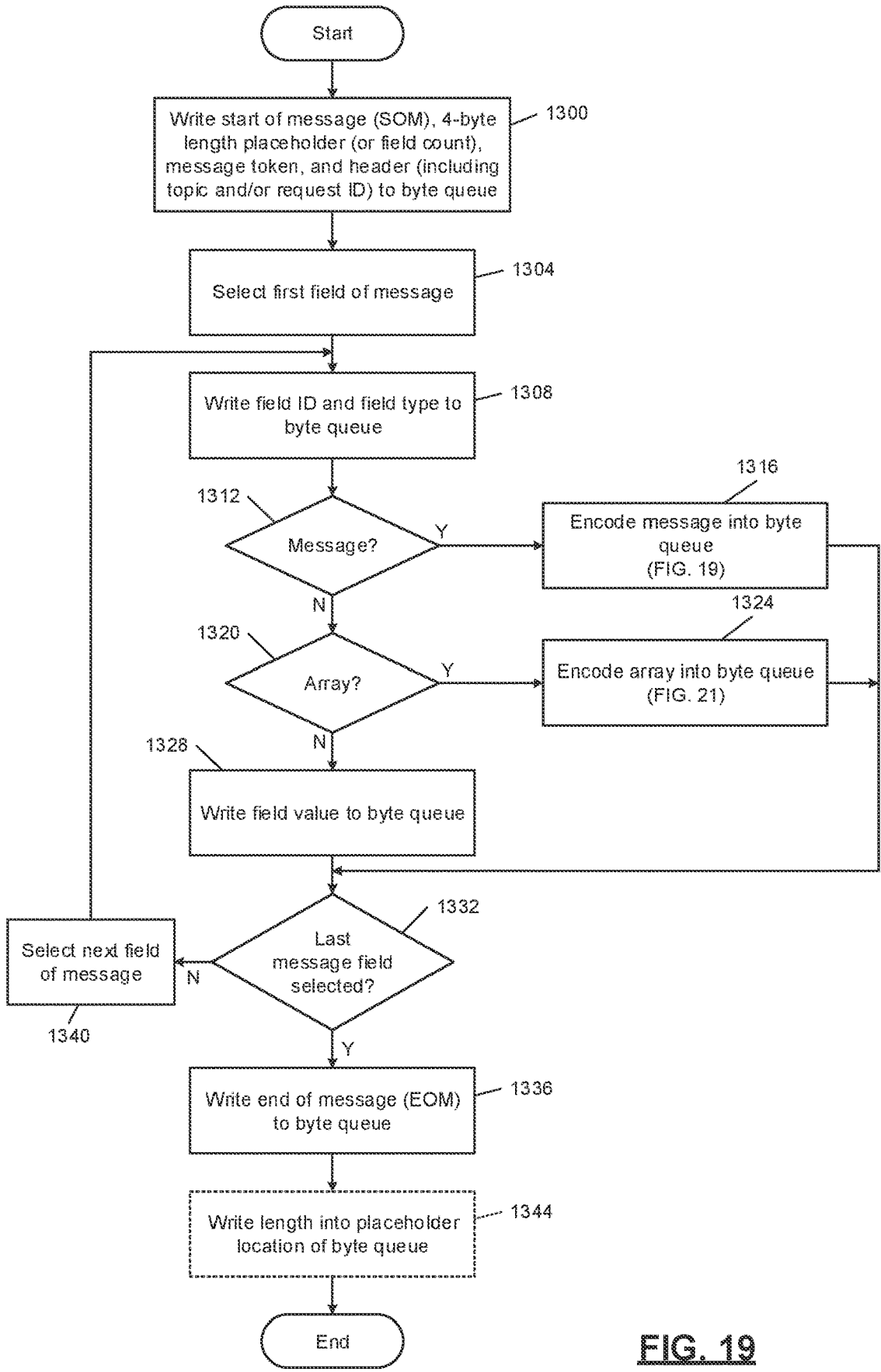
FIG. 19 is a flowchart of example message encoding using a plenary parser.
Figure 20:
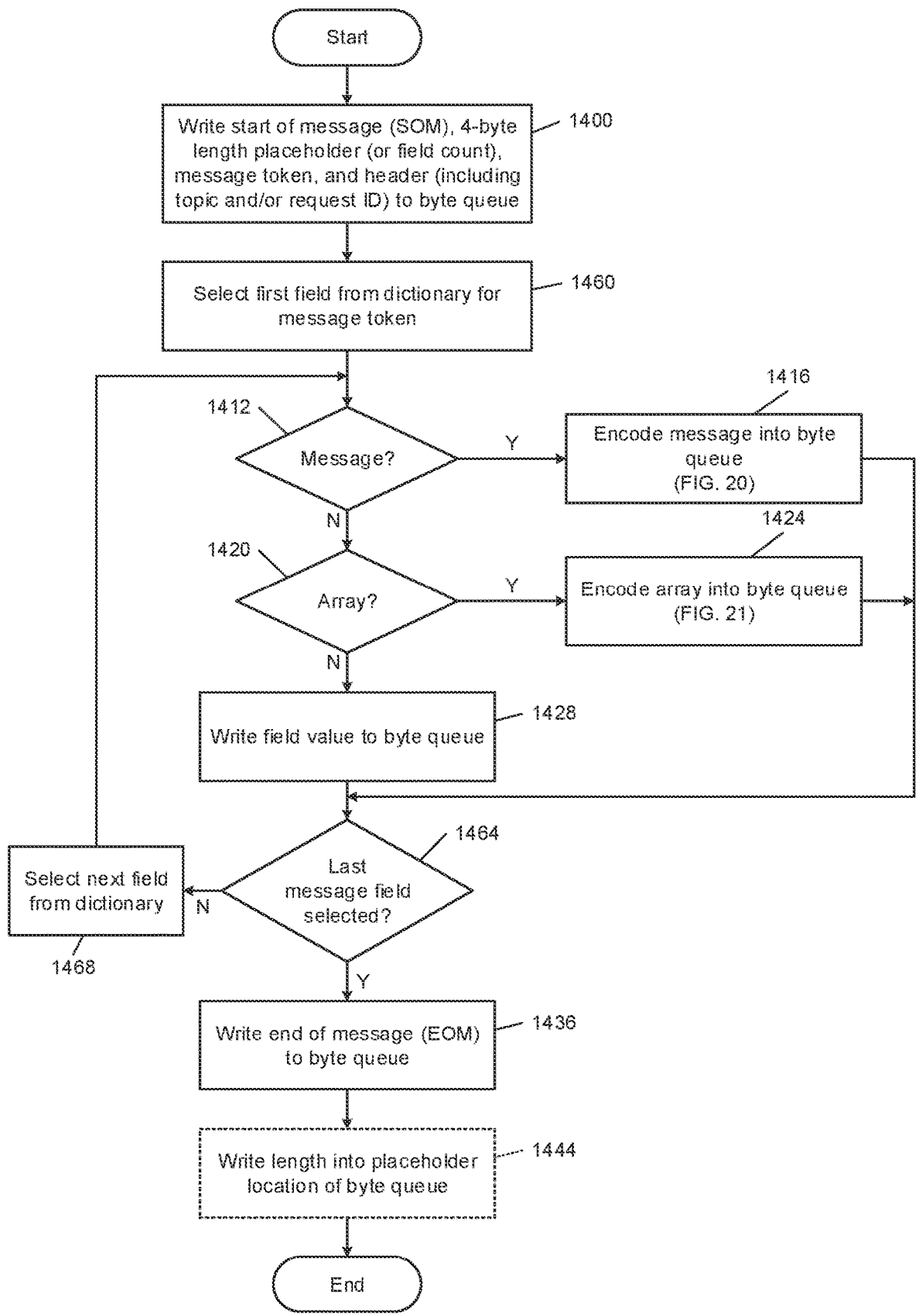
FIG. 20 is a flowchart of example message encoding using a dictionary parser.

FIGS. 19 and 20 illustrate example operation of encoding according to a plenary approach and a dictionary approach, respectively. The plenary approach explicitly defines the fields of the message, including their field IDs and data types, in the encoded bytes. Meanwhile, the dictionary approach uses a dictionary definition that specifies the field IDs and types and therefore this definitional information does not need to be included in the encoded bytes. Encoding and decoding may also be referred to as parsing.

Encoding using the dictionary definition allows the encoded messages to be smaller, improving bandwidth efficiency, and is also faster because fewer pieces of information need to be encoded and transmitted. Dictionary directed parsing facilitates the efficient publishing of the full set of message fields. This may be particularly useful when publishing over UDP. If the full set of fields is published, and there is a UDP packet drop, the consumer can receive the full current state as soon as it receives the next message. This decreases the need for nacks (non-acknowledgements). Further, dictionary directed parsing is time efficient and, because it yields smaller encodes, it decreases the number of packets needed and therefore the likelihood of drops.

In various implementations, plenary and dictionary directed parsing are different implementations of the same interface. An example of such an interface is presented here:

```
public interface Parser {
    // Send side methods
    public int encode(Message msg);
    public int readMsgBytes(byte[ ] bytes, int offset);
    public int bytesRemaining( );
    public boolean fullyRead( );
    // Receive side methods
    public boolean writeMsgBytes(byte[ ] bytes, int offset, int length);
    public boolean readyToParse( );
    public Message parse( );
    // Send side, optional value set at startup
    public void setCompressAt(int numBytes);
    // Allows the parser state to be reset, in case it enters a bad state
    // e.g., receives a message it can't parse
    public void reset( );
}
```

The encode( ) method encodes the message state into bytes in the byte queue and returns the size of the encode (that is, how many bytes were written to the byte queue).

The readMsgBytes( ) method reads the encoded message from the byte queue and returns the number of bytes written to the byte array. On both the read and write side, dipping in a byte array enables efficient movement of bytes to and from sockets. The byte array can be the data array in a datagram packet (for UDP), or the backing array of an array buffer (for TCP).

The bytesRemaining( ) method returns the number of bytes in the byte queue still to be written to the socket.

The writeMessageBytes( ) method writes received bytes from the socket to the parser.

The readyToParse( ) method returns a value indicating whether the bytes of a full message are waiting in the byte queue.

The parse( ) method converts the bytes in the byte queue into a message.

The setCompressAt( ) method establishes a threshold value. If an encode size of a message exceeds the threshold value, the message is compressed prior to sending.

In FIG. 19, control begins at 1300, where control writes a number of elements to a byte queue. These elements include a startup message indicator, a length placeholder (which may be defined by number of bytes, number fields, or both), the message token, and a header. The header may include a topic for a publication and/or a request ID for a point-to-point communication. The length is a placeholder because the length is determined throughout the course of encoding and can then be filled into the placeholder area at the end of encoding. This is far more efficient than iterating through the message an initial time to determine the length prior to beginning encoding.

At 1304, control selects the first field of the message using the linked list structure of the message. At 1308, control writes the field ID and field type of the selected field to the byte queue. At 1312, control determines whether the field type is a message and, if so, control transfers to 1316; otherwise, control transfers to 1320. At 1320, control determines whether the field type is an array and, if so, control transfers to 1324; otherwise, control transfers to 1328.

Figure 21:
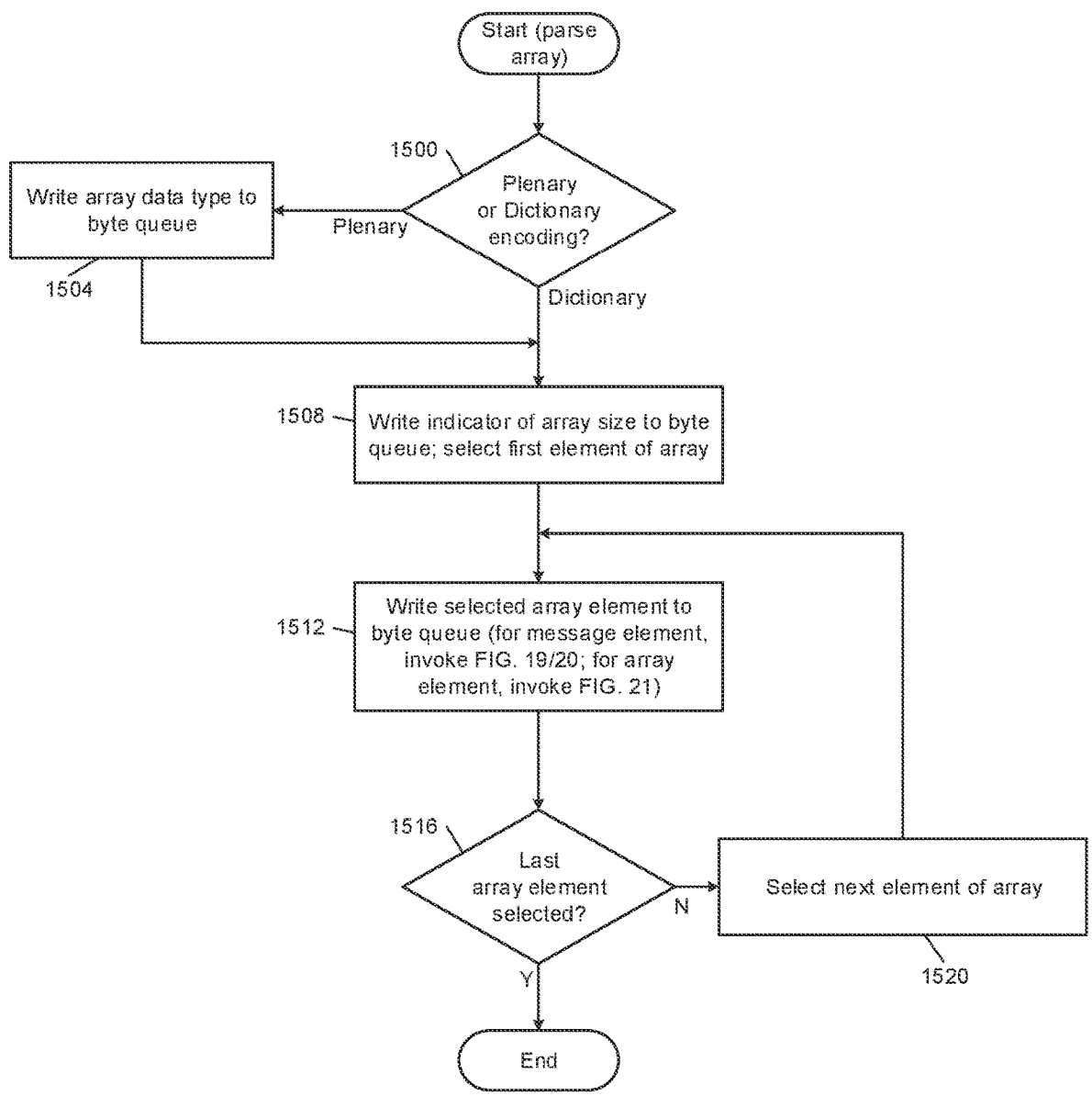
FIG. 21 is a flowchart of example array encoding.

At 1328, the field value is a primitive data type and control writes the field value to the byte queue. Meanwhile, at 1316, the field type is a message and therefore the message is encoded into the byte queue. The message is encoded in the byte queue in a recursive form such that FIG. 19 can be used to encode this sub message. However, when recursively calling FIG. 19, the initial step of 1300 may be modified, such as by excluding the header. After encoding the message and the byte queue, control continues at 1332. At 1324, control encodes the array into the byte queue. For example, this encoding may be performed as shown in FIG. 21. Control then continues at 1332.

At 1332, control determines whether the last message field in the linked list is selected. If so, control transfers to 1336; otherwise, control transfers to 1340. At 1340, control selects the next field of the message and continues at 1308. At 1336, control writes an end of message indicator to the byte queue. At 1334, control writes the length into the placeholder location in the byte queue established at 1300. Control then ends.

In FIG. 20, operation of the dictionary encoding begins at 1400. In various implementations, 1400 may be implemented similarly or identically to 1300 of FIG. 19. Control continues at 1460, where control selects the first field from the dictionary definition for the message token. In other words, the dictionary definition specifies the order of the fields according to field IDs. The first field is therefore selected by using the field ID to directly access the field.

Elements 1412, 1416, 1420, 1424, and 1428 may be implemented similarly to or identically to elements 1312, 1316, 1320, 1324, and 1328 of FIG. 19. Note that the field values are written to the byte queue at 1428 exclusive of the data type or field identifier of the field: in other words, the data type and the field identifier are omitted.

At 1464, control determines whether the last message field is selected. However, the dictionary definition specifies the final message field rather than the linked list in the message object. If the last field has been selected, control transfers to 1436; otherwise, control transfers to 1468. At 1468, control selects the next field of the message according to the dictionary definition and returns to 1412. In various implementations, 1436 and 1444 may be implemented similarly to or identically to 1336 and 1344 of FIG. 19.

In FIG. 21, example encoding of an array begins at 1500. At 1500, control determines whether plenary or dictionary encoding is being used. If plenary encoding is being used, control transfers to 1504; otherwise, control transfers to 1508. At 1504, control writes an indicator of the data type of the array to the byte queue and continues at 1508. This is not necessary for dictionary-directed encoding.

At 1508, control writes an indicator of the array size to the byte queue and selects the first element of the array. At 1512, control writes the selected array element into the byte queue. If the array element is a primitive type, this is straightforward. However, if the array element is a message, the message may be encoded as shown in FIG. 19 or 20 (depending on whether dictionary directed or plenary encoding is being used). If the array element is yet another array, FIG. 21 may be invoked recursively.

Control continues at 1516, where if the last array element is selected, control ends; otherwise, control transfers to 1520. The last element of the array is determined based on the specified length even if the backing array is longer. At 1520, control selects the next element of array and returns to 1512.

Transmission and Reception

Figure 22:
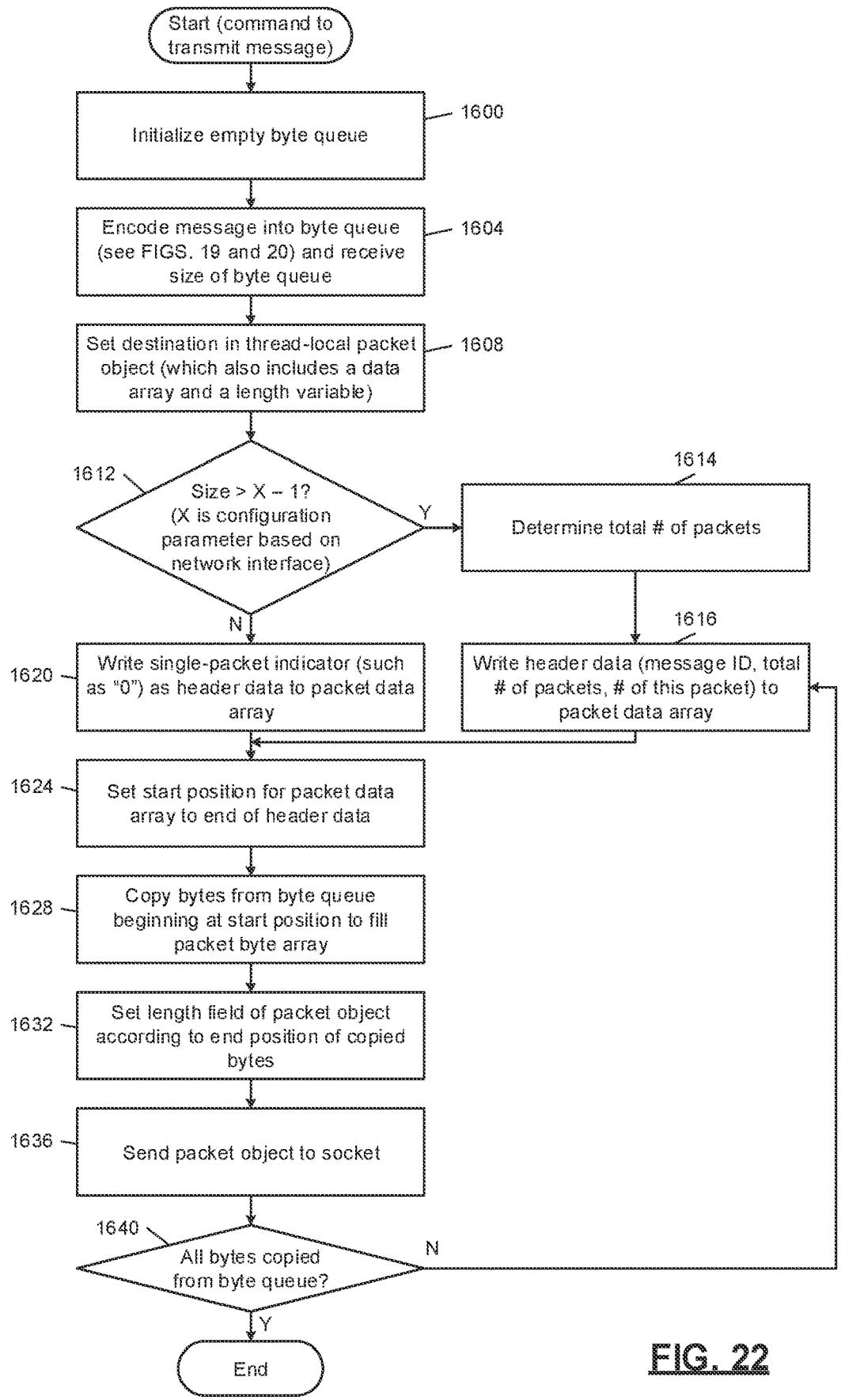
FIG. 22 is a flowchart of example operation of transmission of an encoded message.

In FIG. 22, a flowchart depicts operation for transmitting a message using the UDP protocol. Transmission of the message may be under control of the business logic. The system may offer both TCP and UDP transport mechanisms that can be selected by the business logic. When the protocol is TCP, splitting a larger message into individual packets may be handled by the networking stack using segmentation and/or fragmentation.

Control begins at 1600, where in some implementations an empty byte queue is initialized. For example only, the byte queue may be a reusable object used for each encode—or a thread-local object that is used for each encode performed by that thread. When the object is reused, it will generally be cleared before reuse—either immediately before reuse or earlier, such as immediately after the previously encoded message has been transmitted. In various implementations, clearing may involve simply setting the length to 0, thereby designating any existing data in the byte queue as invalid.

At 1604, control encodes the message into the byte queue as shown in FIGS. 19 and 20. Encoding may provide information about the size of the byte queue, which can be used to determine whether the message can be sent in a single packet (that is, UDP datagram) or not. At 1608, control sets a destination for the packet(s). For example, this may be a unicast or multicast address. The multicast address and port number may be dictated by the topic identifier of the message. A unicast address may be determined based on a callback received in a previous message published to a topic the device subscribes to.

A packet object may be used for constructing each packet for transmission. For example, the packet object may be thread-local and reused for each packet constructed and sent by the present thread. In various implementations, the packet object includes a destination field, a data array, and a length. The destination field may include an address (unicast or multicast) and a port number. The length indicates the amount of valid data in the data array—for example, measured in number of bytes. At 1608, control sets the destination for the message into the destination field of the packet object.

At 1612, if the size of the byte queue (which may have been reported as part of encoding at 1604) is greater than a predefined threshold (represented as X−1), control transfers to 1614 to send multiple packets; otherwise, control transfers to 1620 to send a single packet. The value of X is a configuration parameter based on the network interface. For example, X may be the maximum payload size of a UDP packet in the local network—if different segments of the network allow different payload sizes, the smallest of these sizes may be selected as X so that X represents the largest data payload available through the entire network.

A specified value (in the example shown, this value is 1) may be subtracted from X for the comparison to allow for "header data" to precede the actual message data (the byte queue). The term "header data" is in quotes because it may not be a packet header as understood by the networking stack and networking devices in the network. Instead, the term "header data" is included in the payload of the packet and used by the recipient to interpret the rest of the payload data. In various implementations, the header data for a single-packet message may be a single byte (such as the value 0) to indicate that the packet contains the entirety of the message. In such implementations, the value 1 is subtracted from X for the comparison of 1612.

At 1620, the byte queue will fit within a single packet and so the single-packet header data (such as a single-byte 0) is placed at the beginning of the packet data array. Control continues at 1624.

At 1614, the byte queue will span multiple packets, so control determines the total number of packets needed. For example, this determination may be made by subtracting the multi-packet header data size from X and dividing the byte queue size by the result, then applying the ceiling function (which chooses the smallest integer that is greater than or equal to its input).

At 1616, control writes multi-packet header data to the beginning of the packet data array. For example, the header data may include a message ID, total number of packets (determined at 1614), and the number of the current packet (a counter beginning at either 0 or 1). Whichever field is placed first in the packet data array may need to be chosen such that the beginning of the packet data array is differentiated from the beginning that would have been written at 1620. For example, if 1620 uses a single-byte 0 to indicate a single-packet message, the first byte of the header data in 1616 may be constrained to be non-zero.

The message ID may be unique to messages sent by the sending device, at least within a given timespan, such as 1 hour or 24 hours—that is, the same message ID is not reused within the given timespan. In various implementations, no mechanism is implemented to ensure the message ID is unique across all senders—as a result, the message ID may be combined with some other indicia (such as sender IP address) to unambiguously identify a set of packets related to a single message. Control then continues at 1624.

At 1624, control sets a start position for the packet data array to a location following (in various implementations, immediately following) the header data. This start position may differ according to whether single-packet or multi-packet header data was written to the packet data array.

At 1628, control copies bytes from the byte queue into the packet data array, beginning at the start position of the packet data array. The copy ends when either the byte queue is exhausted or the end of the packet data array is reached.

At 1632, control specifies the length of valid data in the packet data array. For example, the length may be stored as a field in the packet object. The length may be a sum of the number of bytes in the header data and the number of copied bytes.

At 1636, control sends the packet object to a UDP network socket for processing and transmission by the networking stack. At 1640, control determines whether all of the bytes in the byte queue have been copied. If so, control ends; otherwise, control returns to 1616. This determination may be made, in various implementations, based on a flag returned by the copy process of 1628. For example, the flag may indicate whether all the bytes of the byte queue have been copied. In other implementations, the determination may be made by comparing a current position variable of the byte queue to a length of the byte queue. The current position variable may keep track of the last byte copied from the byte queue to enable the next copy to resume copying from the following byte.

Before ending, control may decide whether to retain the byte queue. If multiple packets were sent (the "Y" branch of 1612), the byte queue may be retained to allow for missing packets to be re-sent. In various implementations, the re-request protocol will request missing packets after a defined period of time in which fewer than all packets for a message were received. The control of FIG. 22 may therefore retain the byte queue until this defined period of time has elapsed. Specifically, the byte queue may be retained for the defined period of time plus a transmission delay to allow for any delay in one of the packets reaching the destination and for the re-request arriving.

If only a single packet was sent (the "N" branch of 1612), no re-request will occur and therefore the byte queue can immediately be returned to the appropriate pool for reuse. In various implementations, while the data in the byte queue is not immediately overwritten, it is no longer considered valid data. In fact, freeing the byte queue for reuse as part of transmission may be performed after 1628 rather than waiting until after 1636 or 1640.

While not illustrated, a system according to the principles of the present disclosure may combine multiple messages going to a common destination into a single packet, which may be referred to as bursting. The system may have a transmit buffer that holds an encoded message for a configurable period of time. If, within that time, further messages are encoded that can be transmitted with the first message— that is, the destinations are the same and the combined size remains within the size of one packet, a combined packet is created and sent.

Figure 23:
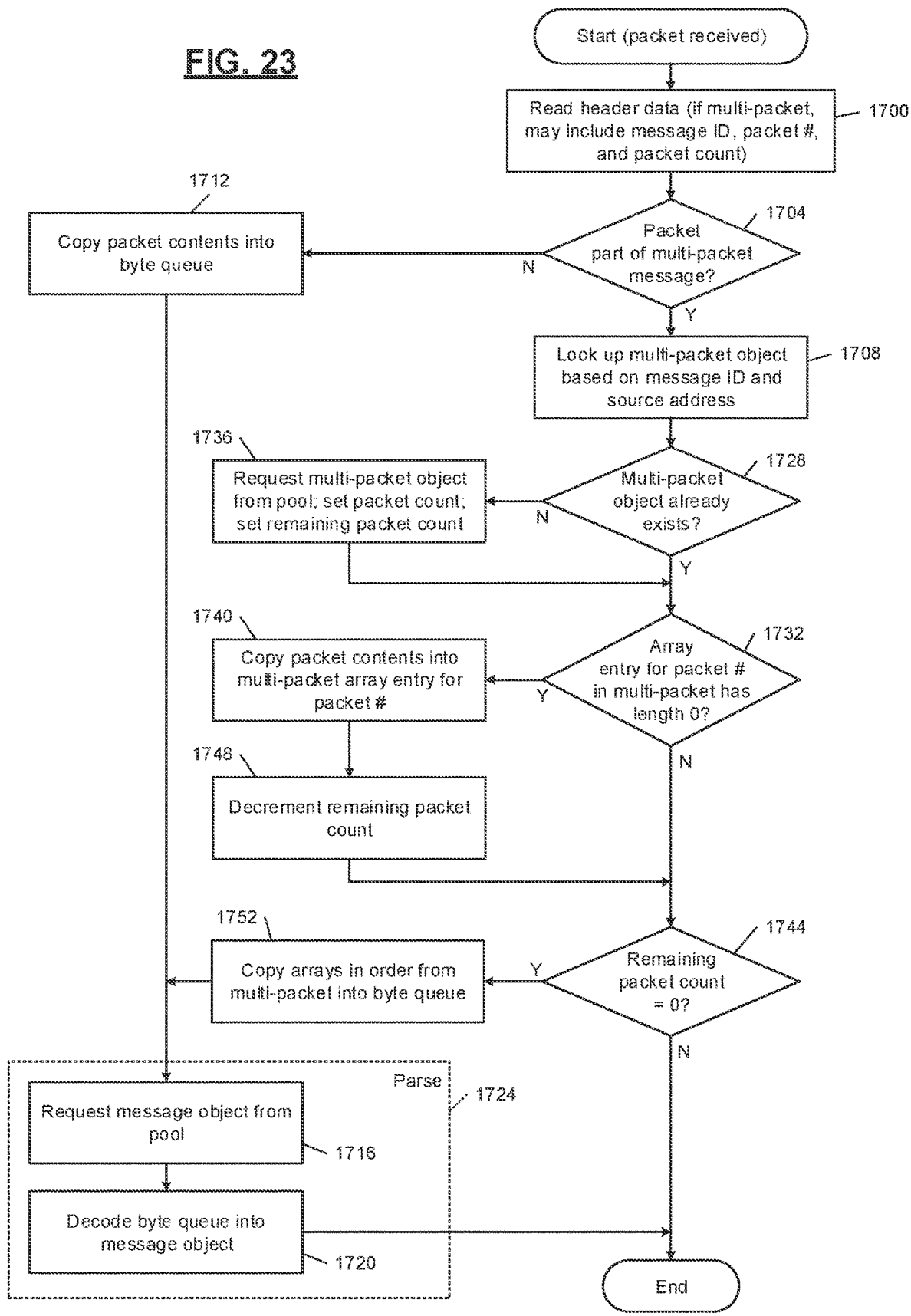
FIG. 23 is a flowchart of example message reception operation.

In FIG. 23, example receive operation for a UDP implementation begins at 1700. At 1700, control reads header data from the packet payload. If the packet contains the entirety of one or more messages, the header data may be a predetermined indicator. If the packet is part of a multi-packet transmission, the header data may include a message ID, the total packet count for this message ID, and the number of this packet. As one example, the predetermined indicator may be a single-byte 0 value while the first byte of the header data for a multi-packet transmission is constrained to be non-zero. At 1704, if the packet is part of a multi-packet message, control transfers to 1708; otherwise, control transfers to 1712.

At 1712, the single-packet message is ready for decoding and therefore the packet contents are copied into a byte queue. Control continues at 1716, where a message object is requested from the pool according to the token of the message. At 1720, control decodes the byte queue into the message object and control ends. 1716 and 1720 may collectively be referred to as a parse operation 1724.

At 1708, control looks for an existing multi-packet object based on the message ID. If the message IDs are not globally unique, the look-up may disambiguate message IDs with indicia such as a source address of the packet. For example, control may look up the multi-packet object based on a combination of message ID and internet protocol (IP) address.

At 1728, if the multi-packet object already exists, control transfers to 1732; otherwise, control transfers to 1736. At 1736, the object does not yet exist and therefore a multi-packet object is requested from a pool. Control sets a packet count field within the multi-packet object and sets the remaining packet count equal to the packet count. Control then continues at 1732.

At 1732, control determines whether the array entry for the specified packet number in the multi-packet object has a length of zero. If so, that means that the packet contents have not yet been received and therefore control transfers to 1740. However, if the array entry is a nonzero length, this packet number has already been received and processed and therefore control transfers immediately to 1744 (ignoring the newly received packet). At 1740, control copies the packet contents into the multi-packet array entry for the specified packet number. Control then continues at 1748, where control decrements the remaining packet count. Control then continues at 1744.

At 1744, if the remaining packet count has reached zero, all the packets for this multi-packet message have been received. If all of the packets have been received, control transfers to 1752; otherwise, control ends. At 1752, all of the packets have been received and therefore the arrays in the multi-packet object are copied, in order, into the byte queue. Control then continues at 1716 to decode the byte queue.

Figure 24:
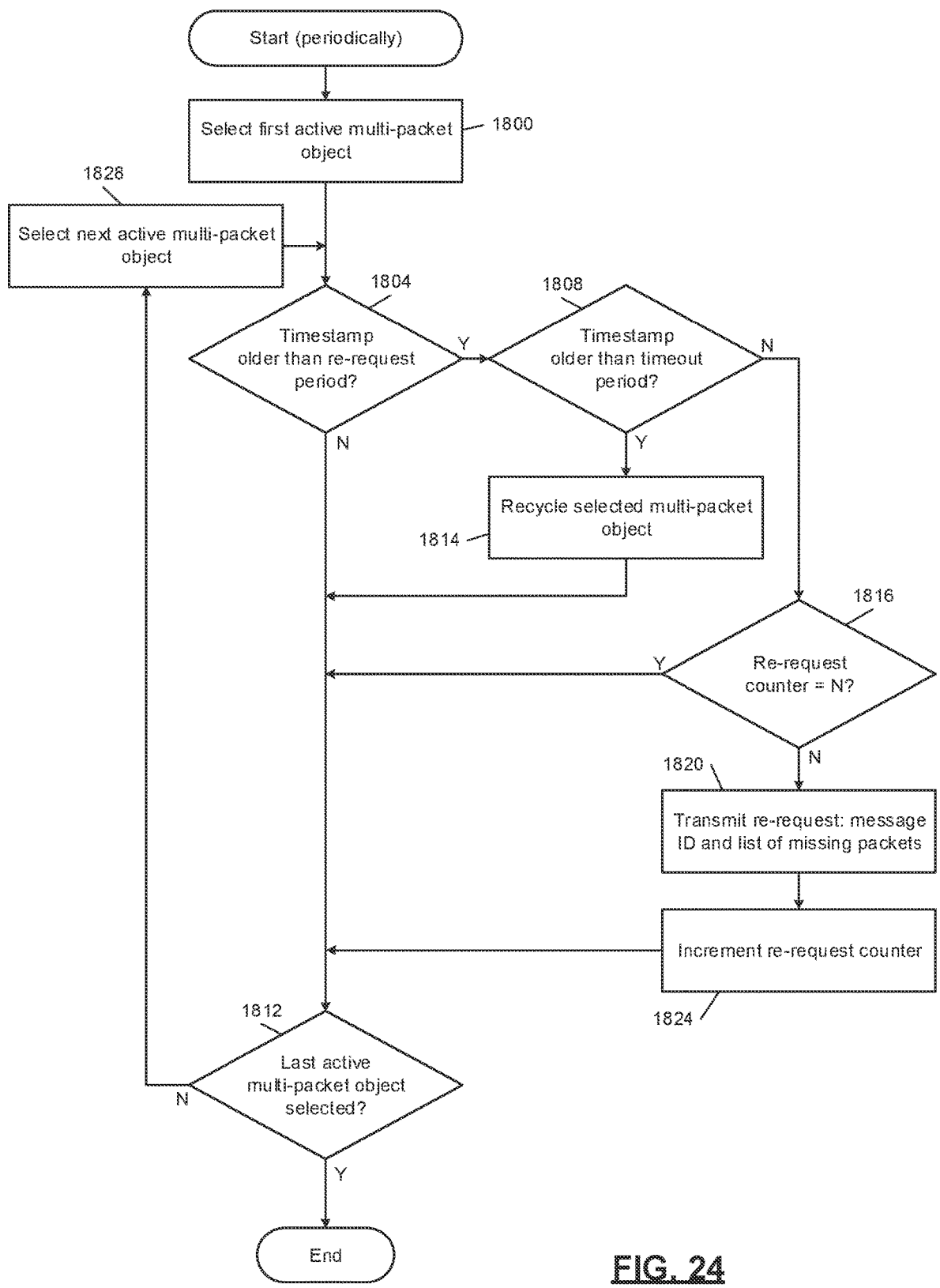
FIG. 24 is a flowchart of example operation related to transmission re-requests.

FIG. 24 is a flowchart of example re-request operation for a UDP implementation. Note that re-requesting is only performed for multi-packet messages. The business logic is responsible for ensuring that a message is received if necessary. UDP is frequently used when high-volume data with time sensitivity is present. In such a case, 100 percent reception may not be desirable. Instead, the data may be received soon after, rendering a retransmission obsolete or at least less desirable. Further, the present disclosure avoids the deleterious effects of nack storms.

In various implementations, control begins on a periodic basis at 1800. At 1800, control selects the first active multi-packet object of the active multi-packet objects. At 1804, control determines whether a timestamp of the multi-packet packet object is older than a defined re-request period. If so, control transfers to 1808; otherwise, control transfers to 1812. The timestamp of the multi-packet is updated each time that a packet is received for the multi-packet. Therefore, the timestamp indicates how recently a packet has been received for this multi-packet message.

At 1808, the re-request period has expired and control therefore considers whether sending a re-request is desirable. First, at 1808, control determines whether the timestamp is older than a timeout period. If so, control transfers to 1812; otherwise, control transfers to 1816. The timeout period is set such that a very old multi-packet is discarded under the assumption that it will not be completed. The timeout period may be a multiple of the re-request period, such as six times longer or ten times longer. At 1812, the selected multi-packet has timed out and therefore the selected multi-packet object is recycled. Control then continues at 1814.

At 1816, the multi-packet has not yet timed out and so control determines whether a re-request should be sent. Each multi-packet object may have a re-request counter and therefore control determines whether a re-request counter has reached a defined number N of re-requests. If so, further requests are not sent and control transfers to 1814; otherwise, control transfers to 1820 to send a re-request. In various implementations, the number N may be set to one; then, the re-request counter may be implemented as a Boolean, with false indicating that the re-request is not performed and true indicating that a re-request has already been performed.

At 1820, control transmits a re-request to the source of the multi-packet message. The re-request includes the message ID. To prevent the transmission of every packet, the re-request may include a list of the numbers of the missing packets. In other implementations, the list may be a bitfield with a first value (such as 1) for every received packet and a second value (such as 0) for every packet not yet received. Control continues at 1824. At 1824, control increments the re-request counter and continues at 1814. At 1814, control determines whether the last multi-packet object is currently selected. If so, control ends; otherwise, control returns to 1828. At 1828, control selects the next active multi-packet object and continues at 1804.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the FIGS., the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WWI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A communications system comprising:
   memory hardware configured to store instructions; and
   processing hardware configured to execute the instructions stored by the memory hardware, wherein the instructions include:
   maintaining a message object comprising:
      an array of entries; and
      a head pointer to a first active entry of the array of entries,
      wherein each entry of the array of entries includes a field identifier, a data type, and a next entry pointer, and
      wherein the head pointer and each of the next entry pointers establish a linked list of entries; and
   in response to a request to add a new entry to the message object:
      calculating an index of the array of entries based on a field identifier of the new entry;
      determining whether an active entry is present at the calculated index in the array of entries;
      in response to the entry at the calculated index in the array of entries being inactive:
         writing a data type of the new entry, the field identifier of the new entry, and a data value of the new entry to the entry at the calculated index in the array of entries, and
         inserting the new entry into the linked list of entries, and
      in response to the entry at the calculated index in the array of entries being active, selectively expanding a size of the array of entries and repeating the calculating and determining.

2. The communications system of claim 1 wherein the selectively expanding and repeating is only performed when the field identifier of the new entry diverges from a field identifier of the entry at the calculated index in the array of entries.

3. The communications system of claim 2 wherein the instructions include, in response to the entry at the calculated index in the array of entries being active and the field identifier of the new entry equaling a field identifier of the entry at the calculated index in the array of entries, replacing a data value of the entry at the calculated index in the array of entries with the data value of the new entry.

4. The communications system of claim 1 wherein the instructions include, after expanding the size of the array of entries and repeating the calculating and determining:
   in response to the entry at the calculated index in the array of entries still being active, selectively repeating the expanding the size of the array of entries.

5. The communications system of claim 1 wherein expanding the size of the array of entries includes allocating a new array and copying active entries from the array of entries into the new array.

6. The communications system of claim 5 wherein, for each active entry copied over, an index into the new array is recalculated based on the field identifier of the entry.

7. The communications system of claim 1 wherein the index of the array of entries is calculated based on a hash of the field identifier of the new entry.

8. The communications system of claim 7 wherein:
   N is the size of the array of entries; and
   the hash is a modulo N operation.

9. The communications system of claim 8 wherein expanding the size of the array of entries comprises doubling the size of the array of entries.

10. The communications system of claim 1 wherein each entry of the array of entries includes a data value.

11. The communications system of claim 1 wherein, for each entry of the array of entries, a size of the data value is based on the data type of the entry.

12. The communications system of claim 1 wherein each entry of the array of entries includes a Boolean flag indicating whether the entry is active or not.

13. The communications system of claim 1 wherein:
   the message object comprises a token; and
   the token signifies a set of field identifiers present in the message object.

14. The communications system of claim 13 further comprising parsing the message object according to the token by:
   determining the set of fields according to the token; and
   for each field identifier of the set of field identifiers:
      calculating an index into the array of entries based on the field identifier, and accessing a data value of the entry located at the index in the array of entries.

15. The communications system of claim 1 further comprising parsing the message object by:
    traversing the head pointer to select a first active entry in the array of entries;
    accessing a data value of the selected entry; and
    repeatedly:
        following a next entry pointer of the selected entry to select another entry, and
        accessing a data value of the selected entry
    until the selected entry is a final entry in the linked list.

16. The communications system of claim 15 wherein the selected entry is determined to be the final entry in the linked list in response to the next entry pointer of the selected entry.

17. The communications system of claim 16 wherein the selected entry is determined to be the final entry in the linked list in response to the next entry pointer of the selected entry being null.

18. The communications system of claim 1 wherein, in response to the data type of the new entry being an array:
    obtaining an array object, wherein the array object comprises a length value and a backing array;
    in response to a count of elements of the new entry exceeding a size of the backing array:
        releasing the backing array,
        allocating a new backing array that is larger than the backing array,
        setting the length value to the count of elements of the new entry, and
        storing the elements of the new entry into the new backing array; and
    in response to the count of elements of the new entry being less than or equal to the size of the backing array:
        setting the length value to the count of elements of the new entry, and
        storing the elements of the new entry into the backing array.

19. The communications system of claim 18 wherein the new backing array is twice as long as the backing array.

20. The communications system of claim 18 wherein the instructions include, in response to a request to add elements to the array:
    in response to a total count of elements, including the added elements, exceeding the size of the backing array:
        allocating a new backing array that is larger than the backing array,
        copying elements, up to the length value, of the backing array into the new backing array,
        setting the length value to the total count of elements,
        storing the added elements into the new backing array, and
        releasing the backing array; and
    in response to the count of elements of the new entry being less than or equal to the size of the backing array:
        setting the length value to the count of elements of the new entry, and
        storing the elements of the new entry into the backing array.

21. A non-transitory computer-readable medium comprising instructions including:
    maintaining a message object comprising:
        an array of entries; and
        a head pointer to a first active entry of the array of entries,
        wherein each entry of the array of entries includes a field identifier, a data type, and a next entry pointer, and
        wherein the head pointer and each of the next entry pointers establish a linked list of entries; and
    in response to a request to add a new entry to the message object:
        calculating an index of the array of entries based on a field identifier of the new entry;
        determining whether an active entry is present at the calculated index in the array of entries;
        in response to the entry at the calculated index in the array of entries being inactive:
            writing a data type of the new entry, the field identifier of the new entry, and a data value of the new entry to the entry at the calculated index in the array of entries, and
            inserting the new entry into the linked list of entries, and
        in response to the entry at the calculated index in the array of entries being active, selectively expanding a size of the array of entries and repeating the calculating and determining.

22. A method comprising:
    maintaining a message object comprising:
        an array of entries; and
        a head pointer to a first active entry of the array of entries,
        wherein each entry of the array of entries includes a field identifier, a data type, and a next entry pointer, and
        wherein the head pointer and each of the next entry pointers establish a linked list of entries; and
    in response to a request to add a new entry to the message object:
        calculating an index of the array of entries based on a field identifier of the new entry;
        determining whether an active entry is present at the calculated index in the array of entries;
        in response to the entry at the calculated index in the array of entries being inactive:
            writing a data type of the new entry, the field identifier of the new entry, and a data value of the new entry to the entry at the calculated index in the array of entries, and
            inserting the new entry into the linked list of entries, and
        in response to the entry at the calculated index in the array of entries being active, selectively expanding a size of the array of entries and repeating the calculating and determining.

\* \* \* \* \*